United States Patent
Kentley-Klay et al.

(10) Patent No.: US 10,409,284 B2
(45) Date of Patent: Sep. 10, 2019

(54) SYSTEM OF CONFIGURING ACTIVE LIGHTING TO INDICATE DIRECTIONALITY OF AN AUTONOMOUS VEHICLE

(71) Applicant: Zoox, Inc., Menlo Park, CA (US)

(72) Inventors: Timothy David Kentley-Klay, Stanford, CA (US); Rachad Youssef Gamara, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 3 days.

(21) Appl. No.: 15/613,798

(22) Filed: Jun. 5, 2017

(65) Prior Publication Data
US 2018/0134207 A1    May 17, 2018

Related U.S. Application Data

(63) Continuation of application No. 14/756,994, filed on Nov. 4, 2015, now Pat. No. 9,701,239.

(51) Int. Cl.
*B60Q 1/52* (2006.01)
*G05D 1/00* (2006.01)
(Continued)

(52) U.S. Cl.
CPC .......... *G05D 1/0214* (2013.01); *B60L 3/0007* (2013.01); *B60L 3/04* (2013.01);
(Continued)

(58) Field of Classification Search
CPC ......... B60Q 1/26; B60Q 1/525; G05D 1/0088
See application file for complete search history.

(56) References Cited

U.S. PATENT DOCUMENTS

| 5,558,370 A | 9/1996 | Behr |
| 5,959,552 A | 9/1999 | Cho |

(Continued)

FOREIGN PATENT DOCUMENTS

| EP | 2549456 | 1/2013 |
| JP | 2011248855 | 12/2011 |

(Continued)

OTHER PUBLICATIONS

U.S. Appl. No. 14/756,991, filed Nov. 4, 2015, Levinson et al., "Sensor-based object-detection for optimization for autonomous vehicles".

(Continued)

*Primary Examiner* — Anne M Antonucci
(74) *Attorney, Agent, or Firm* — Lee & Hayes, P.C.

(57) ABSTRACT

Systems, apparatus and methods may be configured to implement actively-controlled light emission from a robotic vehicle. A light emitter(s) of the robotic vehicle may be configurable to indicate a direction of travel of the robotic vehicle and/or display information (e.g., a greeting, a notice, a message, a graphic, passenger/customer/client content, vehicle livery, customized livery) using one or more colors of emitted light (e.g., orange for a first direction and purple for a second direction), one or more sequences of emitted light (e.g., a moving image/graphic), or positions of light emitter(s) on the robotic vehicle (e.g., symmetrically positioned light emitters). The robotic vehicle may not have a front or a back (e.g., a trunk/a hood) and may be configured to travel bi-directionally, in a first direction or a second direction (e.g., opposite the first direction), with the direction of travel being indicated by one or more of the light emitters.

20 Claims, 44 Drawing Sheets

(51) Int. Cl.
| | |
|---|---|
| *B60Q 1/26* | (2006.01) |
| *G05D 1/02* | (2006.01) |
| *B60N 2/00* | (2006.01) |
| *B60R 21/01* | (2006.01) |
| *B60W 10/18* | (2012.01) |
| *B60W 10/30* | (2006.01) |
| *B60W 30/08* | (2012.01) |
| *B60W 30/095* | (2012.01) |
| *B60W 10/04* | (2006.01) |
| *B60W 10/20* | (2006.01) |
| *B60W 30/09* | (2012.01) |
| *B60W 30/18* | (2012.01) |
| *B60L 3/00* | (2019.01) |
| *B60L 3/04* | (2006.01) |
| *B60Q 1/50* | (2006.01) |
| *B60L 50/60* | (2019.01) |

(52) U.S. Cl.
CPC .............. *B60L 50/66* (2019.02); *B60N 2/002* (2013.01); *B60Q 1/26* (2013.01); *B60Q 1/50* (2013.01); *B60Q 1/525* (2013.01); *B60R 21/01* (2013.01); *B60W 10/04* (2013.01); *B60W 10/18* (2013.01); *B60W 10/20* (2013.01); *B60W 10/30* (2013.01); *B60W 30/08* (2013.01); *B60W 30/09* (2013.01); *B60W 30/095* (2013.01); *B60W 30/0956* (2013.01); *B60W 30/18* (2013.01); *G05D 1/0088* (2013.01); *G05D 1/0255* (2013.01); *G05D 1/0257* (2013.01); *B60L 2200/40* (2013.01); *B60R 2021/01272* (2013.01); *B60W 2400/00* (2013.01); *B60W 2420/52* (2013.01); *B60W 2420/54* (2013.01); *B60W 2550/10* (2013.01); *B60W 2550/20* (2013.01); *B60W 2550/30* (2013.01); *B60W 2710/06* (2013.01); *B60W 2710/08* (2013.01); *B60W 2710/18* (2013.01); *B60W 2710/20* (2013.01); *B60W 2710/30* (2013.01); *Y02P 90/60* (2015.11); *Y02T 10/7005* (2013.01); *Y02T 10/705* (2013.01)

(56) References Cited

U.S. PATENT DOCUMENTS

| | | |
|---|---|---|
| 6,264,353 B1 | 7/2001 | Caraher et al. |
| 6,301,542 B1 | 10/2001 | Kirchberger et al. |
| 6,374,168 B1 | 4/2002 | Fujii |
| 6,728,616 B1 | 4/2004 | Tabe |
| 6,752,508 B2 | 6/2004 | Kobayashi |
| 7,106,180 B1 | 9/2006 | Pompei |
| 7,426,429 B2 | 9/2008 | Tabe |
| 7,865,277 B1 | 1/2011 | Larson et al. |
| 8,123,642 B2 | 2/2012 | Ishikawa et al. |
| 8,126,642 B2 | 2/2012 | Trepagnier |
| 8,392,064 B2 | 3/2013 | Thrun et al. |
| 8,434,919 B2 | 5/2013 | Schofield |
| 8,670,891 B1 | 3/2014 | Szybalski et al. |
| 8,825,259 B1 | 9/2014 | Ferguson |
| 8,880,272 B1 | 11/2014 | Ferguson et al. |
| 8,977,007 B1 | 3/2015 | Ferguson et al. |
| D743,978 S | 11/2015 | Amin |
| 9,194,168 B1 | 11/2015 | Lu et al. |
| 9,196,164 B1 | 11/2015 | Urmson et al. |
| 9,201,426 B1 | 12/2015 | Bonawitz |
| 9,384,443 B2 | 7/2016 | Passot et al. |
| 9,395,727 B1 | 7/2016 | Smith et al. |
| 9,802,568 B1 | 10/2017 | Larner |
| 2002/0131608 A1 | 9/2002 | Lobb et al. |
| 2004/0017073 A1 | 1/2004 | Pavlov et al. |
| 2004/0068354 A1 | 4/2004 | Tabe |
| 2004/0264207 A1 | 12/2004 | Jones |
| 2005/0216181 A1 | 9/2005 | Estkowski et al. |
| 2006/0064202 A1 | 3/2006 | Gutmann et al. |
| 2006/0089763 A1 | 4/2006 | Barrett et al. |
| 2006/0175116 A1 | 8/2006 | Friedman et al. |
| 2006/0207820 A1 | 9/2006 | Joshi et al. |
| 2007/0096447 A1 | 5/2007 | Tabe |
| 2007/0246927 A1 | 10/2007 | Okada |
| 2008/0033645 A1 | 2/2008 | Levinson et al. |
| 2008/0084283 A1 | 4/2008 | Kalik |
| 2008/0097699 A1 | 4/2008 | Ono |
| 2008/0161987 A1 | 7/2008 | Breed |
| 2008/0309468 A1 | 12/2008 | Greene et al. |
| 2008/0320421 A1 | 12/2008 | Demaris et al. |
| 2009/0036090 A1 | 2/2009 | Cho, II et al. |
| 2009/0208109 A1 | 8/2009 | Kakinami et al. |
| 2009/0240647 A1 | 9/2009 | Green et al. |
| 2009/0276149 A1 | 11/2009 | Kauffman et al. |
| 2010/0045482 A1 | 2/2010 | Strauss |
| 2010/0106356 A1* | 4/2010 | Trepagnier ............ G01S 17/023 701/25 |
| 2011/0122729 A1 | 5/2011 | Hu et al. |
| 2011/0130111 A1 | 6/2011 | Crandall et al. |
| 2011/0288684 A1 | 11/2011 | Farlow et al. |
| 2012/0035846 A1 | 2/2012 | Sakamoto et al. |
| 2012/0083960 A1 | 4/2012 | Zhu et al. |
| 2012/0256448 A1 | 10/2012 | Yasui et al. |
| 2012/0310465 A1* | 12/2012 | Boatright ............... B60Q 1/346 701/25 |
| 2013/0054133 A1 | 2/2013 | Lewis et al. |
| 2013/0246301 A1 | 9/2013 | Radhakrishnan et al. |
| 2013/0268138 A1 | 10/2013 | Moughler et al. |
| 2013/0343071 A1 | 12/2013 | Nagaoka et al. |
| 2014/0032012 A1 | 1/2014 | Joshi et al. |
| 2014/0032049 A1 | 1/2014 | Moshchuk et al. |
| 2014/0088855 A1 | 3/2014 | Ferguson |
| 2014/0129135 A1 | 5/2014 | Holden et al. |
| 2014/0129302 A1 | 5/2014 | Amin et al. |
| 2014/0129951 A1 | 5/2014 | Amin et al. |
| 2014/0132407 A1 | 5/2014 | Kumai et al. |
| 2014/0142830 A1 | 5/2014 | Bernzen et al. |
| 2014/0185880 A1 | 7/2014 | Fairfield et al. |
| 2014/0188347 A1 | 7/2014 | Tabe |
| 2014/0214255 A1 | 7/2014 | Dolgov et al. |
| 2014/0214260 A1 | 7/2014 | Eckert et al. |
| 2014/0244151 A1 | 8/2014 | Matsubara et al. |
| 2014/0257661 A1 | 9/2014 | Schulman et al. |
| 2014/0303827 A1 | 10/2014 | Dolgov et al. |
| 2014/0309833 A1 | 10/2014 | Ferguson et al. |
| 2014/0333468 A1 | 11/2014 | Zhu et al. |
| 2014/0336935 A1 | 11/2014 | Zhu et al. |
| 2014/0358353 A1 | 12/2014 | Ibanez-Guzman et al. |
| 2014/0358427 A1 | 12/2014 | Fuhrman |
| 2015/0025708 A1 | 1/2015 | Anderson |
| 2015/0039157 A1 | 2/2015 | Wolfe et al. |
| 2015/0039391 A1 | 2/2015 | Hershkovitz et al. |
| 2015/0057871 A1 | 2/2015 | Ono et al. |
| 2015/0091374 A1 | 4/2015 | Lenius et al. |
| 2015/0094850 A1 | 4/2015 | Passot et al. |
| 2015/0127224 A1 | 5/2015 | Tabe |
| 2015/0127239 A1 | 5/2015 | Breed et al. |
| 2015/0149019 A1 | 5/2015 | Pilutti et al. |
| 2015/0149088 A1 | 5/2015 | Attard et al. |
| 2015/0160024 A1 | 6/2015 | Fowe |
| 2015/0248131 A1 | 9/2015 | Fairfield et al. |
| 2015/0254986 A1 | 9/2015 | Fairfield et al. |
| 2015/0258928 A1 | 9/2015 | Goto et al. |
| 2015/0268665 A1 | 9/2015 | Ludwick et al. |
| 2015/0271290 A1 | 9/2015 | Tao et al. |
| 2015/0292894 A1 | 10/2015 | Goddard et al. |
| 2015/0298636 A1 | 10/2015 | Furst |
| 2015/0336502 A1 | 11/2015 | Hillis et al. |
| 2015/0336524 A1 | 11/2015 | Larner et al. |
| 2015/0338226 A1 | 11/2015 | Mason et al. |
| 2015/0338852 A1 | 11/2015 | Ramanujam |
| 2015/0339928 A1 | 11/2015 | Ramanujam |
| 2015/0346727 A1 | 12/2015 | Ramanujam |
| 2015/0348221 A1 | 12/2015 | Pedersen et al. |
| 2015/0356368 A1 | 12/2015 | Liu et al. |
| 2015/0359032 A1 | 12/2015 | Menard et al. |
| 2015/0370251 A1 | 12/2015 | Siegel et al. |

(56) References Cited

U.S. PATENT DOCUMENTS

| | | |
|---|---|---|
| 2015/0375764 A1 | 12/2015 | Rajendran et al. |
| 2016/0016315 A1 | 1/2016 | Kuffner, Jr. et al. |
| 2016/0071278 A1 | 3/2016 | Leonard et al. |
| 2016/0107703 A1 | 4/2016 | Briceno et al. |
| 2016/0159402 A1 | 6/2016 | Nakaya et al. |
| 2016/0159407 A1 | 6/2016 | Holmstrom et al. |
| 2016/0165775 P1 | 6/2016 | Maillard et al. |
| 2016/0165786 P1 | 6/2016 | Giesen |
| 2016/0189544 A1 | 6/2016 | Ricci |
| 2016/0209220 A1 | 7/2016 | Laetz |
| 2016/0247106 A1 | 8/2016 | Dalloro et al. |
| 2016/0247109 A1 | 8/2016 | Scicluna et al. |
| 2016/0362045 A1 | 12/2016 | Vegt et al. |
| 2017/0120803 A1 | 5/2017 | Kentley et al. |
| 2017/0120804 A1 | 5/2017 | Kentley et al. |
| 2017/0120814 A1 | 5/2017 | Kentley et al. |
| 2017/0120904 A1 | 5/2017 | Kentley et al. |
| 2017/0297568 A1 | 10/2017 | Kentley et al. |
| 2018/0136654 A1 | 5/2018 | Kentley-Klay et al. |
| 2018/0154829 A1 | 6/2018 | Kentley-Klay et al. |

FOREIGN PATENT DOCUMENTS

| | | |
|---|---|---|
| WO | WO2009151781 | 12/2009 |
| WO | WO2011154681 A1 | 12/2011 |

OTHER PUBLICATIONS

U.S. Appl. No. 14/756,992, filed Nov. 4, 2015, Levinson et al., "Adaptive autonomous vehicle planner logic".

U.S. Appl. No. 14/756,993, filed Nov. 4, 2015, Kentley et al., "Method for robotic vehicle communication with an external environment via acoustic beam forming".

U.S. Appl. No. 14/756,994, filed Nov. 4, 2015, Kentley et al., "System of configuring active lighting to indicate directionality of an autonomous vehicle".

U.S. Appl. No. 14/756,995, filed Nov. 4, 2015, Kentley et al., Coordination of dispatching and maintaining fleet of autonomous vehicles.

U.S. Appl. No. 14/756,996, filed Nov. 4, 2015, Levinson et al., "Calibration for Autonomous Vehicle Operation".

U.S. Appl. No. 14/757,015, filed Nov. 5, 2015, Levinson et al., "Independent steering, power torque control and transfer in autonomous vehicles".

U.S. Appl. No. 14/757,016, filed Nov. 5, 2015, Levinson et al., "Simulation system and methods for autonomous vehicles".

U.S. Appl. No. 14/932,940, filed Nov. 4, 2015, Levinson et al., "Automated Extraction of Semantic Information to Enhance Incremental Mapping Modifications for Robotic Vehicles".

U.S. Appl. No. 14/932,948, filed Nov. 4, 2015, Kentley et al., "Active Lighting Control for Communicating a State of an Autonomous Vehicle to Entities in a Surrounding Environment".

U.S. Appl. No. 14/932,952, filed Nov. 4, 2015, Kentley et al., "Resilient Safety System for a Robotic Vehicle".

U.S. Appl. No. 14/932,954, filed Nov. 4, 2015, Kentley et al., "Internal Safety Systems for Robotic Vehicles".

U.S. Appl. No. 14/932,958, filed Nov. 4, 2015, Kentley, "Quadrant Configuration of Robotic Vehicles".

U.S. Appl. No. 14/932,959, filed Nov. 4, 2015, Kentley et al., Titled "Autonomous Vehicle Fleet Service and System", 65 Pages.

U.S. Appl. No. 14/932,962, filed Nov. 4, 2015, Kently et al., "Robotic Vehicle Active Safety Systems and Methods".

U.S. Appl. No. 14/932,963, filed Nov. 4, 2015, Levinson et al., "Adaptive Mapping to Navigate Autonomous Vehicles Responsive to Physical Environment Changes".

U.S. Appl. No. 14/932,966, filed Nov. 4, 2015, Levinson et al., "Teleoperation System and Method for Trajectory Modification of Autonomous Vehicles".

U.S. Appl. No. 14/933,469, filed Nov. 5, 2015, Kentley eta al., "Software Application to Request and Control an Autonomous Vehicle Service".

U.S. Appl. No. 14/933,602, filed Nov. 5, 2015, Levinson et al., "Machine-Learning Systems and Techniques to Optimize Teleoperation and/or Planner Decisions".

U.S. Appl. No. 14/933,665, filed Nov. 5, 2015, Kentley et al., "Software Application and Logic to Modify Configuration of an Autonomous Vehicle".

U.S. Appl. No. 14/933,706, filed Nov. 5, 2015, Kentley et al., "Interactive Autonomous Vehicle Command Controller".

A Probabilistic Framework for Object Detection in Images Using Context and Scale; Held, David, Levinson, Jesse, Thrun, Sebastian; International Conference on Robotics and Automation (ICRA) (2012).

A Real-Time Motion Planner With Trajectory Optimization for Autonomous Vehicles; Xu, Wenda et al.; Robotics and Automation (ICRA); Saint Paul, MN, USA (2012).

An Evaluation of Dynamic Object Tracking With 3D LIDAR; Morton, P., Douillard, B., Underwood, J.; Proceedings of Australasian Conference on Robotics and Automation; Dec. 7-9, 2011; Melbourne, Australia (2011).

Simultaneous Localization, Mapping, and Manipulation for Unsupervised Object Discovery; Ma, Lu et al.; IEEE International Conference on Robotics and Automation (ICRA); (2014).

Automatic Calibration of Cameras and Lasers in Arbitrary Scenes; Levinson, Jesse, Thrun, Sebastian; International Symposium on Experimental Robotics (ISER) (2012).

Automatic Laser Calibration, Mapping, and Localization for Autonomous Vehicles, Levison, Jesse; Thesis (Ph D); Stanford University (2011 ).

Automatic Online Calibration of Cameras and Lasers; Levinson, Jesse, Thrun, Sebastian; Robotics: Science and Systems (RSS) (2013).

Bayazit et al., "Swarming Behavior Using Probabilistic Roadmap Techniques", Swarm Robotics WS 2004, LNCS, Springer-Verlag Berlin Heidelberg 2005, pp. 112-pp. 125.

Bodensteiner et al., "Monocular Camera Trajectory Optimization using LiDAR Data", IEEE International Conference on Computer Vision Workshops, 2011, 8 pages.

Combining 3D Shape, Color, and Motion for Robust Antime Tracking; Held, David, Levinson, Jesse, Thrun, Sebastian, Savarese, Silvio, Robotics: Science and Systems (RSS), Berkeley, California, USA (2014).

Combining Data-Driven and Model-Based Cues for Segmentation of Video Sequences; Eckes, Christian, Vorbruggen, Jan C.; Proceedings WCNN '96, San Diego, USA (1996).

Control of Robotic Mobility-On Demand Systems: A Queueing-Theoretical Perspective; Zhang, Rick, Pavone, Marco; Intl Journal of Robotics Research, pp. 1-18, Stanford, USA (2015).

Dynamic Real-Time Replanning in Belief Space: An Experimental Study on Physical Mobile Robots; Agha-mohammadi, Ali-Akbar et al.; Technical Report TR 13-007; Texas A&M University, USA (2013).

Easymile (website), Retrieved from <<https://web.archive.org/web/20150723060050/http://easymile.com>> Jul. 2015, <<https://web.archive.org/web/201508012054107/http://easymile.com/mobility-soulition/>>, Aug. 2015, and <<http:www.youtube.com/watch?v=fijDBL76yDY>>, Feb. 2015, 13 pages.

Evaluation of Urban Vehicle Routing Algorithms; Kong, Linghe et al.; Intl Journal of Digital Content Technology and its Applications (JDCTA); vol. 6, No. 23, University of New Mexico, USA (2012).

Exponential Family Sparse Coding With Application to Self-Taught Learning; Honglak, Lee, Raina, Rajat, Teichman, Alex, Ng, Andrew Y.; International Joint Conference on Artificial Intelligence (IJCAI) (2009).

Group Induction; Teichman, Alex, Thrun, Sebastian, Proc. of the IEEE/RSJ Intl Conf on Intelligent Robotics and Systems (IROS) (2013).

Large Scale Dense Visual Inertial Slam; Ma, Lu et al.; Field and Service Robotics (FSR); (2015).

Map-Based Precision Vehicle Localization in Urban Environments; Levinson, Jesse, Thrun, Sebastian; Robotics: Science and Systems (RSS) (2007).

(56) References Cited

OTHER PUBLICATIONS

Robust Vehicle Localization in Urban Environments Using Probabilistic Maps; Levinson, Jesse, Thrun, Sebastian; International Conference on Robotics and Automation (ICRA) (2010).
Towards Fully Autonomous Driving: Systems and Algorithms; Levinson, Jesse et al.; Intelligent Vehicles Symposium (2011).
Traffic Light Mapping, Localization, and State Detection for Autonomous Vehicles; Levison, Jesse, Askeland, Jake, Dolson, Jennifer, Thrun, Sebastian; International Conference on Robotics and Automation (ICRA) (2011).
Unsupervised Calibration for Multi-Beam Lasers; Levinson, Jesse, Thrun, Sebastian, International Symposium on Experimental Robotics (ISER) (2010).
Mertz, et al., "Collision Warning and Sensor Data Processing in Urban Areas", retrieved on Jun. 3, 2015 at <<http://repository.cmu.edu/cgi/viewcontent.cgi?article=1063&context=robotics>>, Research Showcase at Carnegie Mellon University, Robotics Commons, Jun. 1, 2005, 8 pages.
Office action for U.S. Appl. No. 14/932,962, dated Mar. 21, 2016, Kentley et al., "Robotic Vehicle Active Safety Systems and Methods", 18 pages.
Office action for U.S. Appl. No. 14/756,994, dated Jan. 26, 2017, Kentley et al., "System of configuring active lighting to indicate directionality of an autonomous vehicle", 18 pages.
Office action for U.S. Appl. No. 14/932,948, dated Oct. 14, 2016, Kentley et al., "Active Lighting Control for Communicating a State of an Autonomous Vehicle to Entities in a Surrounding Environment", 15 pages.
Office action for U.S. Appl. No. 14/756,995, dated Oct. 31, 2016, Kentley et al., "Coordination of dispatching and maintaining fleet of autonomous vehicles", 35 pages.
Final Office action for U.S. Appl. No. 14/932,940, dated Nov. 22, 2016, Levinson et al., "Automated Extraction of Semantic Information to Enhance Incremental Mapping Modifications for Robotic Vehicles", 29 pages.
Office action for U.S. Appl. No. 14/932,959, dated Dec. 2, 2016, Kentley et al., "Autonomous Vehicle Fleet Service and System", 21 pages.
Office action for U.S. Appl. No. 14/932,963, dated Mar. 17, 2016, Levinson et al., "Adaptive Mapping to Navigate Autonomous Vehicles Responsive to Physical Environment Changes", 26 pages.
Office action for U.S. Appl. No. 14/932,948, dated Mar. 21, 2017, Kentley et al., "Active Lighting Control for Communicating a State of an Autonomous Vehicle to Entities in a Surrounding Environment", 19 pages.
Office action for U.S. Appl. No. 14/932,954, dated Mar. 29, 2016, Kentley et al., "Internal Safety Systems for Robotic Vehicles", 17 pages.
Office action for U.S. Appl. No. 14/932,940, dated May 4, 2016, Levinson et al., "Automated Extraction of Semantic Information to Enhance Incremental Mapping Modifications for Robotic Vehicles", 22 pages.
Office Action for U.S. Appl. No. 14/932,952, dated Jun. 24, 2016, Kentley et al., "Resilient Safety for a System Robotic Vehicle", 11 pages.
Office action for U.S. Appl. No. 14/932,963, dated Aug. 15, 2016, Levinson et al., "Adaptive Mapping to Navigate Autonomous Vehicles Responsive to Physical Environment Changes", 15 pages.
Office Action for U.S. Appl. No. 14/933,602, dated Nov. 5, 2015, Levinson et al., "Machine-Learning and Systems Techniques to Optimize Teleoperation and/or Planner Decisions", 11 pages.
Office action for U.S. Appl. No. 14/756,992, dated Aug. 25, 2016, Levinson et al., "Adaptive autonomous vehicle planner logic", 9 pages.
Office action for U.S. Appl. No. 14/933,469, dated Aug. 30, 2016, Kentley et al., "Software Application to Request and Control an Autonomous Vehicle Service", 11 pages.
Office action for U.S. Appl. No. 14/932,959, dated Aug. 5, 2016, Kentley et al., "Autonomous Vehicle Fleet Service and System", 16 pages.

Online Slam With Any-Time Self-Calibration and Automatic Change Detection; Nima Keivan and Gabe Sibley; IEEE International Conference on Robotics and Automation (ICRA); (2014).
Online, Semi-Supervised Learning for Long-Term Interaction With Object Recognition Systems; Teichman, Alex, Thrun, Sebastian, RSS Workshop on Long-Term Operation of Autonomous Robotic D Systems in Changing Environments (2012).
PCT Invitation to Pay Additional Fees dated Feb. 9, 2017 for PCT Application No. PCT/US16/60183, 7 pages.
PCT Search Report and Written Opinion dated Mar. 30, 2017 for PCT Application No. PCT/US16/60183, 19 pages.
Practical Object Recognition in Autonomous Driving and Beyond; Teichman, Alex, Thrun, Sebastian; IEEE Workshop on Advanced Robotics and its Social Impacts (ARSO) (2011).
Precision Tracking With Sparse 3D and Dense Color 2D Data; Held, David, Levinson, Jesse, Thrun, Sebastian; International Conference on Robotics and Automation (ICRA) (2013).
Real-Time High Resolution Fusion of Depth Maps on GPU; Trifonov, Dmitry; Intl Conference on Computer-Aided Design and Computer Graphics (CAD/Graphics); Guangzhou, China (2013).
Sensor Fusion and Calibration of Inertial Sensors, Vision, Ultra-Wideband and GPS; Hol, Jeroen; Linkoping Studies in Science and Technology, Dissertations No. 1368; Department of Electrical Engineering; Linkoping University, SE-581 83 Linkoping, Sweden; (2011).
Stanford Autonomous Driving Team website <http://driving.stanford.edu/papers.html>; Various; Stanford University 2014.
Group Induction; Teichman, Alex, Thrun, Sebastian, Proc. of the IEEE/RSJ Intl Conf on Intelligent Robotics and (IROS) (2013) Systems.
Online, Semi-Supervised Learning for Long-Term Interaction With Object Recognition Systems; Teichman, Alex, Thrun, Sebastian, RSS Workshop on Long-Term Operation of Autonomous Robotic Systems in Changing Environments (2012).
Towards 3D Object Recognition Via Classification of Arbitrary Object Tracks; Teichman, Alex, Levinson, Jesse, Thrun, Sebastian; International Conference on Robotics and Automation (ICRA) (2011).
Tracking-Based Semi-Supervised Learning; Teichman, Alex, Thrun, Sebastian; Robotics: Science and Systems (RSS) (2011).
Tracking-Based Semi-Supervised Learning; Teichman, Alex, Thrun, Sebastian; International Journal of Robotics Research (IJRR); http://ijr.sagepub.com/content/31 /7 /804; (2012).
Office Action for U.S. Appl. No. 15/471,209, dated Feb. 11, 2019, Kentley-Kay et al, "Robotic Vehicle Active Safety Systems and Methods", 7 pages.
Real-Time Image Segmentation on a GPU; Abramov, Alexey et al.; Facing the Multi-Core Challenge, pp. 131-142, Berlin, German (2010).
Dynamic Real-Time Replanning in Belief Space: An Experimental Study on Physical Mobile Robots; Agha-mohammadi, Ali-Akbar et al.; Technical Report TR 13-007; Texas A&M University, USA (2013), 26 pages.
Combining Data-Driven and Model-Based Cues for Segmentation of Video Sequences; Eckes, Christian, Vorbruggen, Jan C.; Proceedings WCNN '96, San Diego, USA (1996), 8 pages.
A Tutorial on Graph-Based Slam; Grisetti, Giorgio et al.; Intelligent Transportation Systems Magazine, IEEE; pp. 31-43 (2010).
A Probabilistic Framework for Object Detection in Images Using Context and Scale; Held, David, Levinson, Jesse, Thrun, Sebastian; International Conference on Robotics and Automation (ICRA) (2012). 7 pages.
Combining 3D Shape, Color, and Motion for Robust Antime Tracking; Held, David, Levinson, Jesse, Thrun, Sebastian, Savarese, Silvio, Robotics: Science and Systems (RSS), Berkeley, California, USA (2014). 10 pages.
Precision Tracking With Sparse 3D and Dense Color 2D Data; Held, David, Levinson, Jesse, Thrun, Sebastian; International Conference on Robotics and Automation (ICRA) (2013). 8 pages.
Sensor Fusion and Calibration of Inertial Sensors, Vision, Ultra-Wideband and GPS; Hol, Jeroen; Linkoping Studies in Science and

(56) References Cited

OTHER PUBLICATIONS

Technology, Dissertations No. 1368; Department of Electrical Engineering; Linkoping University, SE-581 83 Linkoping, Sweden; (2011 ). 162 pages.
Exponential Family Sparse Coding With Application to Self-Taught Learning; Honglak, Lee, Raina, Rajat, Teichman, Alex, Ng, Andrew Y.; International Joint Conference on Artificial Intelligence (IJCAI) (2009). 7 pages.
Online Slam With Any-Time Self-Calibration and Automatic Change Detection; Nima Keivan and Gabe Sibley; IEEE International Conference on Robotics and Automation (ICRA); (2014). 8 pages.
Evaluation of Urban Vehicle Routing Algorithms; Kong, Linghe et al.; Intl Journal of Digital Content Technology and its Applications (JDCTA); vol. 6, No. 23, University of New Mexico, USA (2012). 10 pages.
Office action for U.S. Appl. No. 14/756,993, dated Jul. 19, 2017, Kentley et al., "Method for robotic vehicle communication with an external environment via acoustic beam forming", 23 pages.
PCT Search Report and Written Opinion dated Jun. 8, 2017 for PCT Application No. PCT/US16/60161, 10 pages.

\* cited by examiner

SYSTEM OF CONFIGURING ACTIVE LIGHTING TO INDICATE DIRECTIONALITY OF AN AUTONOMOUS VEHICLE

RELATED APPLICATIONS

This application claims priority to and is a continuation of U.S. patent application Ser. No. 14/756,994, filed on Nov. 4, 2015, the entire contents of which are incorporated herein by reference.

FIELD

Embodiments of the present application relate generally to methods, systems and apparatus for safety systems in robotic vehicles.

BACKGROUND

Autonomous vehicles, such as the type configured to transport passengers in an urban environment, may encounter many situations in which an autonomous vehicle ought to notify persons, vehicles, and the like, of an operational intent of the vehicle, such as a direction the autonomous vehicle is driving in or will be driving in, for example. Moreover, passengers of an autonomous vehicle may experience some uncertainty as to determining which autonomous vehicle is tasked to service their transportation needs. For example, if there are many autonomous vehicles present, a passenger who has scheduled a ride in one of those autonomous vehicles may wish to easily distinguish which autonomous vehicle is intended for him/her.

Accordingly, there is a need for systems, apparatus and methods for implementing operational status and intent of robotic vehicles.

BRIEF DESCRIPTION OF THE DRAWINGS

Various embodiments or examples ("examples") are disclosed in the following detailed description and the accompanying drawings.

Figure 1:
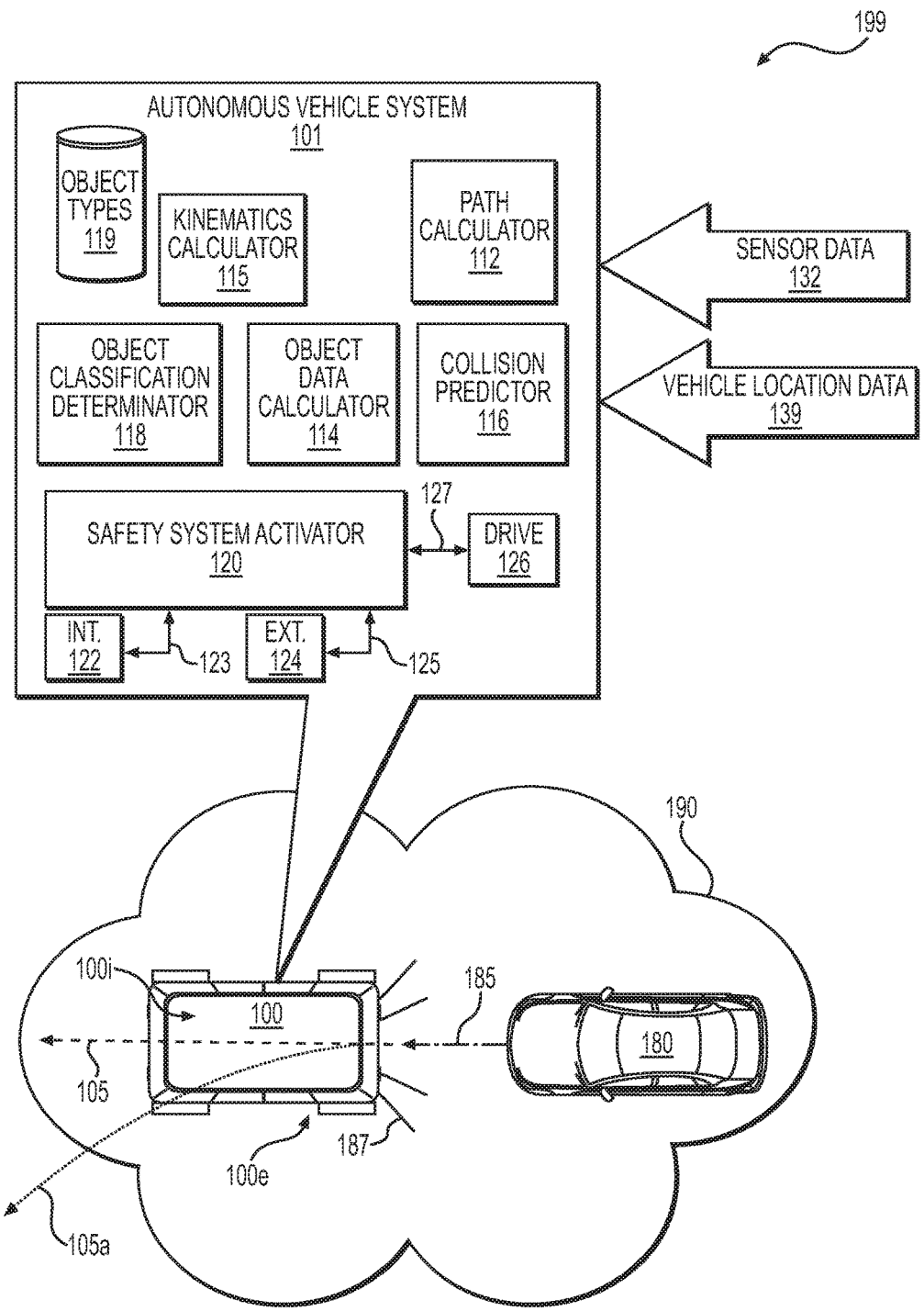
FIG. 1 depicts one example of a system for implementing an active safety system in an autonomous vehicle.

Although the above-described drawings depict various examples of the invention, the invention is not limited by the depicted examples. It is to be understood that, in the drawings, like reference numerals designate like structural elements. Also, it is understood that the drawings are not necessarily to scale.

DETAILED DESCRIPTION

Various embodiments or examples may be implemented in numerous ways, including as a system, a process, a method, an apparatus, a user interface, software, firmware, logic, circuitry, or a series of executable program instructions embodied in a non-transitory computer readable medium. Such as a non-transitory computer readable medium or a computer network where the program instructions are sent over optical, electronic, or wireless communication links and stored or otherwise fixed in a non-transitory computer readable medium. Examples of a non-transitory computer readable medium includes but is not limited to electronic memory, RAM, DRAM, SRAM, ROM, EEPROM, Flash memory, solid-state memory, hard disk drive, and non-volatile memory, for example. One or more non-transitory computer readable mediums may be distributed over a number of devices. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

FIG. 1 depicts one example of a system for implementing an active safety system in an autonomous vehicle. In FIG. 1, an autonomous vehicle 100 (depicted in top plan view) may be travelling through an environment 190 external to the autonomous vehicle 100 along a trajectory 105. For purposes of explanation, environment 190 may include one or more objects that may potentially collide with the autonomous vehicle 100, such as static and/or dynamic objects, or objects that pose some other danger to passengers (not shown) riding in the autonomous vehicle 100 and/or to the autonomous vehicle 100. For example, in FIG. 1, an object 180 (e.g., an automobile) is depicted as having a trajectory 185, that if not altered (e.g., by changing trajectory, slowing down, etc.), may result in a potential collision 187 with the autonomous vehicle 100 (e.g., by rear-ending the autonomous vehicle 100).

Autonomous vehicle 100 may use a sensor system (not shown) to sense (e.g., using passive and/or active sensors) the environment 190 to detect the object 180 and may take action to mitigate or prevent the potential collision of the object 180 with the autonomous vehicle 100. An autonomous vehicle system 101 may receive sensor data 132 from the sensor system and may receive autonomous vehicle location data 139 (e.g., implemented in a localizer system of the autonomous vehicle 100). The sensor data 132 may include but is not limited to data representing a sensor signal (e.g., a signal generated by a sensor of the sensor system). The data representing the sensor signal may be indicative of the environment 190 external to the autonomous vehicle 100. The autonomous vehicle location data 139 may include but is not limited to data representing a location of the autonomous vehicle 100 in the environment 190. As one example, the data representing the location of the autonomous vehicle 100 may include position and orientation data (e.g., a local position or local pose), map data (e.g., from one or more map tiles), data generated by a global positioning system (GPS) and data generated by an inertial measurement unit (IMU). In some examples, a sensor system of the autonomous vehicle 100 may include a global positioning system, an inertial measurement unit, or both.

Autonomous vehicle system 101 may include but is not limited to hardware, software, firmware, logic, circuitry, computer executable instructions embodied in a non-transitory computer readable medium, or any combination of the foregoing, to implement a path calculator 112, an object data calculator 114 (e.g., implemented in a perception system of the autonomous vehicle 100), a collision predictor 116, an object classification determinator 118 and a kinematics calculator 115. Autonomous vehicle system 101 may access one or more data stores including but not limited to an objects type data store 119. Object types data store 119 may include data representing object types associated with object classifications for objects detected in environment 190 (e.g., a variety of pedestrian object types such as "sitting", "standing" or "running", may be associated with objects classified as pedestrians).

Path calculator 112 may be configured to generate data representing a trajectory of the autonomous vehicle 100 (e.g., trajectory 105), using data representing a location of the autonomous vehicle 100 in the environment 190 and other data (e.g., local pose data included in vehicle location data 139), for example. Path calculator 112 may be configured to generate future trajectories to be executed by the autonomous vehicle 100, for example. In some examples, path calculator 112 may be implanted in or as part of a planner system of the autonomous vehicle 100. In other examples, the path calculator 112 and/or the planner system may calculate data associated with a predicted motion of an object in the environment and may determine a predicted object path associated with the predicted motion of the object. In some examples, the object path may constitute the predicted object path. In other examples, the object path may constitute a predicted object trajectory. In yet other examples, the object path (e.g., in the environment) may constitute a predicted object trajectory that may be identical to or similar to a predicted object trajectory.

Object data calculator 114 may be configured to calculate data representing the location of the object 180 disposed in the environment 190, data representing an object track associated with the object 180, and data representing an object classification associated with the object 180, and the like. Object data calculator 114 may calculate the data representing the location of the object, the data representing the object track, and the data representing the object classification using data representing a sensor signal included in sensor data 132, for example. In some examples, the object data calculator 114 may be implemented in or may constitute a perception system, or a portion thereof, being configured to receive the data representing the sensor signal (e.g., a sensor signal from a sensor system).

Object classification determinator 118 may be configured to access data representing object types 119 (e.g., a species of an object classification, a subclass of an object classification, or a subset of an object classification) and may be configured to compare the data representing the object track and the data representing the object classification with the data representing the object types 119 to determine data representing an object type (e.g., a species or subclass of the object classification). As one example, a detected object having an object classification of a "car" may have an object type of "sedan", "coupe", "truck" or "school bus". An object type may include additional subclasses or subsets such as a "school bus" that is parked may have an additional subclass of "static" (e.g. the school bus is not in motion), or an additional subclass of "dynamic" (e.g. the school bus is in motion), for example.

Collision predictor 116 may be configured to use the data representing the object type, the data representing the trajectory of the object and the data representing the trajectory of the autonomous vehicle to predict a collision (e.g., 187) between the autonomous vehicle 100 and the object 180, for example.

A kinematics calculator 115 may be configured to compute data representing one or more scalar and/or vector quantities associated with motion of the object 180 in the environment 190, including but not limited to velocity, speed, acceleration, deceleration, momentum, local pose and force, for example. Data from kinematics calculator 115 may be used to compute other data including but not limited to data representing an estimated time to impact between the object 180 and the autonomous vehicle 100 and data representing a distance between the object 180 and the autonomous vehicle 100, for example. In some examples the kinematics calculator 115 may be configured to predict a likelihood that other objects in the environment 190 (e.g. cars, pedestrians, bicycles, motorcycles, etc.) are in an alert or in-control state, versus an un-alert, out-of-control, or drunk state, etc. As one example, the kinematics calculator 115 may be configured estimate a probability that other agents (e.g., drivers or riders of other vehicles) are behaving rationally (e.g., based on motion of the object they are driving or riding), which may dictate behavior of the autonomous vehicle 100, versus behaving irrationally (e.g. based on erratic motion of the object they are riding or driving). Rational or irrational behavior may be inferred based on sensor data received over time that may be used to estimate or predict a future location of the object relative to a current or future trajectory of the autonomous vehicle 100. Consequently, a planner system of the autonomous vehicle 100 may be configured to implement vehicle maneuvers that are extra cautious and/or activate a safety system of the autonomous vehicle 100, for example.

A safety system activator 120 may be configured to activate one or more safety systems of the autonomous vehicle 100 when a collision is predicted by the collision predictor 116 and/or the occurrence of other safety related events (e.g., an emergency maneuver by the vehicle 100, such as hard braking, sharp acceleration, etc.). Safety system activator 120 may be configured to activate an interior safety system 122, an exterior safety system 124, a drive system 126 (e.g., cause drive system 126 to execute an emergency maneuver to avoid the Collision), or any combination of the foregoing. For example, drive system 126 may receive data being configured to cause a steering system (e.g., set a steering angle or a steering vector for the wheels) and a propulsion system (e.g., power supplied to an electric motor) to alter the trajectory of vehicle 100 from trajectory 105 to a collision avoidance trajectory 105a.

Figure 2A:
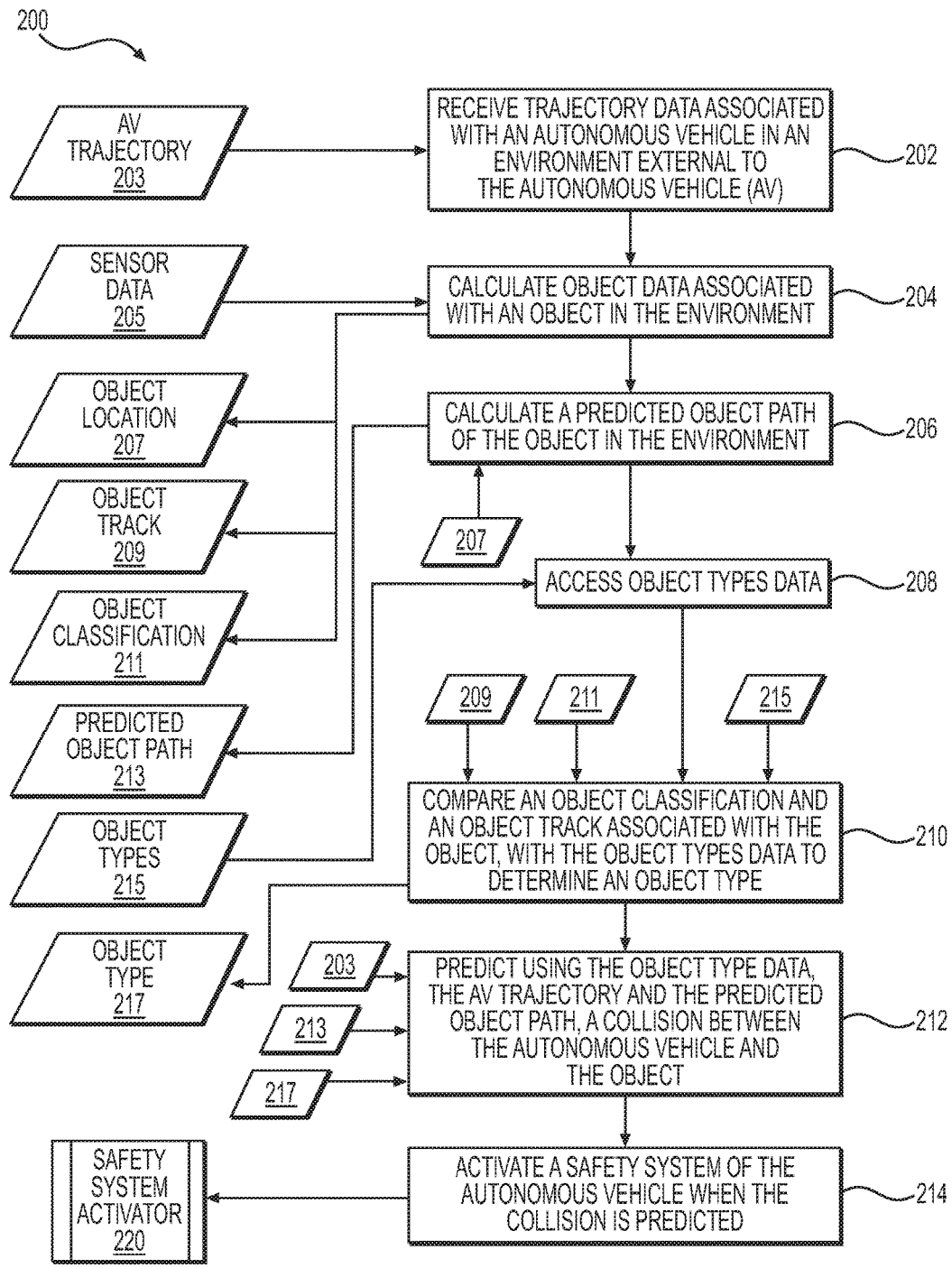
FIG. 2A depicts one example of a flow diagram for implementing an active safety system in an autonomous vehicle.

FIG. 2A depicts one example of a flow diagram 200 for implementing an active safety system in an autonomous vehicle 100. In flow diagram 200, at a stage 202, data representing a trajectory 203 of an autonomous vehicle 100 in an environment external to the autonomous vehicle 100 (e.g., environment 190) may be received (e.g., implemented in a planner system of the autonomous vehicle 100).

At a stage 204, object data associated with an object (e.g., automobile 180) disposed in the environment (e.g., environment 190) may be calculated. Sensor data 205 may be accessed at the stage 204 to calculate the object data. The object data may include but is not limited to data representing object location in the environment, an object track associated with the object (e.g., static for a non-moving object and dynamic for an object in motion), and an object classification (e.g., a label) associated with the object (e.g., pedestrian, dog, cat, bicycle, motorcycle, automobile, truck, etc.). The stage 204 may output one or more types of data associated with an object, including but not limited to data representing object location 207 in the environment, data representing an object track 209, and data representing an object classification 211.

At a stage 206 a predicted object path of the object in the environment may be calculated. As one example, the stage 206 may receive the data representing object location 207 and may process that data to generate data representing a predicted object path 213.

At a stage 208, data representing object types 215 may be accessed, and at a stage 210, data representing an object type 217 may be determined based on the data representing the object track 209, the data representing the object classification 211 and the data representing object types 215. Examples of an object type may include but are not limited to a pedestrian object type having a static object track (e.g., the pedestrian is not in motion), an automobile object type having a dynamic object track (e.g., the automobile is in motion) and an infrastructure object type having a static object track (e.g., a traffic sign, a lane marker, a fire hydrant), etc., just to name a few. The stage 210 may output the data representing object type 217.

At a stage 212 a collision between the autonomous vehicle and the object may be predicted based on the determined object type 217, the autonomous vehicle trajectory 203 and the predicted object path 213. As one example, a collision may be predicted based in part on the determined object type 217 due to the object having an object track that is dynamic (e.g., the object is in motion in the environment), the trajectory of the object being in potential conflict with a trajectory of the autonomous vehicle (e.g., the trajectories may intersect or otherwise interfere with each other), and the object having an object classification 211 (e.g., used in computing the object type 217) that indicates the object is a likely collision threat (e.g., the object is classified as an automobile, a skateboarder, a bicyclists, a motorcycle, etc.).

At a stage 214, a safety system of the autonomous vehicle may be activated when the collision is predicted (e.g., at the stage 212). The stage 214 may activate one or more safety systems of the autonomous vehicle, such as one or more interior safety systems, one or more exterior safety systems, one or more drive systems (e.g., steering, propulsion, braking, etc.) or a combination of the foregoing, for example. The stage 214 may cause (e.g., by communicating data and/or signals) a safety system activator 220 to activate one or more of the safety systems of the autonomous vehicle 100.

Figure 2B:
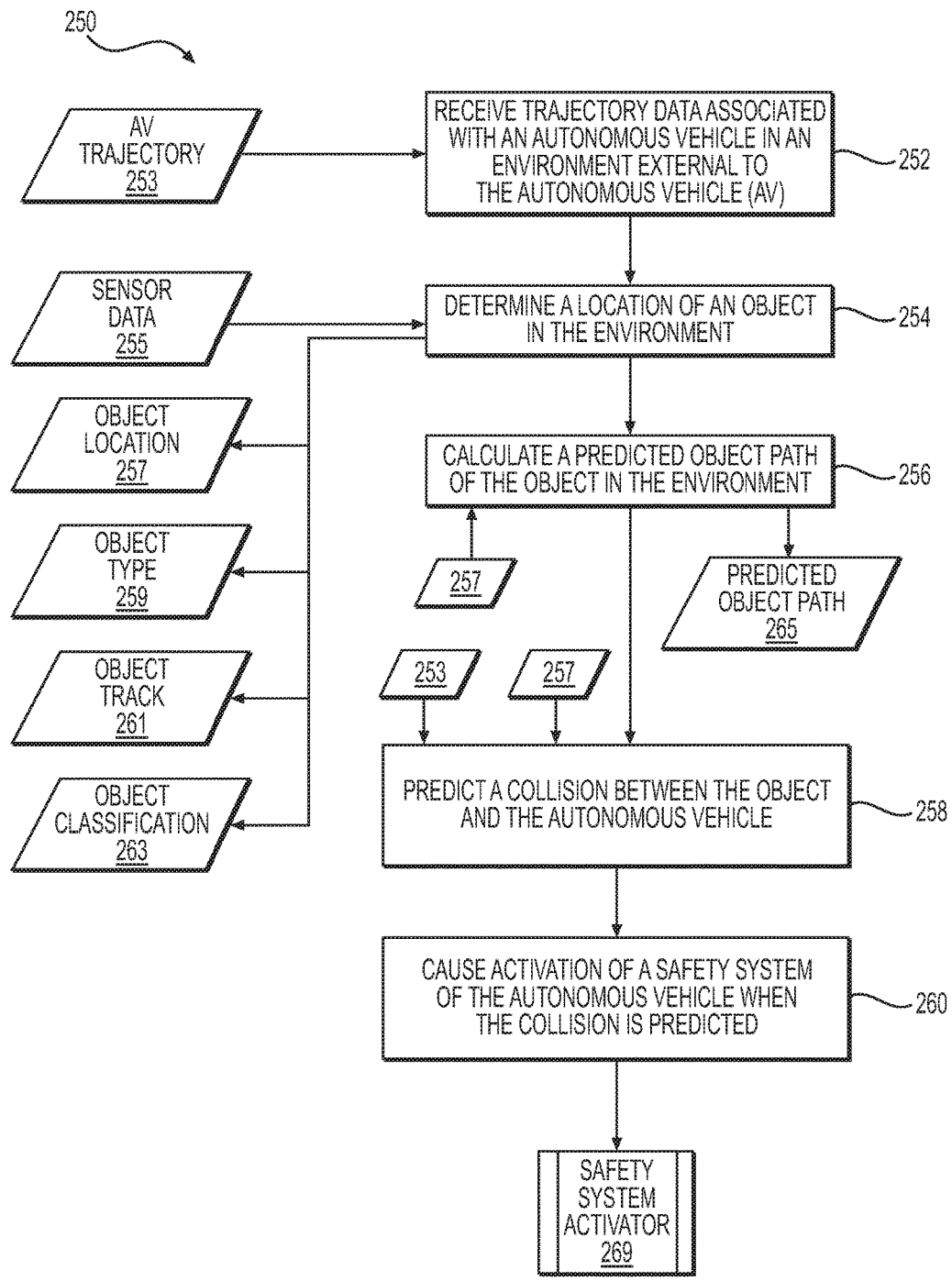
FIG. 2B depicts another example of a flow diagram for implementing an active safety system in an autonomous vehicle.

FIG. 2B depicts another example of a flow diagram 250 for implementing an active safety system in an autonomous vehicle 100. In flow diagram 250, at a stage 252, data representing the trajectory 253 of an autonomous vehicle 100 in an environment external to the autonomous vehicle 100 (e.g., environment 190) may be received (e.g., from a planner system of the autonomous vehicle 100).

At a stage 254, a location of an object in the environment may be determined. Sensor data 255 may be processed (e.g., by a perception system) to determine data representing an object location in the environment 257. Data associated with an object (e.g., object data associated with object 180) in the environment (e.g., environment 190) may be determined at the state 254. Sensor data 255 accessed at the stage 254 may be used to determine the object data. The object data may include but is not limited to data representing a location of the object in the environment, an object track associated with the object (e.g., static for a non-moving object and dynamic for an object in motion), an object classification associated with the object (e.g., pedestrian, dog, cat, bicycle, motorcycle, automobile, truck, etc.) and an object type associated with the object. The stage 254 may output one or more types of data associated with an object, including but not limited to data representing the object location 257 in the environment, data representing an object track 261 associated with the object, data representing an object classification 263 associated with the object, and data representing an object type 259 associated with the object.

At a stage 256 a predicted object path of the object in the environment may be calculated. As one example, the stage 256 may receive the data representing the object location 257 and may process that data to generate data representing a predicted object path 265. In some examples, the data representing the predicted object path 265, generated at the stage 256, may be used as a data input at another stage of flow diagram 250, such as at a stage 258. In other examples, the stage 256 may be bypassed and flow diagram 250 may transition from the stage 254 to the stage 258.

At the stage 258 a collision between the autonomous vehicle and the object may be predicted based the autonomous vehicle trajectory 253 and the object location 265. The object location 257 may change from a first location to a next location due to motion of the object in the environment. For example, at different points in time, the object may be in motion (e.g., has an object track of dynamic "D"), may be motionless (e.g., has an object track of static "S"), or both. However, the perception system may continually track the object (e.g., using sensor data from the sensor system) during those different points in time to determine object location 257 at the different point in times. Due to changes in a direction of motion of the object and/or the object switching between being in motion and being motionless, the predicted object path 265 calculated at the stage 256 may be difficult to determine; therefore the predicted object path 265 need not be used as a data input at the stage 258.

The stage 258 may predict the collision using data not depicted in FIG. 2B, such as object type 259 and predicted object path 265, for example. As a first example, at the stage 258, a collision between the autonomous vehicle and the object may be predicted based on the autonomous vehicle trajectory 253, the object location 257 and the object type 259. As second example, at the stage 258, a collision between the autonomous vehicle and the object may be predicted based on the autonomous vehicle trajectory 253 and the predicted object path 265. As a third example, at the stage 258, a collision between the autonomous vehicle and the object may be predicted based on the autonomous vehicle trajectory 253, the predicted object path 265 and the object type 259.

At a stage 260, a safety system of the autonomous vehicle may be activated when the collision is predicted (e.g., at the stage 258). The stage 260 may activate one or more safety systems of the autonomous vehicle, such as one or more interior safety systems, one or more exterior safety systems, one or more drive systems (e.g., steering, propulsion, braking, etc.) or a combination of the foregoing, for example. The stage 260 may cause (e.g., by communicating data and/or signals) a safety system activator 269 to activate one or more of the safety systems of the autonomous vehicle.

Figure 2C:
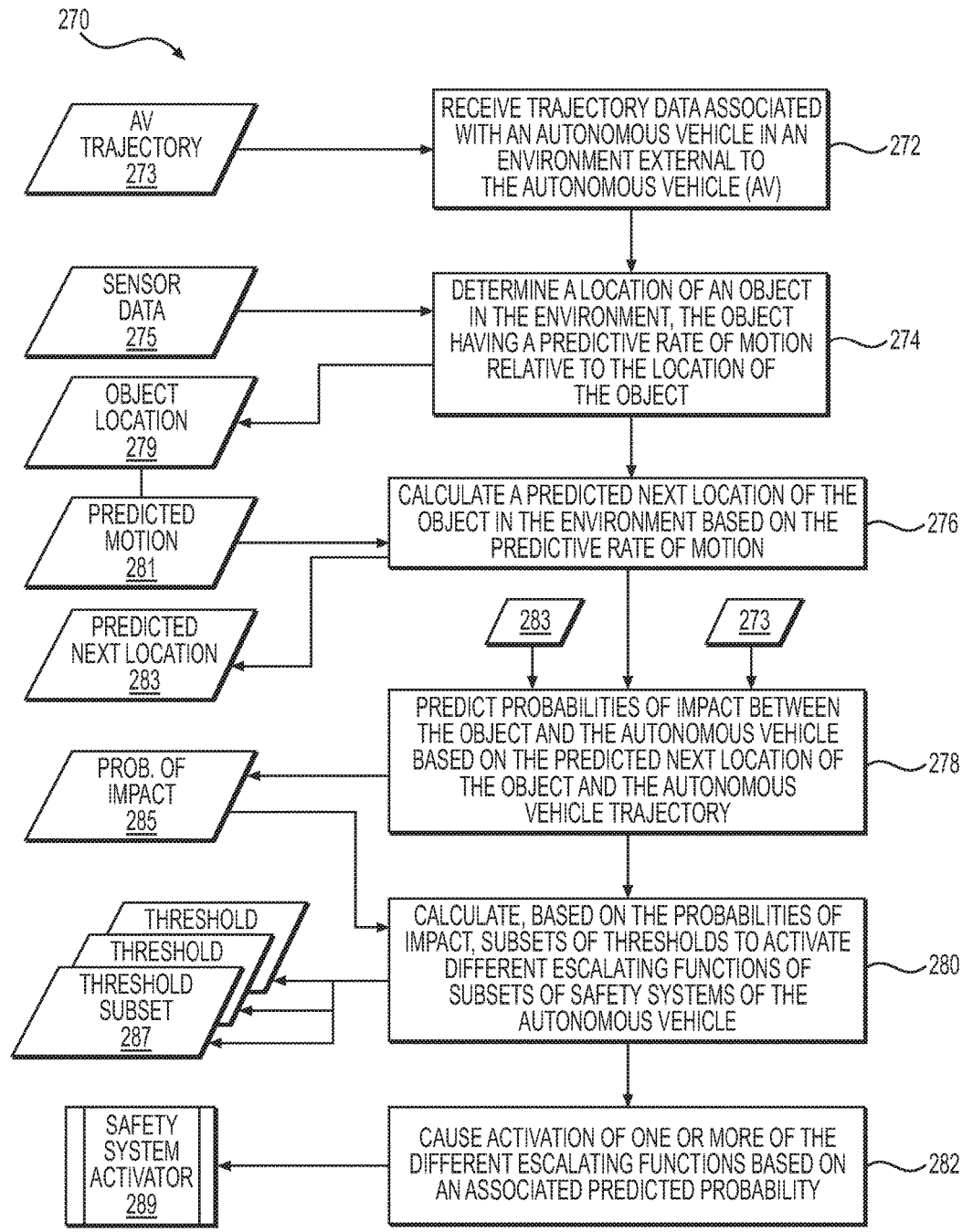
FIG. 2C depicts yet another example of a flow diagram for implementing an active safety system in an autonomous vehicle.

FIG. 2C depicts yet another example of a flow diagram 270 for implementing an active safety system in an autonomous vehicle. At a stage 272, data representing the trajectory 273 of an autonomous vehicle 100 in an environment external to the autonomous vehicle 100 (e.g., environment 190) may be received (e.g., from a planner system of the autonomous vehicle 100).

At a stage 274 a location of an object in the environment may be determined (e.g., by a perception system) using sensor data 275, for example. The stage 274 may generate data representing object location 279. The data representing the object location 279 may include data representing a predicted rate of motion 281 of the object relative to the location of the object in the environment. For example, if the object has a static object track indicative of no motion in the environment, then the predictive rate of motion 281 may be zero. However, if the object track of the object is dynamic and the object classification is an automobile, then the predicted rate of motion 281 may be non-zero.

At a stage 276 a predicted next location of the object in the environment may be calculated based on the predicted rate of motion 281. The stage 276 may generate data representing the predicted next location 283.

At a stage 278, probabilities of impact between the object and the autonomous vehicle may be predicted based on the predicted next location 283 and the autonomous vehicle trajectory 273. The stage 278 may generate data representing the probabilities of impact 285.

At a stage 280, subsets of thresholds (e.g., a location or a distance in the environment) to activate different escalating functions of subsets of safety systems of the autonomous vehicle may be calculated based on the probabilities of impact 285. At least one subset of the thresholds being associated with the activation of different escalating functions of a safety system of the autonomous vehicle. The stage 280 may generate data representing one or more threshold subsets 287. In some examples, the subsets of thresholds may constitute a location relative to the autonomous vehicle or may constitute a distance relative to the autonomous vehicle. For example, a threshold may be a function of a location or a range of locations relative to a reference location (e.g., the autonomous vehicle). Further, a threshold may be a function of distance relative to an object and the autonomous vehicle, or between any objects or object locations, including distances between predicted object locations.

At a stage 282, one or more of the different escalating functions of the safety system may be activated based on an associated predicted probability (e.g., activation of a bladder based on a predicted set of probabilities of impact indicative of an eminent collision). The stage 282 may cause (e.g., by communicating data and/or signals) a safety system activator 289 to activate one or more of the safety systems of the autonomous vehicle based on corresponding one or more sets of probabilities of collision.

Figure 3A:
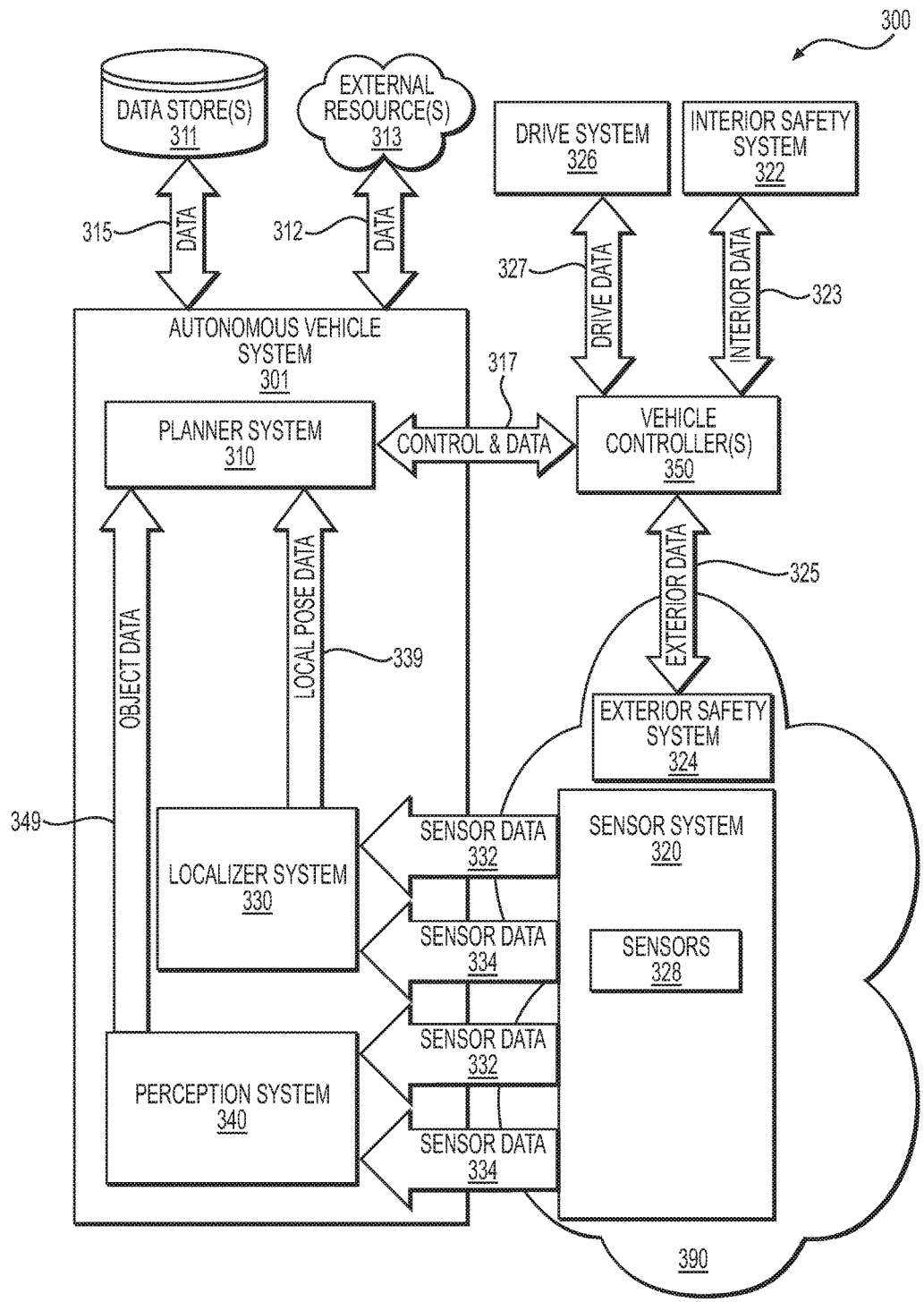
FIG. 3A depicts one example of a system for implementing an active safety system in an autonomous vehicle.

FIG. 3A depicts one example 300 of a system for implementing an active safety system in an autonomous vehicle. In FIG. 3A, autonomous vehicle system 301 may include a sensor system 320 including sensors 328 being configured to sense the environment 390 (e.g., in real-time or in near-real-time) and generate (e.g., in real-time) sensor data 332 and 334 (e.g., data representing a sensor signal).

Autonomous vehicle system 301 may include a perception system 340 being configured to detect objects in environment 390, determine an object track for objects, classify objects, track locations of objects in environment 390, and detect specific types of objects in environment 390, such as traffic signs/lights, road markings, lane markings and the like, for example. Perception system 340 may receive the sensor data 334 from a sensor system 320.

Autonomous vehicle system 301 may include a localizer system 330 being configured to determine a location of the autonomous vehicle in the environment 390. Localizer system 330 may receive sensor data 332 from a sensor system 320. In some examples, sensor data 332 received by localizer system 330 may not be identical to the sensor data 334 received by the perception system 340. For example, perception system 330 may receive data 334 from sensors including but not limited to LIDAR (e.g., 2D, 3D, color LIDAR), RADAR, and Cameras (e.g., image capture devices); whereas, localizer system 330 may receive data 332 including but not limited to global positioning system (GPS) data, inertial measurement unit (IMU) data, map data, route data, Route Network Definition File (RNDF) data and map tile data. Localizer system 330 may receive data from sources other than sensor system 320, such as a data store, data repository, memory, etc. In other examples, sensor data 332 received by localizer system 330 may be identical to the sensor data 334 received by the perception system 340. In various examples, localizer system 330 and perception system 340 mayor may not implement similar or equivalent sensors or types of sensors. Further, localizer system 330 and perception system 340 each may implement any type of sensor data 332 independently of each other.

Perception system 340 may process sensor data 334 to generate object data 349 that may be received by a planner system 310. Object data 349 may include data associated with objects detected in environment 390 and the data may include but is not limited to data representing object classification, object type, object track, object location, predicted object path, predicted object trajectory, and object velocity, for example.

Localizer system 330 may process sensor data 334, and optionally, other data, to generate position and orientation data, local pose data 339 that may be received by the planner system 310. The local pose data 339 may include, but is not limited to, data representing a location of the autonomous vehicle in the environment 390, GPS data, IMU data, map data, route data, Route Network Definition File (RNDF) data, odometry data, wheel encoder data, and map tile data, for example.

Planner system 310 may process the object data 349 and the local pose data 339 to compute a path (e.g., a trajectory of the autonomous vehicle) for the autonomous vehicle through the environment 390. The computed path being determined in part by objects in the environment 390 that may create an obstacle to the autonomous vehicle and/or may pose a collision threat to the autonomous vehicle, for example.

Planner system 310 may be configured to communicate control and data 317 with one or more vehicle controllers 350. Control and data 317 may include information configured to control driving operations of the autonomous vehicle (e.g., steering, braking, propulsion, signaling, etc.) via a drive system 326, to activate one or more interior safety systems 322 of the autonomous vehicle and to activate one or more exterior safety systems 324 of the autonomous vehicle. Drive system 326 may perform additional functions associated with active safety of the autonomous vehicle, such as collision avoidance maneuvers, for example.

Vehicle controller(s) 350 may be configured to receive the control and data 317, and based on the control and data 317, communicate interior data 323, exterior data 325 and drive data 327 to the interior safety system 322, the exterior safety system 324, and the drive system 326, respectively, as determined by the control and data 317, for example. As one example, if planner system 310 determines that the interior safety system 322 is to be activated based on some action of an object in environment 390, then control and data 317 may include information configured to cause the vehicle controller 350 to generate interior data 323 to activate one or more functions of the interior safety system 322.

The autonomous vehicle system 301 and its associated systems 310, 320, 330, 340, 350, 322, 324 and 326 may be configured to access data 315 from a data store 311 (e.g., a data repository) and/or data 312 from an external resource 313 (e.g., the Cloud, the Internet, a wireless network). The autonomous vehicle system 301 and its associated systems 310, 320, 330, 340, 350, 322, 324 and 326 may be configured to access, in real-time, data from a variety of systems and/or data sources including but not limited to those depicted in FIG. 3A. As one example, localizer system 330 and perception system 340 may be configured to access in real-time the sensor data 332 and the sensor data 334. As another example, the planner system 310 may be configured to access in real-time the object data 349, the local pose data 339 and control and data 317. In other examples, the planner system 310 may be configured to access in real-time the data store 311 and/or the external resource 313.

Figure 3B:
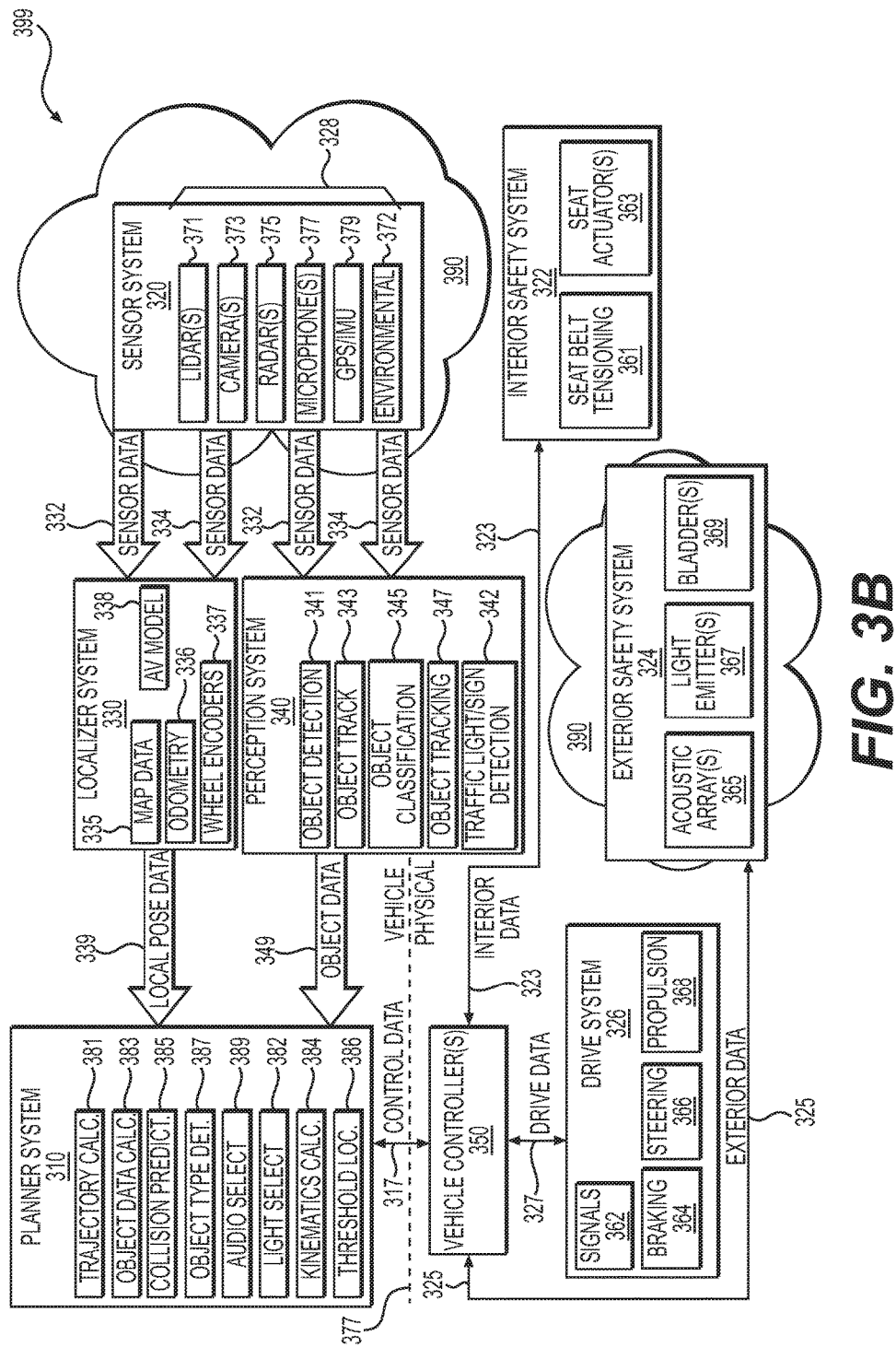
FIG. 3B depicts another example of a system for implementing an active safety system in an autonomous vehicle.

FIG. 3B depicts another example 399 of a system for implementing an active safety system in an autonomous vehicle. In example 399, sensors 328 in sensor system 320 may include but are not limited to one or more of: Light Detection and Ranging sensors 371 (LIDAR); image capture sensors 373 (e.g., Cameras); Radio Detection And Ranging sensors 375 (RADAR); sound capture sensors 377 (e.g., Microphones); Global Positioning System sensors (GPS) and/or Inertial Measurement Unit sensors (IMU) 379; and Environmental sensor(s) 372 (e.g., temperature, barometric pressure), for example. Localizer system 330 and perception system 340 may receive sensor data 332 and/or sensor data 334, respectively, from one or more of the sensors 328. For example, perception system 340 may receive sensor data 334 relevant to determine information associated with objects in environment 390, such as sensor data from LIDAR 371, Cameras 373, RADAR 375, Environmental 372, and Microphones 377; whereas, localizer system 330 may receive sensor data 332 associated with the location of the autonomous vehicle in environment 390, such as from GPSIIMU 379. Further, localizer system 330 may receive data from sources other than the sensor system 320, such as map data, map tile data, route data, Route Network Definition File (RNDF) data, a data store, a data repository, etc., for example. In some examples, sensor data (332,334) received by localizer system 330 may be identical to the sensor data (332, 334) received by the perception system 340. In other examples, sensor data (332, 334) received by localizer system 330 may not be identical to the sensor data (332, 334) received by the perception system 340. Sensor data 332 and 334 each may include data from any combination of one or more sensors or sensor types in sensor system 320. The amounts and types of sensor data 332 and 334 may be independent from the other and mayor may not be similar or equivalent.

As one example, localizer system 330 may receive and/or access data from sources other than sensor data (332, 334) such as odometry data 336 from motion sensors to estimate a change in position of the autonomous vehicle 100 over time, wheel encoders 337 to calculate motion, distance and other metrics of the autonomous vehicle 100 based on wheel rotations (e.g., by propulsion system 368), map data 335 from data representing map tiles, route data, Route Network Definition File (RNDF) data and/or others, and data representing an autonomous vehicle (AV) model 338 that may be used to calculate vehicle location data based on models of vehicle dynamics (e.g., from simulations, captured data, etc.) of the autonomous vehicle 100. Localizer system 330 may use one or more of the data resources depicted to generate data representing local pose data 339.

As another example, perception system 340 may parse or otherwise analyze, process, or manipulate sensor data (332, 334) to implement object detection 341, object track 343 (e.g., determining which detected objects are static (no motion) and which are dynamic (in motion»), object classification 345 (e.g., cars, motorcycle, bike, pedestrian, skate boarder, mailbox, buildings, street lights, etc.), object tracking 347 (e.g., tracking an object based on changes in a location of the object in the environment 390), and traffic light/sign detection 342 (e.g., stop lights, stop signs, rail road crossings, lane markers, pedestrian cross-walks, etc.).

As yet another example, planner system 310 may receive the local pose data 339 and the object data 349 and may parse or otherwise analyze, process, or manipulate data (local pose data 339, object data 349) to implement functions including but not limited to trajectory calculation 381, threshold location estimation 386, audio signal selection 389, light pattern selection 382, kinematics calculation 384, object type detection 387, collision prediction 385 and object data calculation 383, for example. Planner system 310 may communicate trajectory and control data 317 to a vehicle controller(s) 350. Vehicle controller(s) 350 may process the vehicle control and data 317 to generate drive system data 327, interior safety system data 323 and exterior safety system data 325. Drive system data 327 may be communicated to a drive system 326. Drive system 326 may communicate the drive system data 327 to a braking system 364, a steering system 366, a propulsion system 368, and a signal system 362 (e.g., turn signals, brake signals, headlights, and running lights). For example, drive system data 327 may include steering angle data for steering system 366 (e.g., a steering angle for a wheel), braking data for brake system 364 (e.g., brake force to be applied to a brake pad), and propulsion data (e.g., a voltage, current or power to be applied to a motor) for propulsion system 368. A dashed line 377 may represent a demarcation between a vehicle trajectory processing layer and a vehicle physical execution layer where data processed in the vehicle trajectory processing layer is implemented by one or more of the drive system 326, the interior safety system 322 or the exterior safety system 324. As one example, one or more portions of the interior safety system 322 may be configured to enhance the safety of passengers in the autonomous vehicle 100 in the event of a collision and/or other extreme event (e.g., a collision avoidance maneuver by the autonomous vehicle 100). As another example, one or more portions of the exterior safety system 324 may be configured to reduce impact forces or negative effects of the aforementioned collision and/or extreme event.

Interior safety system 322 may have systems including but not limited to a seat actuator system 363 and a seat belt tensioning system 361. Exterior safety system 324 may have systems including but not limited to an acoustic array system 365, a light emitter system 367 and a bladder system 369. Drive system 326 may have systems including but not limited to a braking system 364, a signal system 362, a steering system 366 and a propulsion system 368. Systems in exterior safety system 324 may be configured to interface with the environment 390 by emitting light into the environment 390 using one or more light emitters (not shown) in the light emitter system 367, emitting a steered beam of acoustic energy (e.g., sound) into the environment 390 using one or more acoustic beam-steering arrays (not shown) in the acoustic beam-steering array 365 or by expanding one or more bladders (not shown) in the bladder system 369 from an un-deployed position to a deployed position, or any combination of the foregoing. Further, the acoustic beam-steering array 365 may emit acoustic energy into the environment using transducers, air horns, or resonators, for example. The acoustic energy may be omnidirectional, or may constitute a steered beam, or otherwise focused sound (e.g., a directional acoustic source, a phased array, a parametric array, a large radiator, of ultrasonic source). Accordingly, systems in exterior safety system 324 may be positioned at one or more locations of the autonomous vehicle 100 configured to allow the systems to interface with the environment 390, such as a location associated with an external surface (e.g., 100e in FIG. 1) of the autonomous vehicle 100. Systems in interior safety system 322 may be positioned at one or more locations associated with an interior (e.g., 100i in FIG. 1) of the autonomous vehicle 100 and may be connected with one or more structures of the autonomous vehicle 100, such as a seat, a bench seat, a floor, a rail, a bracket, a pillar, or other structure. The seat belt tensioning system 361 and the seat actuator system 363 may be coupled with one or more structures configured to support mechanical loads that may occur due to a collision, vehicle acceleration, vehicle deceleration, evasive maneuvers, sharp turns, hard braking, etc., for example.

Figure 4:
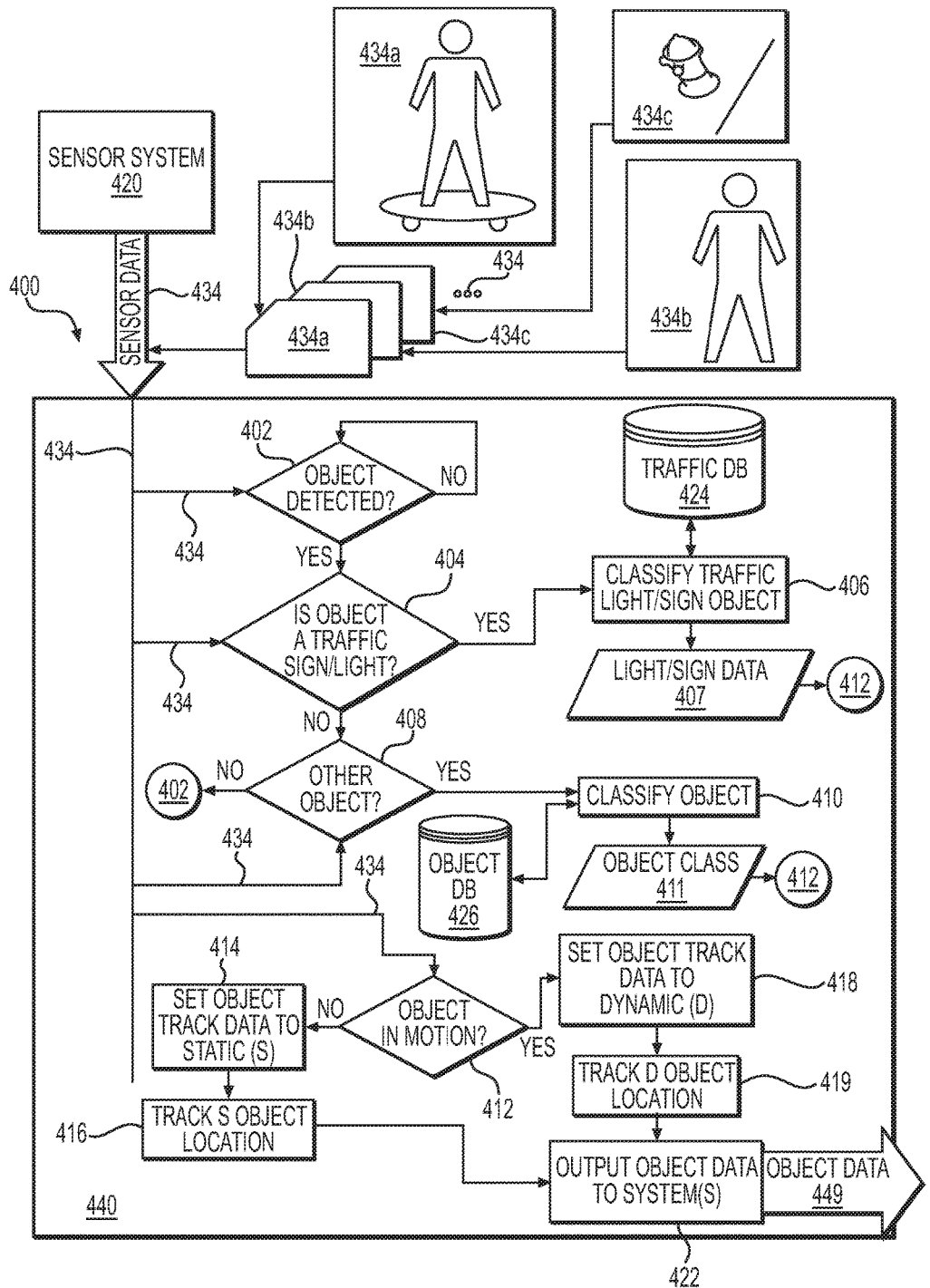
FIG. 4 depicts one example of a flow diagram for implementing a perception system in an autonomous vehicle.

FIG. 4 depicts one example of a flow diagram 400 for implementing a perception system in an autonomous vehicle. In FIG. 4, sensor data 434 (e.g., generated by one or more sensors in sensor system 420) received by perception system 440 is depicted visually as sensor data 434a-434c (e.g., LIDAR data, color LIDAR data, 3D LIDAR data). At a stage 402 a determination may be made as to whether or not the sensor data 434 includes data representing a detected object. If a NO branch is taken, then flow diagram 400 may return to the stage 402 to continue analysis of sensor data 434 to detect object in the environment. If a YES branch is taken, then flow diagram 400 may continue to a stage 404 where a determination may be made as to whether or not the data representing the detected object includes data representing a traffic sign or light. If a YES branch is taken, then flow diagram 400 may transition to a stage 406 where the data representing the detected object may be analyzed to classify the type of light/sign object detected, such as a traffic light (e.g., red, yellow, and green) or a stop sign (e.g., based on shape, text and color), for example. Analysis at the stage 406 may include accessing a traffic object data store 424 where examples of data representing traffic classifications may be compared with the data representing the detected object to generate data representing a traffic classification 407. The stage 406 may then transition to another stage, such as a stage 412. In some examples, the stage 404 may be optional, and the stage 402 may transition to a stage 408.

If a NO branch is taken from the stage 404, then flow diagram 400 may transition to the stage 408 where the data representing the detected object may be analyzed to determine other object types to be classified. If a YES branch is taken, then flow diagram 400 may transition to a stage 410 where the data representing the detected object may be analyzed to classify the type of object. An object data store 426 may be accessed to compare stored examples of data representing object classifications with the data representing the detected object to generate data representing an object classification 411. The stage 410 may then transition to another stage, such as a stage 412. If a NO branch is taken from the stage 408, then stage 408 may transition to another stage, such as back to the stage 402.

At the stage 412, object data classified at the stages 406 and/or 410 may be analyzed to determine if the sensor data 434 indicates motion associated with the data representing the detected object. If motion is not indicated, then a NO branch may be taken to a stage 414 where data representing an object track for the detected object may be set to static (5). At a stage 416, data representing a location of the object (e.g., the static object) may be tracked. For example, a stationary object detected at time to may move at a later time t1 and become a dynamic object. Moreover, the data representing the location of the object may be included in data received by the planner system (e.g., planner system 310 in FIG. 3B). The planner system may use the data representing the location of the object to determine a coordinate of the object (e.g., a coordinate relative to autonomous vehicle 100).

On the other hand, if motion is indicated in the detected object, a YES branch may be taken to a stage 418 where data representing an object track for the detected object may be set to dynamic (0). At a stage 419, data representing a location of the object (e.g., the dynamic object) may be tracked. The planner system may analyze the data representing the object track and/or the data representing the location of the object to determine if a detected object (static or dynamic) may potentially have a conflicting trajectory with respect to the autonomous vehicle and/or come into too close a proximity of the autonomous vehicle, such that an alert (e.g., from a light emitter and/or from an acoustic beam-steering array) may be used to alter a behavior of the object and/or the person controlling the object.

At a stage 422, one or more of the data representing the object classification, the data representing the object track, and the data representing the location of the object, may be included with the object data 449 (e.g., the object data received by the planner system). As one example, sensor data 434a may include data representing an object (e.g., a person riding a skateboard). Stage 402 may detect the object in the sensor data 434a. At the stage 404, it may be determined that the detected object is not a traffic sign/light. The stage 408 may determine that the detected object is of another class and may analyze at a stage 410, based on data accessed from object data store 426, the data representing the object to determine that the classification matches a person riding a skateboard and output data representing the object classification 411. At the stage 412 a determination may be made that the detected object is in motion and at the stage 418 the object track may be set to dynamic (D) and the location of the object may be tracked at the stage 419 (e.g., by continuing to analyze the sensor data 434a for changes in location of the detected object). At the stage 422, the object data associated with sensor data 434 may include the classification (e.g., a person riding a skateboard), the object track (e.g., the object is in motion), the location of the object (e.g., the skateboarder) in the environment external to the autonomous vehicle) and object tracking data for example.

Similarly, for sensor data 434b, flow diagram 400 may determine that the object classification is a pedestrian, the pedestrian is in motion (e.g., is walking) and has a dynamic object track, and may track the location of the object (e.g., the pedestrian) in the environment, for example. Finally, for sensor data 434c, flow diagram 400 may determine that the object classification is a fire hydrant, the fire hydrant is not moving and has a static object track, and may track the location of the fire hydrant. Note, that in some examples, the object data 449 associated with sensor data 434a, 434b, and 434c may be further processed by the planner system based on factors including but not limited to object track, object classification and location of the object, for example. As one example, in the case of the skateboarder and the pedestrian, the object data 449 may be used for one or more of trajectory calculation, threshold location estimation, motion prediction, location comparison, and object coordinates, in the event the planner system decides to implement an alert (e.g., by an exterior safety system) for the skateboarder and/or the pedestrian. However, the planner system may decide to ignore the object data for the fire hydrant due its static object track because the fire hydrant is not likely to have a motion (e.g., it is stationary) that will conflict with the autonomous vehicle and/or because the fire hydrant is non-animate (e.g., can't respond to or be aware of an alert, such as emitted light and/or beam steered sound), generated by an exterior safety system of the autonomous vehicle), for example.

Figure 5:
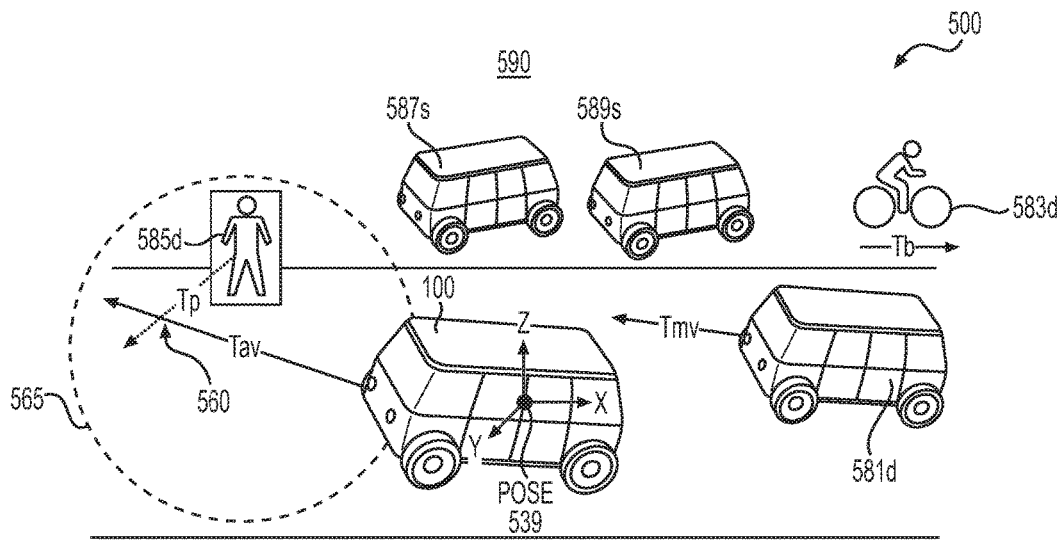
FIG. 5 depicts one example of object prioritization by a planner system in an autonomous vehicle.

FIG. 5 depicts one example 500 of object prioritization by a planner system in an autonomous vehicle. Example 500 depicts a visualization of an environment 590 external to the autonomous vehicle 100 as sensed by a sensor system of the autonomous vehicle 100 (e.g., sensor system 320 of FIG.

3B). Object data from a perception system of the autonomous vehicle 100 may detect several objects in environment 590 including but not limited to an automobile 581 *d*, a bicycle rider 583*d*, a walking pedestrian 585*d*, and two parked automobiles 587*s* and 589*s*. In this example, a perception system may have assigned (e.g., based on sensor data 334 of FIG. 3B) dynamic "D" object tracks to objects 581*d*, 583*d* and 585*d*, thus the label "d" is associated with the reference numerals for those objects. The perception system may also have assigned (e.g., based on sensor data 334 of FIG. 3B) static "S" object tracks to objects 587*s* and 589*s*, thus the label "s" is associated with the reference numerals for those objects.

A localizer system of the autonomous vehicle may determine the local pose data 539 for a location of the autonomous vehicle 100 in environment 590 (e.g., X, Y, Z coordinates relative to a location on vehicle 100 or other metric or coordinate system). In some examples, the local pose data 539 may be associated with a center of mass (not shown) or other reference point of the autonomous vehicle 100. Furthermore, autonomous vehicle 100 may have a trajectory Tav as indicated by the arrow. The two parked automobiles 587*s* and 589*s* are static and have no indicated trajectory. Bicycle rider 583*d* has a trajectory Tb that is in a direction approximately opposite that of the trajectory Tav, and automobile 581*d* has a trajectory Tmv that is approximately parallel to and in the same direction as the trajectory Tav. Pedestrian 585*d* has a trajectory Tp that is predicted to intersect the trajectory Tav of the vehicle 100. Motion and/or position of the pedestrian 585*d* in environment 590 or other objects in the environment 590 may be tracked or otherwise determined using metrics other than trajectory, including but not limited to object location, predicted object motion, object coordinates, predictive rate of motion relative to the location of the object, and a predicted next location of the object, for example. Motion and/or position of the pedestrian 585*d* in environment 590 or other objects in the environment 590 may be determined, at least in part, due to probabilities. The probabilities may be based on data representing object classification, object track, object location, and object type, for example. In some examples, the probabilities may be based on previously observed data for similar objects at a similar location. Further, the probabilities may be influenced as well by time of day or day of the week, or other temporal units, etc. As one example, the planner system may learn that between about 3:00 pm and about 4:00 pm, on weekdays, pedestrians at a given intersection are 85% likely to cross a street in a particular direction.

The planner system may place a lower priority on tracking the location of static objects 587*s* and 589*s* and dynamic object 583*d* because the static objects 587*s* and 589*s* are positioned out of the way of trajectory Tav (e.g., objects 587*s* and 589*s* are parked) and dynamic object 583*d* (e.g., an object identified as a bicyclist) is moving in a direction away from the autonomous vehicle 100; thereby, reducing or eliminating a possibility that trajectory Tb of object 583*d* may conflict with trajectory Tav of the autonomous vehicle 100.

However, the planner system may place a higher priority on tracking the location of pedestrian 585*d* due to its potentially conflicting trajectory Tp, and may place a slightly lower priority on tracking the location of automobile 581*d* because its trajectory Tmv is not presently conflicting with trajectory Tav, but it may conflict at a later time (e.g., due to a lane change or other vehicle maneuver). Therefore, based on example 500, pedestrian object 585*d* may be a likely candidate for an alert (e.g., using steered sound and/or emitted light) or other safety system of the autonomous vehicle 100, because the path of the pedestrian object 585*d* (e.g., based on its location and/or predicted motion) may result in a potential collision (e.g., at an estimated location 560) with the autonomous vehicle 100 or result in an unsafe distance between the pedestrian object 585*d* and the autonomous vehicle 100 (e.g., at some future time and/or location). A priority placed by the planner system on tracking locations of objects may be determined, at least in part, on a cost function of trajectory generation in the planner system. Objects that may be predicted to require a change in trajectory of the autonomous vehicle 100 (e.g., to avoid a collision or other extreme event) may be factored into the cost function with greater significance as compared to objects that are predicted to not require a change in trajectory of the autonomous vehicle 100, for example.

The planner system may predict one or more regions of probable locations 565 of the object 585*d* in environment 590 based on predicted motion of the object 585*d* and/or predicted location of the object. The planner system may estimate one or more threshold locations (e.g., threshold boundaries) within each region of probable locations 565. The threshold location may be associated with one or more safety systems of the autonomous vehicle 100. The number, distance and positions of the threshold locations may be different for different safety systems of the autonomous vehicle 100. A safety system of the autonomous vehicle 100 may be activated at a parametric range in which a collision between an object and the autonomous vehicle 100 is predicted. The parametric range may have a location within the region of probable locations (e.g., within 565). The parametric range may be based in part on parameters such as a range of time and/or a range of distances. For example, a range of time and/or a range of distances in which a predicted collision between the object 585*d* and the autonomous vehicle 100 may occur. In some examples, being a likely candidate for an alert by a safety system of the autonomous vehicle 100 does not automatically result in an actual alert being issued (e.g., as determine by the planner system). In some examples, am object may be a candidate when a threshold is met or surpassed. In other examples, a safety system of the autonomous vehicle 100 may issue multiple alerts to one or more objects in the environment external to the autonomous vehicle 100. In yet other examples, the autonomous vehicle 100 may not issue an alert even though an object has been determined to be a likely candidate for an alert (e.g., the planner system may have computed an alternative trajectory, a safe-stop trajectory or a safe-stop maneuver that obviates the need to issue an alert).

Figure 6:
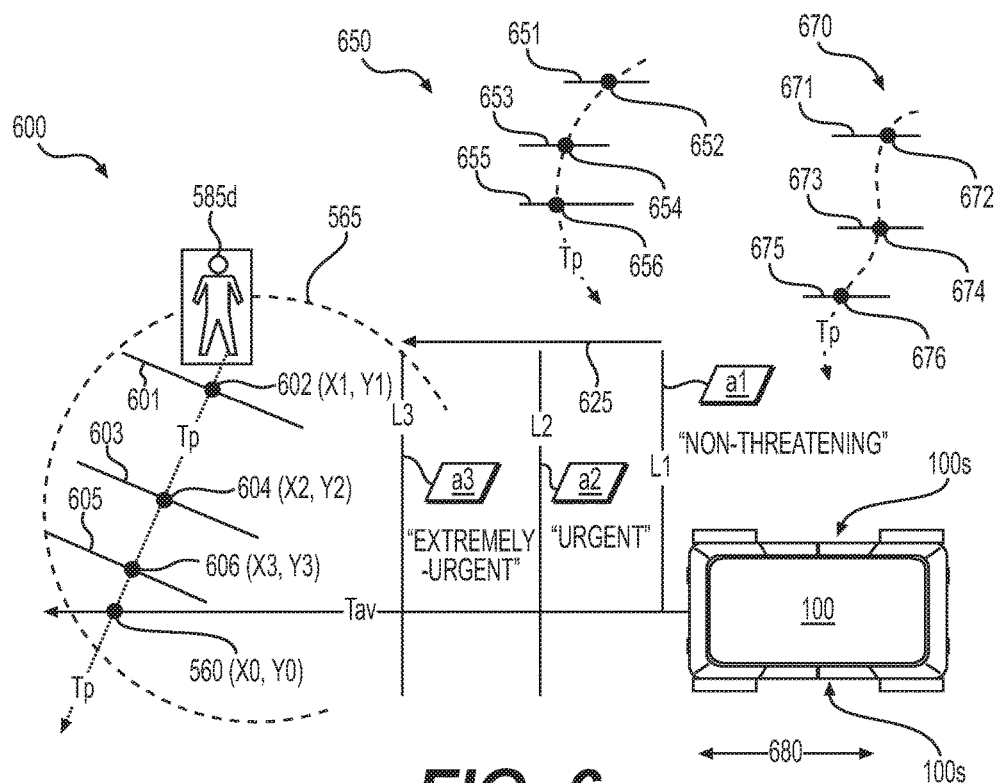
FIG. 6 depicts a top plan view of one example of threshold locations and associated escalating alerts in an active safety system in an autonomous vehicle.

FIG. 6 depicts a top plan view of one example 600 of threshold locations and associated escalating alerts in an active safety system in an autonomous vehicle. In FIG. 6, the example 500 of FIG. 5 is further illustrated in top plan view where trajectory Tav and Tp are estimated to cross (e.g., based on location data for the vehicle 100 and the pedestrian object 585*d*) at an estimated location denoted as 560. Pedestrian object 585*d* is depicted in FIG. 6 based on pedestrian object 585*d* being a likely candidate for an alert (e.g., visual and/or acoustic) based on its predicted motion. The pedestrian object 585*d* is depicted having a location that is within the region of probable locations 565 that was estimated by the planner system. Autonomous vehicle 100 may be configured to travel bi-directionally as denoted by arrow 680, that is, autonomous vehicle 100 may not have a front (e.g., a hood) or a back (e.g., a trunk) as in a conventional automobile. Note while FIG. 6 and other figures may describe implementations as applied to bidirectional vehicles, the functions and/or structures need not be so limiting and may be applied to any vehicle, including unidirectional vehicles. Accordingly, sensors of the sensor system and safety systems may be positioned on vehicle 100 to provide sensor and alert coverage in more than one direction of travel of the vehicle 100 and/or to provide sensor, and alert coverage for objects that approach the vehicle 100 from its sides 1005 (e.g., one or more sensors 328 in sensor system 330 in FIG. 38 may include overlapping regions of sensor coverage). The planner system may implement a safe-stop maneuver or a safe-stop trajectory using the bi-directional 680 travel capabilities to avoid a collision with an object, for example. As one example, the autonomous vehicle 100 may be traveling in a first direction, come to a stop, and begin travel in a second direction that is opposite the first direction, and may maneuver to a safe-stop location to avoid a collision or other extreme event. The planner system may estimate one or more threshold locations (e.g., threshold boundaries, which may be functions of distances, etc.) in the environment 590, denoted as 601, 603 and 605, at which to issue an alert when the location of the object (e.g., pedestrian object 585d) coincides with the threshold locations as denoted by points of coincidence 602, 604 and 606. Although three threshold locations are depicted, there may be more or fewer than depicted. As a first example, as the trajectory Tp crosses the first threshold location 601 at a point denoted as 602, planner system may determine the location of the pedestrian object 585d at the point 602 (e.g., having coordinates X1, Y1 of either a relative or an absolute reference frame) and the coordinates of a location of the autonomous vehicle 100 (e.g., from local pose data). The location data for the autonomous vehicle 100 and the object (e.g., object 585d) may be used to calculate a location (e.g., coordinates, an angle, a polar coordinate) for the direction of propagation (e.g., a direction of the main lobe or focus of the beam) of a beam of steered acoustic energy (e.g., an audio alert) emitted by an acoustic beam-steering array (e.g., one or more of a directional acoustic source, a phased array, a parametric array, a large radiator, a ultrasonic source, etc.), may be used to determine which light emitter to activate for a visual alert, may be used to determine which bladder(s) to activate prior to a predicted collision with an object, and may be used to activate other safety systems and/or the drive system of the autonomous vehicle 100, or any combination of the foregoing. As the autonomous vehicle 100 continues to travel in a direction 625 along trajectory Tav, from location L1 to location L2, the relative locations of the pedestrian object 585d and the autonomous vehicle 100 may change, such that at the location L2, the object 585d has coordinates (X2, Y2) at point 604 of the second threshold location 603. Similarly, continued travel in the direction 625 along trajectory Tav, from location L2 to location L3, may change the relative locations of the pedestrian object 585d and the autonomous vehicle 100, such that at the location L3, the object 585d has coordinates (X3, Y3) at point 606 of the third threshold location 605.

As the distance between the autonomous vehicle 100 and the pedestrian object 585d decreases, the data representing the alert selected for a safety system may be different to convey an increasing sense of urgency (e.g., an escalating threat level) to the pedestrian object 585d to change or halt its trajectory Tp, or otherwise modify his/her behavior to avoid a potential collision or close pass with the vehicle 100. As one example, the data representing the alert selected for threshold location 601, when the vehicle 100 may be at a relatively safe distance from the pedestrian object 585d, may be a less alarming nonthreatening alert a1 configured to garner the attention of the pedestrian object 585d in a non-threatening manner. As a second example, the data representing the alert selected for threshold location 603, when the vehicle 100 may be at a cautious distance from the pedestrian object 585d, may be a more aggressive urgent alert a2 configured to gain the attention of the pedestrian object 585d in a more urgent manner. As a third example, the data representing the alert selected for threshold location 605, when the vehicle 100 may be at a potentially un-safe distance from the pedestrian object 585d, may be a very aggressive extremely urgent alert a3 configured to gain the attention of the pedestrian object 585d in an extremely urgent manner. As the distance between the autonomous vehicle 100 and the pedestrian object 585d decreases, the data representing the alerts may be configured to convey an increasing escalation of urgency to pedestrian object 585d (e.g., escalating acoustic and/or visual alerts to gain the attention of pedestrian object 585d). Estimation of positions of the threshold locations in the environment 590 may be determined by the planner system to provide adequate time (e.g., approximately 5 seconds or more), based on a velocity of the autonomous vehicle, before the vehicle 100 arrives at a predicted impact point 560 with the pedestrian object 585d (e.g., a point 560 in environment 590 where trajectories Tav and Tp are estimated to intersect each other). Point 560 may change as the speed and/or location of the object 585d, the vehicle 100, or both changes. In some examples, in concert with implementing active alerts (e.g., acoustic and/or visual alerts), the planner system of the autonomous vehicle 100 may be configured to actively attempt to avoid potential collisions (e.g., by calculating alternative collision avoidance trajectories and executing one or more of those trajectories) by calculating (e.g., continuously) safe trajectories (e.g., when possible based on context), while simultaneously, issuing alerts as necessary to objects in the environment when there is a meaningful probability the objects may collide or otherwise pose a danger to the safety of passengers in the autonomous vehicle 100, to the object, or both.

In FIG. 6, trajectory Tp of the pedestrian object 585d need not be a straight line as depicted and the trajectory (e.g., the actual trajectory) may be an arcuate trajectory as depicted in example 650 or may be a non-linear trajectory as depicted in example 670. Points 652, 654 and 656 in example 650 and points 672, 674 and 676 in example 670, depict points where the trajectory Tp intersects threshold locations 651, 653 and 655 and threshold locations 671, 673 and 675, respectively. The planner system may process object data from the perception system and local pose data from the localizer system to calculate the threshold location(s). The location, shape (e.g., linear, arcuate, non-linear), orientation (e.g., with respect to the autonomous vehicle and/or object) and other characteristics of the threshold location may be application dependent and is not limited to the examples depicted herein. For example, in FIG. 6, threshold locations (601, 603 and 605) in example 600 are aligned approximately perpendicular to the trajectory Tp of pedestrian object 585d; however, other configurations and orientations may be calculated and implemented by the planner system (e.g., see examples 650 and 670). As another example, threshold locations may be aligned approximately perpendicular (or other orientation) to the trajectory Tav of the autonomous vehicle 100. Furthermore, the trajectory of the object may be analyzed by the planner system to determine the configuration of the threshold location(s). As one example, if the object is on a trajectory that is parallel to the trajectory of the autonomous vehicle 100, then the threshold location(s) may have an arcuate profile and may be aligned with the trajectory of the object.

Figure 7:
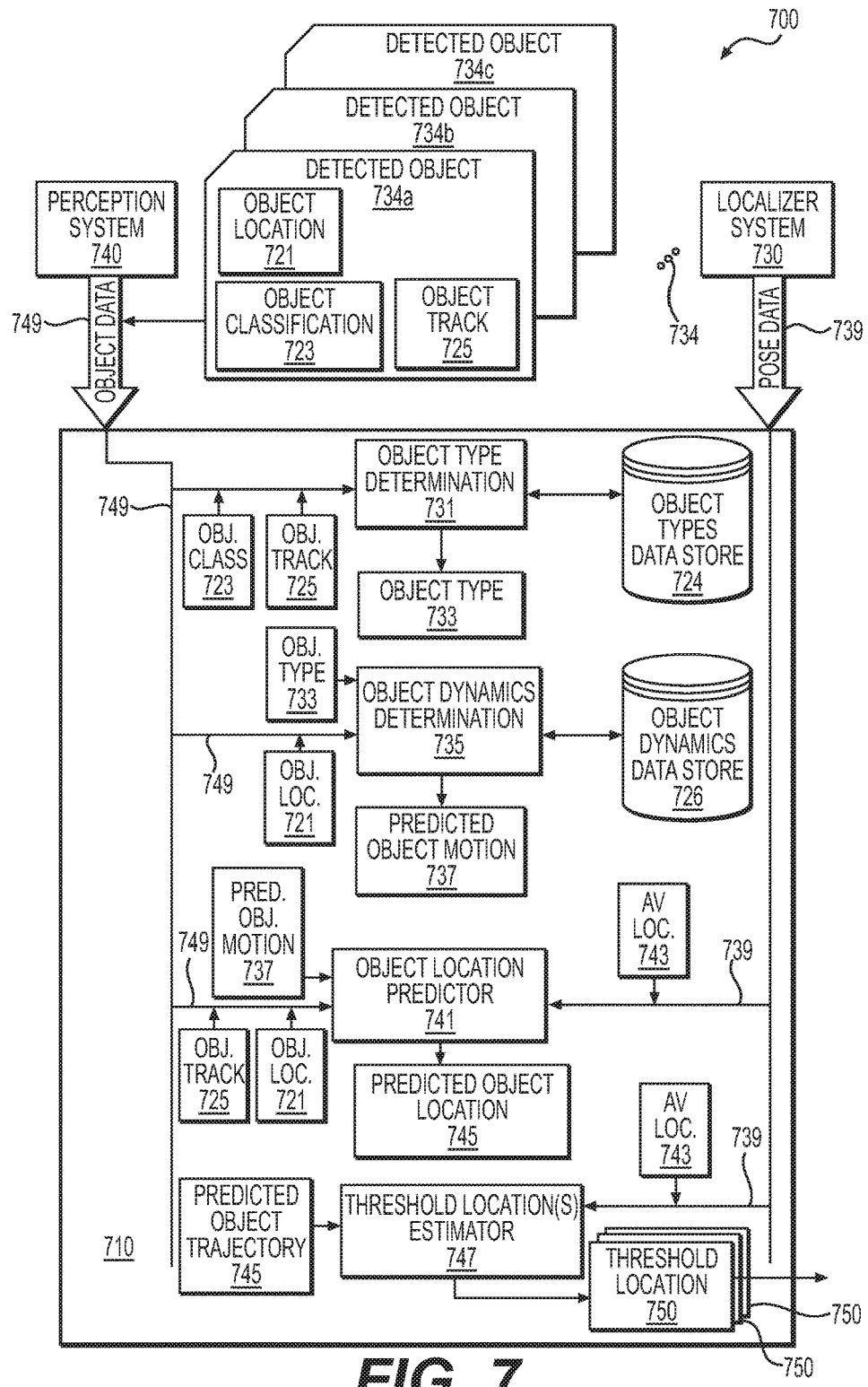
FIG. 7 depicts one example of a flow diagram for implementing a planner system in an autonomous vehicle.

FIG. 7 depicts one example of a flow diagram 700 for implementing a planner system in an autonomous vehicle. In FIG. 7, planner system 710 may be in communication with a perception system 740 from which it receives object data 749, and a localizer system 730 from which it receives local pose data 739. Object data 749 may include data associated with one or more detected objects. For example, in a typical scenario, object data 749 may include data associated with a large number of detected objects in the environment external to the autonomous vehicle 100. However, some detected objects need not be tracked or may be assigned a lower priority based on the type of object. For example, fire hydrant object 434*c* in FIG. 4 may be a static object (e.g., fixed to the ground) and may not require processing for an alert or activation of other safety systems; whereas, skateboarder object 434*a* may require processing for an alert (e.g., using emitted light, steered sound or both) due to it being a dynamic object and other factors, such as predicted human behavior of skateboard riders, a location of the skateboarder object 434*a* in the environment that may indicate the location (e.g., a predicted location) may conflict with a trajectory of the autonomous vehicle 100, for example.

Further to FIG. 7, an example of three detected objects is denoted as 734*a*-734*c*. There may be object data 749 for more or fewer detected objects as denoted by 734. The object data for each detected object may include but is not limited to data representing: object location 721; object classification 723; and object track 725. Planner system 710 may be configured to implement object type determination 731. Object type determination 731 may be configured to receive the data representing object classification 723, the data representing the object track 725 and data representing object types that may be accessed from an object types data store 724. The object type determination 731 may be configured to compare the data representing the object classification 723 and the data representing the object track 725 with data representing object types (e.g., accessed from data store 724) to determine data representing an object type 733. Examples of data representing an object type 733 may include but are not limited to a static grounded object type (e.g., the fire hydrant 434*c* of FIG. 4) and a dynamic pedestrian object (e.g., pedestrian object 585*d* of FIG. 5).

Object dynamics determination 735 may be configured to receive the data representing the object type 733 and the data representing the object location 721. Object dynamics determination 735 may be further configured to access an object dynamics data store 726. Object dynamics data store 726 may include data representing object dynamics. Object dynamics determination 735 may be configured to compare data representing object dynamics with the data representing the object type 733 and the data representing the object location 721 to determine data representing a predicted object motion 737.

Object location predictor 741 may be configured to receive the data representing the predicted object motion 737, the data representing the location of the autonomous vehicle 743 (e.g., from local pose data 739), the data representing the object location 721 and the data representing the object track 725. The object location predictor 741 may be configured to process the received data to generate data representing a predicted object location 745 in the environment. Object location predictor 741 may be configured to generate data representing more than one predicted object location 745. The planner system 710 may generate data representing regions of probable locations (e.g., 565 in FIGS. 5 and 6) of an object.

Figure 8:
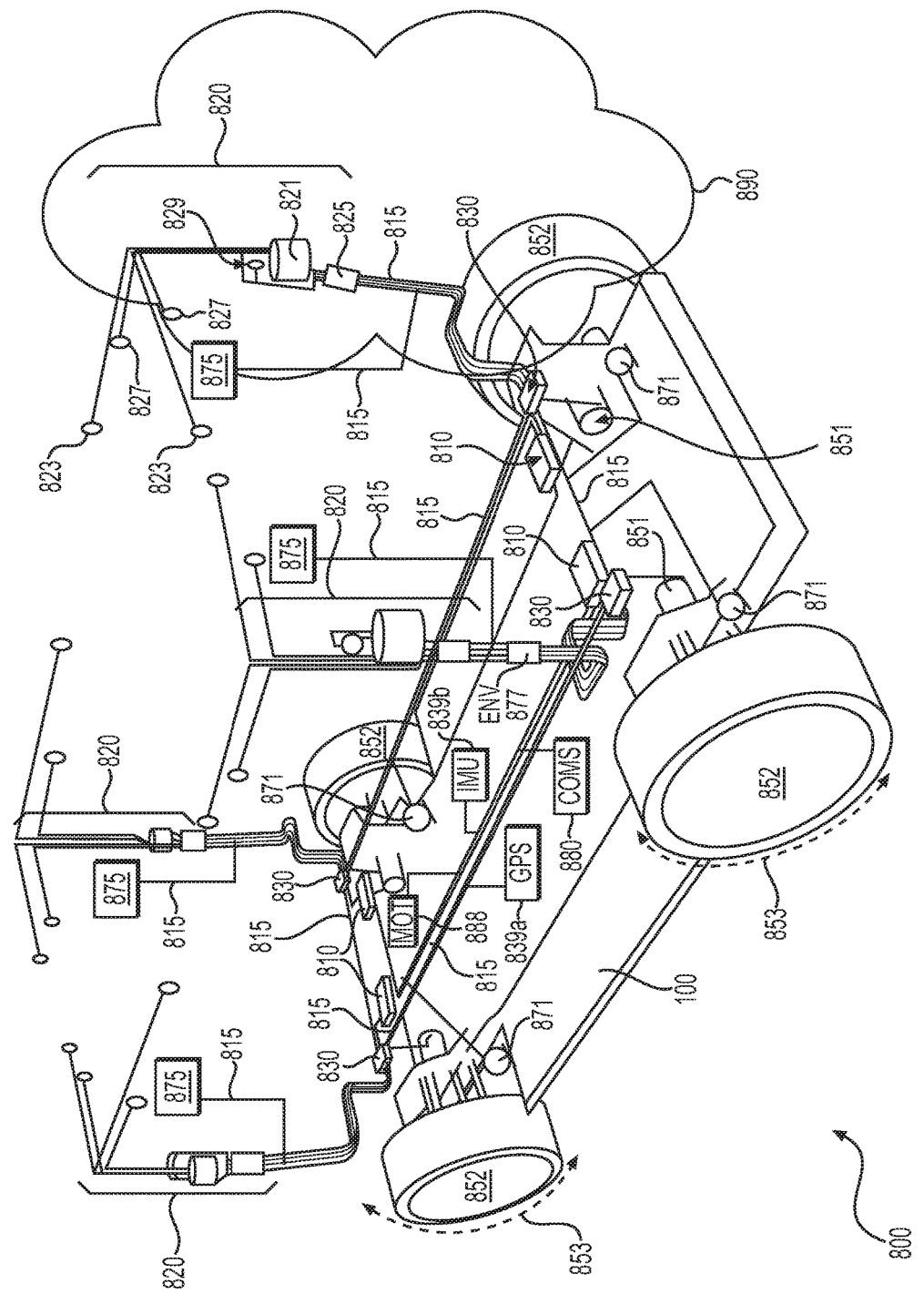
FIG. 8 depicts one example of a block diagram of systems in an autonomous vehicle.

Threshold location estimator 747 may be configured to receive the data representing the location of the autonomous vehicle 743 (e.g., from local pose data 739) and the data representing the predicted object location 745 and generate data representing one or more threshold locations 750 in the environment associated with an alert to be triggered (e.g., a visual alert and/or an acoustic alert), or associated with activation of one or more safety systems of vehicle 100, for example. The one or more threshold locations 750 may be located with the regions of probable locations (e.g., 601, 603 and 605 within 565 in FIG. 6). FIG. 8 depicts one example 800 of a block diagram of systems in an autonomous vehicle. In FIG. 8, the autonomous vehicle 100 may include a suite of sensors 820 positioned at one or more locations on the autonomous vehicle 100. Each suite 820 may have sensors including but not limited to LIDAR 821 (e.g., color LIDAR, three-dimensional color LIDAR, two-dimensional LIDAR, etc.), an image capture device 823 (e.g., a digital camera), RADAR 825, a microphone 827 (e.g., to capture ambient sound), and a loudspeaker 829 (e.g., to greet/communicate with passengers of the AV 100). Microphones 871 (e.g., to may be configured to capture sound from drive system components such as propulsion systems and/or braking systems) and may be positioned at suitable locations proximate to drive system components to detect sound generated by those components, for example. Each suite of sensors 820 may include more than one of the same types of sensor, such as two image capture devices microphone 871 positioned proximate to each wheel 852, for example. Microphone 871 may be configured to capture audio signals indicative of drive operations of the autonomous vehicle 100. Microphone 827 may be configured to capture audio signals indicative of ambient sounds in the environment external to the autonomous vehicle 100. Multiple microphones 827 may be paired or otherwise grouped to generate signals that may be processed to estimate sound source location of sounds originating in the environment 890, for example. Autonomous vehicle 100 may include sensors for generating data representing location of the autonomous vehicle 100, and those sensors may include but are not limited to a global positioning system (GPS) 839*a* and/or an inertial measurement unit (IMU) 839*b*. Autonomous vehicle 100 may include one or more sensors ENV 877 for sensing environmental conditions in the environment external to the autonomous vehicle 100, such as air temperature, air pressure, humidity, barometric pressure, etc. Data generated by sensor(s) ENV 877 may be used to calculate the speed of sound in processing of data used by array(s) 102 (see arrays 102 depicted in FIG. 9), such as wave front propagation times, for example. Autonomous vehicle 100 may include one or more sensors MOT 888 configured to detect motion of the vehicle 100 (e.g., motion due to an impact from a collision, motion due to an emergency/evasive maneuvering, etc.). As one example, sensor MOT 888 may include but is not limited to an accelerometer, a multi-axis accelerometer and a gyroscope. Autonomous vehicle 100 may include one or more rotation sensors (not shown) associated with wheels 852 and configured to detect rotation 853 of the wheel 852 (e.g., a wheel encoder). For example, each wheel 852 may have an associated wheel encoder configured to detect rotation of the wheel 852 (e.g., an axle of the wheel 852 and/or a propulsion component of the wheel 852, such as an electric motor, etc.). Data representing a rotation signal generated by the rotation sensor may be received by one or more systems of the autonomous vehicle 100, such as the planner system, the localizer system, the perception system, the drive system, and one or more of the safety systems, for example.

A communications network 815 may route signals and/or data to/from sensors, one or more safety systems 875 (e.g., a bladder, a seat actuator, a seat belt tensioner), and other components of the autonomous vehicle 100, such as one or more processors 810 and one or more routers 830, for example. Routers 830 may route signals and/or data from: sensors in sensors suites 820, one or more acoustic beam-steering arrays 102 (e.g., one or more of a directional acoustic source, a phased array, a parametric array, a large radiator, of ultrasonic source), one or more light emitters, between other routers 830, between processors 810, drive operation systems such as propulsion (e.g., electric motors 851), steering, braking, one or more safety systems 875, etc., and a communications system 880 (e.g., for wireless communication with external systems and/or resources).

In FIG. 8, one or more microphones 827 may be configured to capture ambient sound in the environment 890 external to the autonomous vehicle 100. Signals and/or data from microphones 827 may be used to adjust gain values for one or more speakers positioned in one or more of the acoustic beam-steering arrays (not shown). As one example, loud ambient noise, such as emanating from a construction site may mask or otherwise impair audibility of the beam of steered acoustic energy 104 being emitted by an acoustic beam-steering array. Accordingly, the gain may be increased or decreased based on ambient sound (e.g., in dB or other metric such as frequency content).

Microphones 871 may be positioned in proximity of drive system components, such as electric motors 851, wheels 852, or brakes (not shown) to capture sound generated by those systems, such as noise from rotation 853, regenerative braking noise, tire noise, and electric motor noise, for example. Signals and/or data generated by microphones 871 may be used as the data representing the audio signal associated with an audio alert, for example. In other examples, signals and/or data generated by microphones 871 may be used to modulate the data representing the audio signal. As one example, the data representing the audio signal may constitute an audio recording (e.g., a digital-audio file) and the signals and/or data generated by microphones 871 may be used to modulate the data representing the audio signal. Further to the example, the signals and/or data generated by microphones 871 may be indicative of a velocity of the vehicle 100 and as the vehicle 100 slows to a stop at a pedestrian cross-walk, the data representing the audio signal may be modulated by changes in the signals and/or data generated by microphones 871 as the velocity of the vehicle 100 changes. In another example, the signals and/or data generated by microphones 871 that are indicative of the velocity of the vehicle 100 may be used as the data representing the audio signal and as the velocity of the vehicle 100 changes, the sound being emitted by the acoustic beam-steering array 102 may be indicative of the change in velocity of the vehicle 100. As such, the sound (or acoustic energy magnitude) may be changed (e.g., in volume, frequency, etc.) based on velocity changes. The above examples may be implemented to audibly notify pedestrians that the autonomous vehicle 100 has detected their presence at the cross-walk and is slowing to a stop.

One or more processors 810 may be used to implement one or more of the planner system, the localizer system, the perception system, one or more safety systems, and other systems of the vehicle 100, for example. One or more processors 810 may be configured to execute algorithms embodied in a non-transitory computer readable medium, to implement one or more of the planner system, the localizer system, the perception system, one or more safety systems, or other systems of the vehicle 100, for example. The one or more processors 810 may include but are not limited to circuitry. logic, field programmable gate array (FPGA), application specific integrated circuits (ASIC), programmable logic, a digital signal processor (DSP), a graphics processing unit (GPU), a microprocessor, a microcontroller, a big fat computer (BFC) or others, or clusters thereof.

Figure 9:
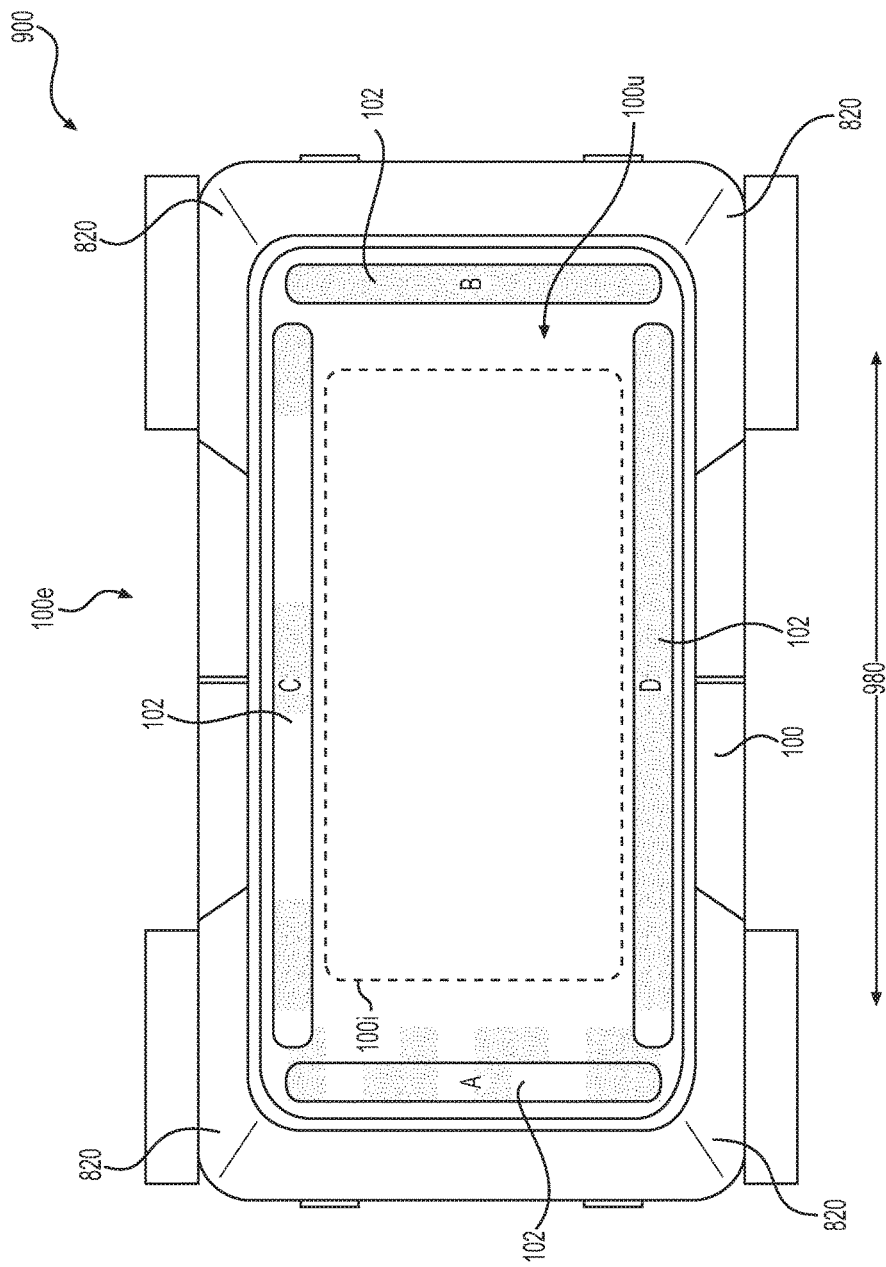
FIG. 9 depicts a top view of one example of an acoustic beam-steering array in an exterior safety system of an autonomous vehicle.

FIG. 9 depicts a top view of one example 900 of an acoustic beam-steering array in an exterior safety system of an autonomous vehicle. In FIG. 9, sensor suites (e.g., 820 in FIG. 8) may be positioned at corner portions of the autonomous vehicle 100 (e.g., a pillar section) and enclosures for acoustic beam-steering arrays 102 may be positioned on an upper surface 100u (e.g., on a roof or other locations on the vehicle) of the autonomous vehicle 100 and may be positioned to direct their respective beams of steered acoustic energy 104 (e.g., see FIG. 11) outward into the environment towards a location of an object targeted to receive an acoustic alert. Acoustic beam-steering arrays 102 (e.g., a directional acoustic source, a phased array, a parametric array, a large radiator, of ultrasonic source) may be configured to provide coverage of steered acoustic energy at one or more objects disposed in the environment external to the autonomous vehicle 100 and the coverage may be in an arc of about 360 degrees around the autonomous vehicle 100, for example. The acoustic beam-steering arrays 102 need not be the same size, shape, or have the same number of speakers. The acoustic beam-steering arrays 102 need not be linear as depicted in FIG. 9. Further to FIG. 9, acoustic beam-steering arrays 102 denoted as C and D have different dimensions than acoustic beam-steering arrays 102 denoted as A and B. Sensor suites 820 may be positioned to provide sensor coverage of the environment external to the autonomous vehicle 100 for one acoustic beam-steering array 102 or multiple acoustic beam-steering arrays 102. In the case of multiple acoustic beam-steering arrays 102, the sensor suites 820 may provide overlapping regions of sensor coverage. A perception system of the autonomous vehicle 100 may receive sensor data from more than one sensor or suite of sensors to provide data for the planning system to implement activation of one or more of the arrays 102 to generate an acoustic alert and/or to activate one or more other safety systems of vehicle 100, for example. The autonomous vehicle 100 may not have a front (e.g., a hood) or a rear (e.g., a trunk) and therefore may be configured for driving operations in at least two different directions as denoted by arrow 980. Accordingly, the acoustic beam-steering arrays 102 may not have a front or rear designation and depending on which direction the autonomous vehicle 100 is driving in, array 102 (A) may be the array facing the direction of travel or array 102 (8) may be the array facing the direction of travel.

Other safety systems of the autonomous vehicle 100 may be disposed at interior 100i (shown in dashed line) and exterior 100e locations on the autonomous vehicle 100 and may be activated for generating alerts or other safety functions by the planner system using the sensor data from the sensor suites. The overlapping regions of sensor coverage may be used by the planner system to activate one or more safety systems in response to multiple objects in the environment that may be positioned at locations around the autonomous vehicle 100.

Figure 10A:
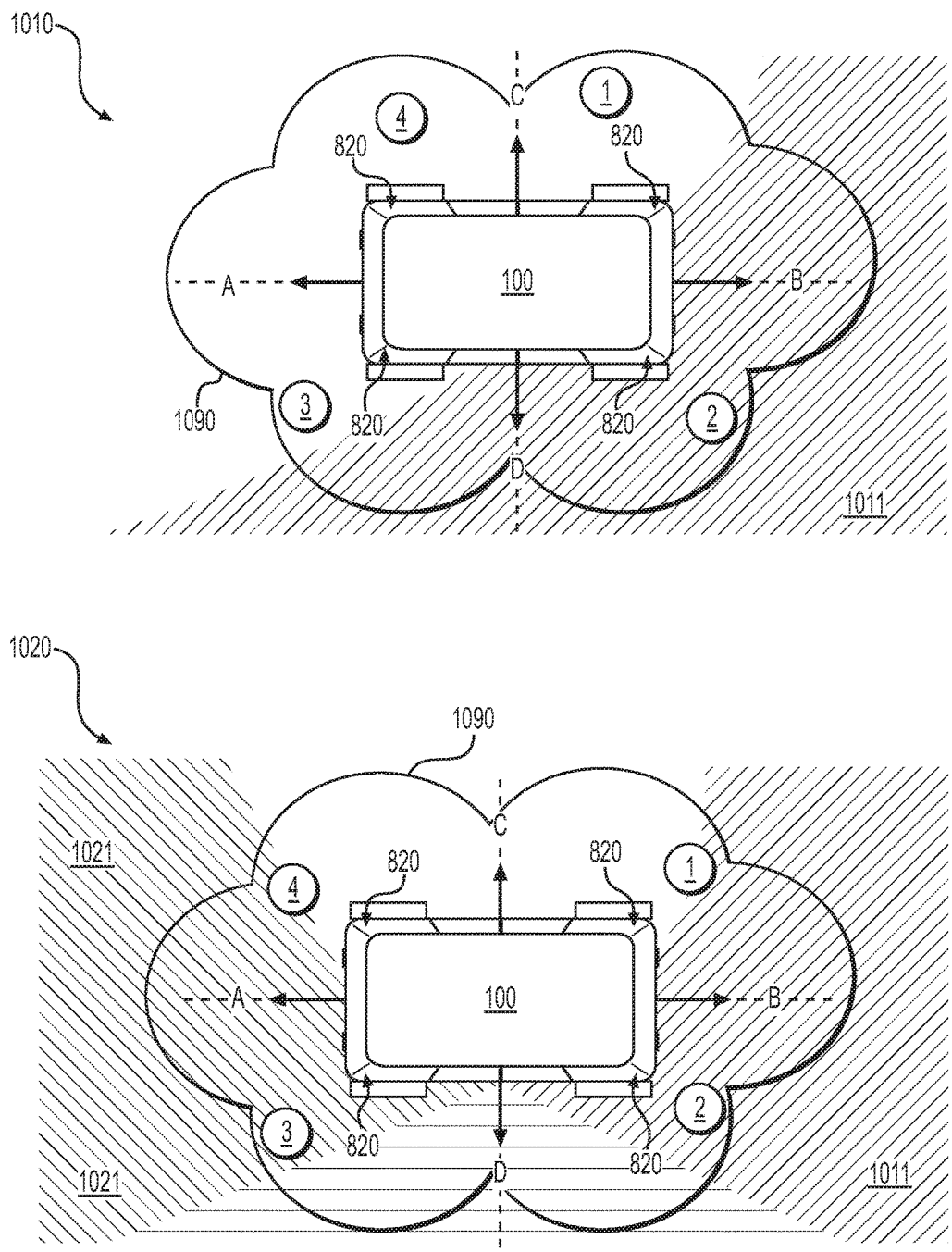
FIG. 10A depicts top plan views of two examples of sensor coverage.
Figure 10B:
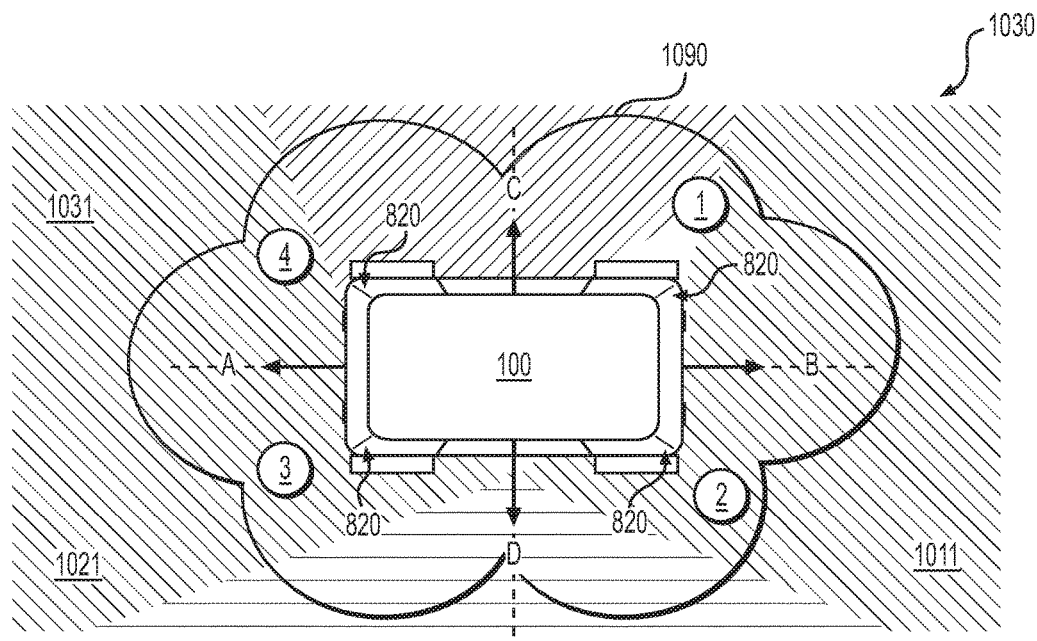
FIG. 10B depicts top plan views of another two examples of sensor coverage.
Figure 10B:
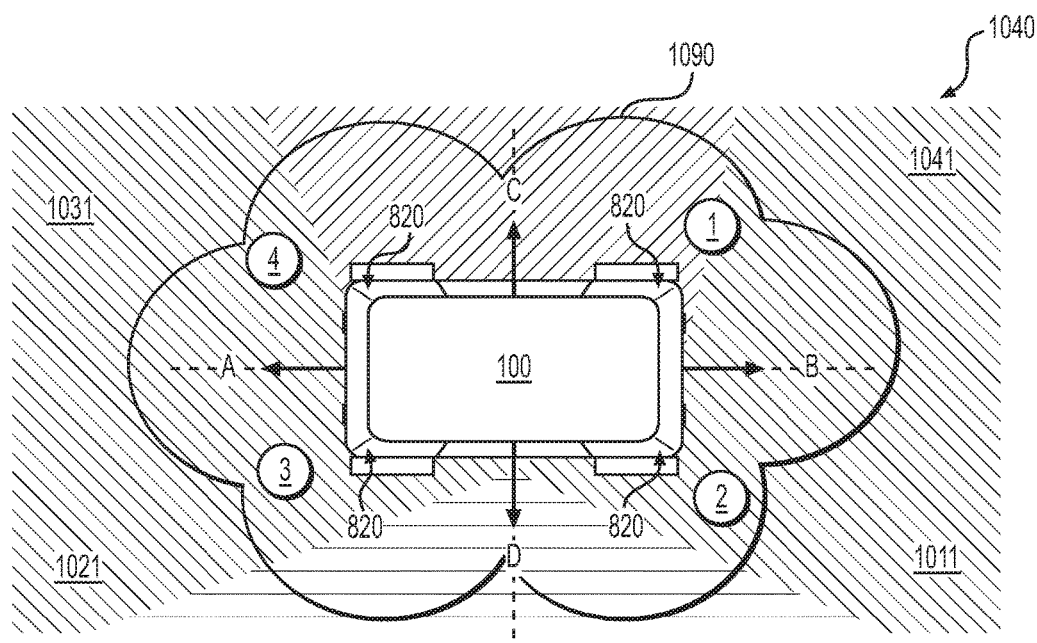

FIGS. 10A-10B depicts top plan views of examples of sensor coverage. In example 1010 of FIG. 10A, one of the four sensor suites 820 (denoted in underline) may provide sensor coverage 1011, using one or more of its respective sensors, of the environment 1090 in a coverage region that may be configured to provide sensor data for one or more systems, such as a perception system, localizer system, planner system and safety systems of the autonomous vehicle 100, for example. In the top plan view of FIG. 10A, arrows A, B, C and D demarcate four quadrants 1-4 that surround the autonomous vehicle 100. In example 1010, sensor coverage 1011 by a single suite 820 may be partial sensor coverage because there may be partial sensor blind spots not covered by the single suite 820 in quadrants 1, 3 and 4, and full sensor coverage in quadrant 2.

In example 1020, a second of the four sensor suites 820 may provide sensor coverage 1021 that overlaps with sensor coverage 1011, such that there may be partial sensor coverage in quadrants 1 and 4 and full sensor coverage in quadrants 2 and 3. In FIG. 10B, in example 1030, a third of the four sensor suites 820 may provide sensor coverage 1031 that overlaps with sensor coverage 1011 and 1021, such that quadrants 2, 3 and 4 have full sensor coverage and quadrant 1 has partial coverage. Finally, in example 1040, a fourth of the four sensor suites 820 (e.g., all four sensor suites are on-line) may provide sensor coverage 1041 that overlaps with sensor coverage 1011, 1021 and 1031, such that quadrants 1-4 have full coverage. The overlapping sensor regions of coverage may allow for redundancy in sensor coverage if one or more sensor suites 820 and/or one or more of their respective sensors (e.g., LIDAR, Camera, RADAR, etc.) are damaged, malfunction, or are otherwise rendered inoperative. One or more of the sensor coverage patterns 1011, 1021, 1031 and 1041 may allow the planner system to implement activation of one or more safety systems based on the position of those safety systems on the autonomous vehicle 100. As one example, bladders of a bladder safety system positioned on a side of the autonomous vehicle 100 (e.g., the side of the vehicle 100 with arrow C) may be activated to counter a collision from an object approaching the vehicle 100 from the side.

Figure 11A:
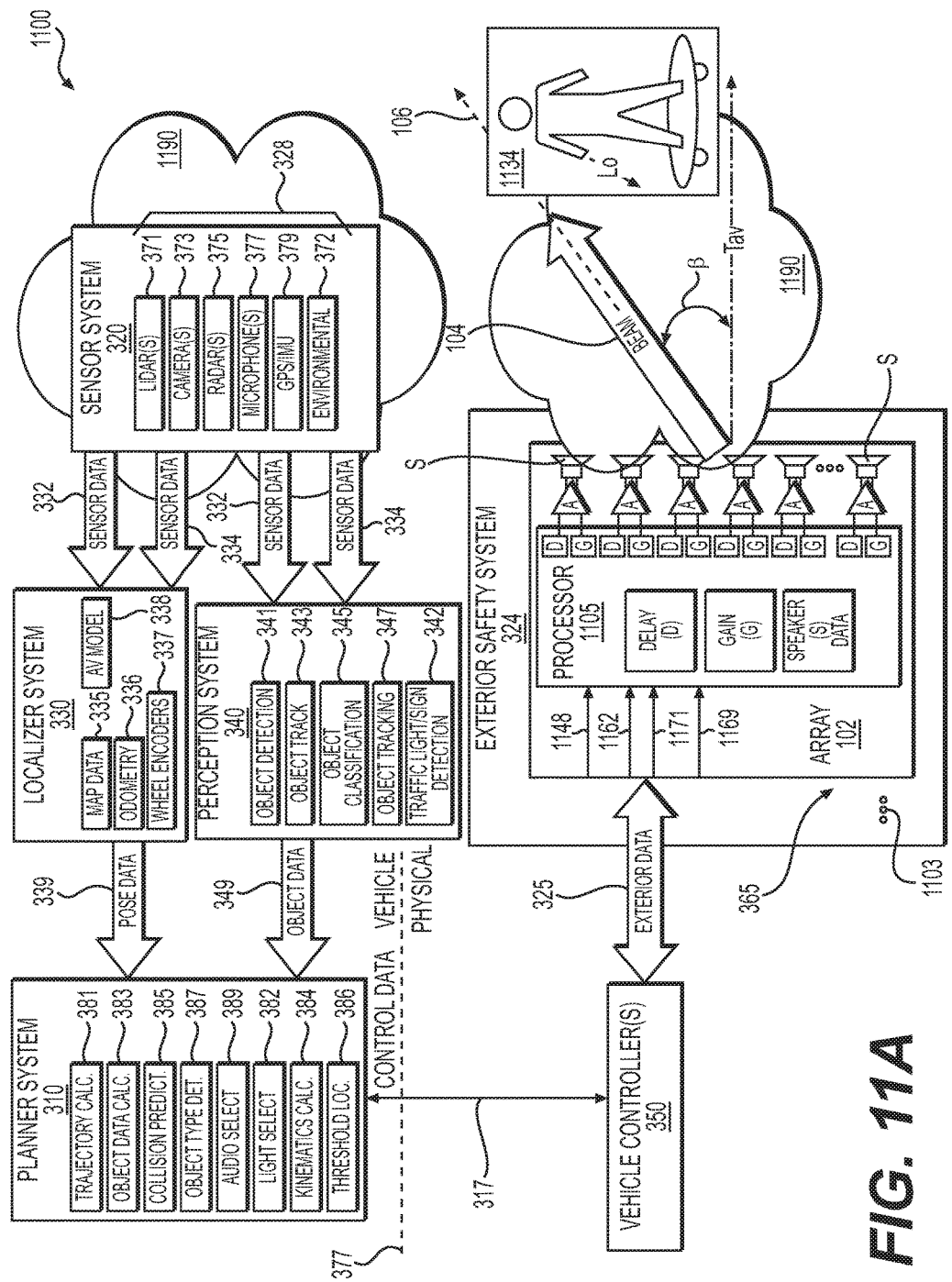
FIG. 11A depicts one example of an acoustic beam-steering array in an exterior safety system of an autonomous vehicle.

FIG. 11A depicts one example of an acoustic beam-steering array in an exterior safety system of an autonomous vehicle. In FIG. 11A, control data 317 from planner system 310 may be communicated to vehicle controller 350 which may in turn communicate exterior data 325 being configured to implement an acoustic alert by acoustic beam-steering array 102. Although one array 102 is depicted, the autonomous vehicle 100 may include more than one array 102 as denoted by 1103 (e.g., see arrays 102 in FIG. 9). Exterior data 325 received by array 102 may include but is not limited to object location data 1148 (e.g., a coordinate of object 1134 in the environment 1190), audio signal data 1162, trigger signal data 1171 and optionally, modulation signal data 1169.

Acoustic beam-steering array 102 may include a processor 1105 (e.g., a digital signal processor (DSP), field programmable gate array (FPGA), central processing unit (CPU), microprocessor, micro-controller, GPU's and/or clusters thereof, or other embedded processing system) that receives the exterior data 325 and processes the exterior data 325 to generate the beam 104 of steered acoustic energy (e.g., at angle β relative to a trajectory $T_{AV}$ of AV 100) into the environment 1190 (e.g., in response to receiving the data representing the trigger signal 1171). Acoustic beam-steering array 102 may include several speakers S, with each speaker S in the array 102 being coupled with an output of amplifier A. Each amplifier A may include a gain input and a signal input. Processor 1105 may calculate data representing a signal gain G for the gain input of each amplifier A and may calculate data representing a signal delay D for the signal input of each amplifier A. Processor 1105 may access and/or or receive data representing information on speakers S (e.g., from an internal and/or external data source) and the information may include but is not limited to an array width (e.g., a distance between the first speaker and last speaker in array 102), speaker S spacing in the array (e.g., a distance between adjacent speakers S in array 102), a wave front distance between adjacent speakers S in the array, the number of speakers S in the array, speaker characteristics (e.g., frequency response, output level per watt of power, radiating area, etc.), just to name a few. Each speaker S and its associated amplifier A in array 102 may constitute a monaural channel and the array 102 may include n monaural channels, where the number of monaural channels n, depending on speaker size and an enclosure size of the array 102, may vary. For example n may be 30 or may be 320. For example, in an ultrasonic parametric array implementation of the array 102, n may be on the order of about 80 to about 300. In some examples, the spacing between speakers in the array 102 may not be linear for some or all of the speakers in the array 102.

In example 1100 of FIG. 11A, the steered beam of acoustic energy 104 is being steered at an object 1134 (e.g., a skateboarder) having a predicted location Lo in the environment 1190 that may conflict with the trajectory Tav of the autonomous vehicle 100. A location of the object 1134 may be included in the exterior data 325 as the object location data 1148. Object location data 1148 may be data representing a coordinate of the object 1134 (e.g., an angle, Cartesian coordinates, a polar coordinate, etc.). Array 102 may process the object location data 1148 to calculate an angle β to direct the beam 104 at the object 1134. The angle β may be measured relative to the trajectory Tav or relative to some point on a frame of the vehicle 100 (e.g., see 100r in FIG. 11C). If the predicted location Lo changes due to motion of the object 1134, then the other systems of the autonomous vehicle system 101 may continue to track and update data associated with the autonomous vehicle 100 and the object 1134 to compute updated object location data 1134. Accordingly, the angle β may change (e.g., is re-computed by processor 1105) as the location of the object 1134 and/or the vehicle 100 changes. In some examples, the angle β may be computed (e.g., by the planner system) to take into account not only the currently predicted direction (e.g., coordinate) to the object, but also a predicted direction to the object at a future time t, where a magnitude of a time delay in firing the array 102 may be a function of a data processing latency of a processing system of the vehicle 100 (e.g., processing latency in one or more of the planner system, the perception system or the localizer system). Accordingly, the planner system may cause the array 102 to emit the sound where the object is predicted to be a some fraction of a second from the time the array 102 is fired to account for the processing latency, and/or the speed of sound itself (e.g., based on environmental conditions), depending on how far away the object is from the vehicle 100, for example.

Figure 11B:
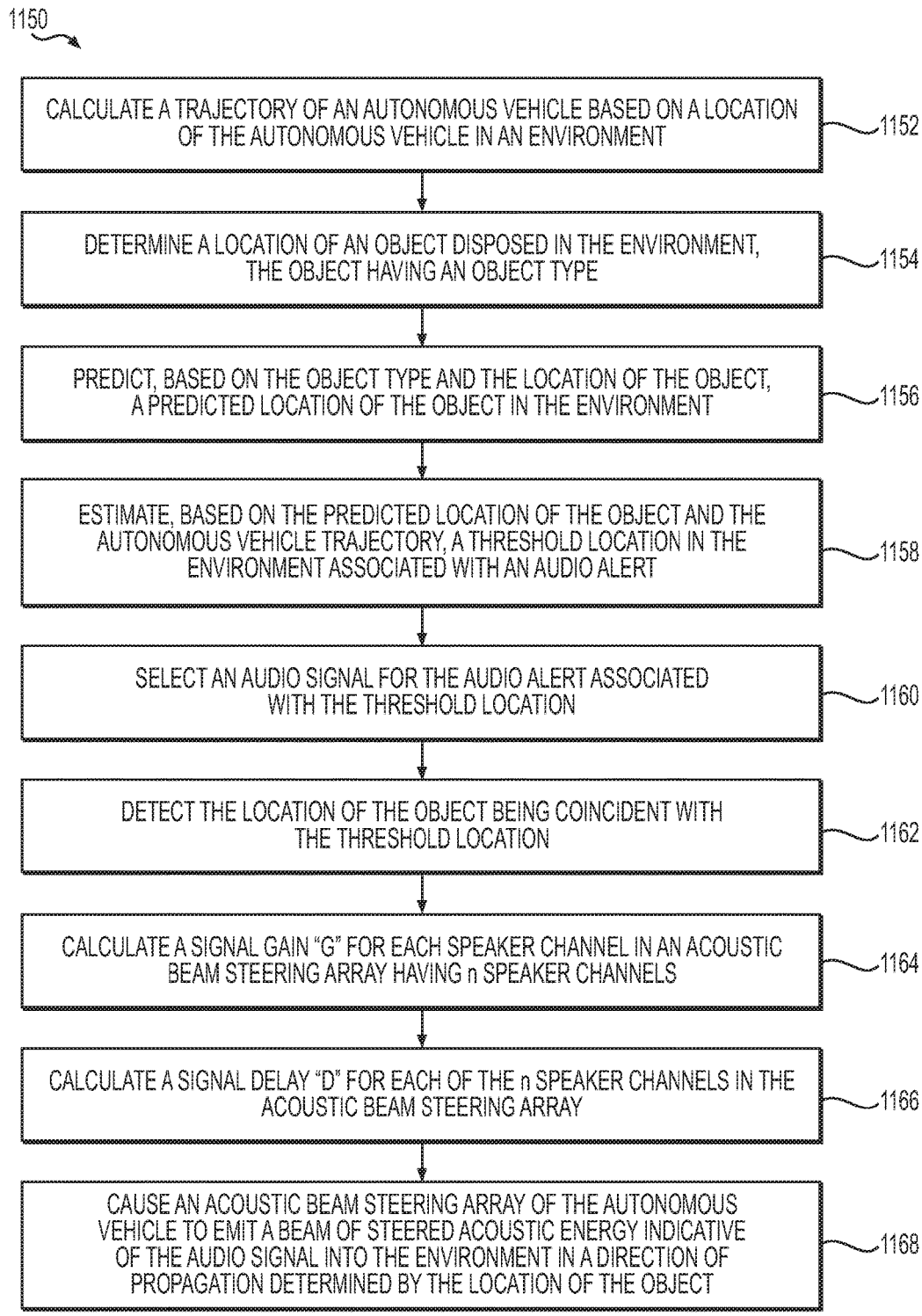
FIG. 11B depicts one example of a flow diagram for implementing acoustic beam-steering in an autonomous vehicle.

FIG. 11B depicts one example of a flow diagram 1150 for implementing an acoustic beam-steering in an autonomous vehicle. At a stage 1152, data representing a trajectory of the autonomous vehicle 100 in the environment may be calculated based on data representing a location of the autonomous vehicle 100 (e.g., local pose data). At a stage 1154, data representing a location (e.g., a coordinate) of an object disposed in the environment may be determined (e.g., from object track data derived from sensor data). Data representing an object type may be associated with the data representing the location of the object. At a stage 1156, data representing a predicted location of the object in the environment may be predicted based on the data representing the object type and the data representing the location of the object in the environment. At a stage 1158, data representing a threshold location in the environment associated with an audio alert (e.g., from array 102) may be estimated based on the data representing the predicted location of the object and the data representing the trajectory of the autonomous vehicle. At a stage 1160, data representing an audio signal associated with the audio alert may be selected. At a stage 1162, the location of the object being coincident with the threshold location may be detected. As one example, the predicted location of the object crossing the threshold location may be one indication of coincidence. At a stage 1164, data representing a signal gain "G." associated with a speaker channel of the acoustic beam-steering array 102 may be calculated. An array 102 having n speaker channels may have n different gains "G" calculated for each speaker channel in the n speaker channels. The data representing the signal gain "G" may be applied to a gain input of an amplifier A coupled with a speaker S in a channel (e.g., as depicted in array 102 of FIG. 11A). At a stage 1166, data representing a signal delay "D" may be calculated for each of the n speaker channels of the array 102. The data representing the signal delay "D" may be applied to a signal input of an amplifier A coupled with a speaker S in a channel (e.g., as depicted in array 102 of FIG. 11A). At a stage 1168, the vehicle controller (e.g., 350 of FIG. 11A) may implement the acoustic alert by causing the array 102 (e.g., triggering, activating, or commanding array 102) to emit a beam of steered acoustic energy (e.g., beam 104) in a direction of propagation (e.g., direction of propagation 106) determined by the location of the object (e.g., a coordinate of the object in the environment), the beam of steered acoustic energy being indicative of the audio signal.

The stages of flow diagram 1150 may be implemented for one or more of the arrays 102, and one or more stages of flow diagram 1150 may be repeated. For example, predicted object path, object location (e.g., object coordinates), predicted object location, threshold location, vehicle trajectory, audio signal selection, coincidence detection, and other stages may be repeated to update and/or process data as necessary while the autonomous vehicle 100 travels through the environment and/or as the object changes locations in the environment.

Figure 11C:
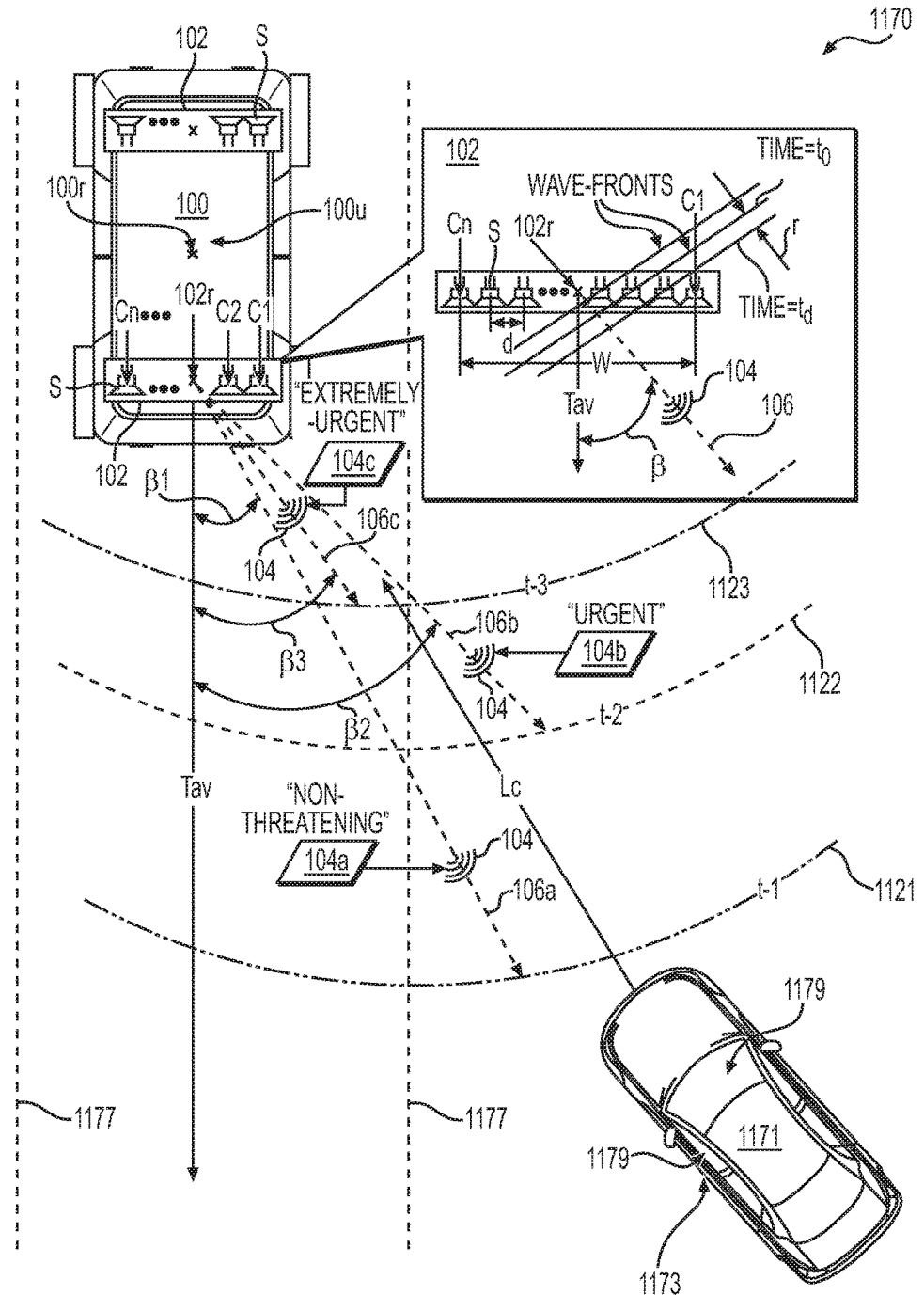
FIG. 11C depicts a top plan view of one example of an autonomous vehicle steering acoustic energy associated with an acoustic alert to an object.

FIG. 11C depicts a top plan view of one example 1170 of an autonomous vehicle steering acoustic energy associated with an acoustic alert to an object. In FIG. 11C, autonomous vehicle 100 may have a trajectory lay along a roadway between lane markers denoted by dashed lines 1177. A detected object 1171 in the environment external to the autonomous vehicle 100 has been classified as an automotive object type having a predicted location Lc in the environment that is estimated to conflict with the trajectory Tav of the autonomous vehicle 100. Planner system may generate three threshold locations t-1, t-2, and t-3 (e.g., having arcuate profiles 1121, 1122 and 1123), respectively. The three threshold locations t-1, t-2, and t-3 may be representative of escalating threat levels ranked from a low threat level at threshold location t-1 (e.g., a relatively safe distance away from vehicle 100), a medium threat level at threshold location t-2 (e.g., a distance that is cautiously close to the vehicle 100) and a high threat level at threshold location t-3 (e.g., a distance that is dangerously close to vehicle 100), for example. A different audio signal for an audio alert to be generated at each of the three threshold locations t-1, t-2, and t-3 may be selected to audibly convey the escalating levels of threat as the predicted location Lc of the object 1170 brings the object 1171 closer to the location of the autonomous vehicle 100 (e.g., close enough for a potential collision with autonomous vehicle 100). The beam of steered acoustic energy 104 may be indicative of the information included in the selected audio signal (e.g., audio signals 104a, 104b and 104c).

When object type 1171 crosses or otherwise has its location coincident with threshold location t-1, the planner system may generate a trigger signal to activate the acoustic array 102 positioned to generate an acoustic alert using an audio signal 104a (e.g., to convey a non-threatening acoustic alert) along a direction of propagation 106a based on a coordinate of the object 1171. For example, the coordinate may be an angle pa measured between the trajectory Tav and the direction of propagation 106a. A reference point for the coordinate (e.g., angles ßa, ßb and ßc) may be a point 102r on the array 102 or some other location on the autonomous vehicle 102, such as a point 100r, for example. As the object 1171 continues along its predicted location Lc and crosses threshold location t-2, another acoustic alert may be triggered by the planner system, using coordinate (3b, an audio signal 104b (e.g., to convey an urgent acoustic alert) and a direction of propagation 106b. Further travel by object 1171 that crosses threshold location t-3 may trigger yet another acoustic alert by planner system using a coordinate (3c, an audio signal 104c (e.g., to convey an extremely urgent acoustic alert) and direction of propagation 106c. In this example, a different audio signal (e.g., a digital audio file, whether prerecorded or dynamically generated, having different acoustic patterns, different magnitudes of acoustic power and/or volume, etc.) may be selected for audio signals 104a, 104b and 104c to convey the increasing levels of escalation to the object 1171 (e.g., to acoustically alert a driver of the vehicle).

For each of the acoustic alerts triggered by the planner system, the predicted location Lc of the object 1171 may change (e.g., relative to the location of the vehicle 100) and the planner system may receive updated object data (e.g., object tracking data from the perception system) to calculate (e.g., in real-time) changes in the location of the object 1171 (e.g., to calculate or recalculate (βa, βb and βc). The audio signal selected by planner system for each threshold location t-1, t-2 and t-3 may be different and may be configured to include audible information intended to convey ever increasing degrees of urgency for threshold locations t-1 to t-2 and t-2 to t-3, for example. The audio signal(s) selected by the planner system may be configured, based on the object type data for object 1171, to acoustically penetrate structures (1173, 1179) of the automobile, such as auto glass, door panels, etc., in order to garner the attention of a driver of the automobile. In some examples, if the object (e.g., the driver of the automobile) is detected (e.g., by the planner system) as changing its behavior (e.g., changing its predicted location, its predicted object path, or otherwise is no longer a threat to the vehicle 100 and/or its passengers), then the planner system may cause the array 102 to de-escalate the acoustic alert by lowering the level of urgency of the alert (e.g., by selecting an audio signal indicative of the lowered level of urgency). As one example, the selected audio signal may be configured to generate frequencies in a range from about 220 Hz to about 450 Hz to acoustically penetrate structures (1173, 1179) on the object 1171. As another example, the array 102 may be configured to generate sound at frequencies in a range from about 220 Hz to about 4.5 kHz, or any other frequency range. Further, the sound generated by the array 102 may be changed (e.g., in volume, frequency, etc.) based on velocity changes in the autonomous vehicle 100. Sound frequencies emitted by the array 102 are not limited to the foregoing examples, and the array 102 may be configured to generate sound at frequencies that are within the range of human hearing, above the range of human hearing (e.g., ultrasonic frequencies), below the range of human hearing (e.g., infrasonic frequencies), or some combination thereof.

Autonomous vehicle 100 is depicted as having two arrays 102 disposed on an upper surface 100u (e.g., a roof of the vehicle 100); however, the vehicle 100 may have more or fewer arrays 102 than depicted and the placement of the arrays 102 may be different than depicted in FIG. 11C. Acoustic beam-steering array 102 may include several speakers and their associated amplifiers and driving electronics (e.g., a processor, a DSP, etc.). For purposes of explanation, each amplifier/speaker pair will be denoted as a channel, such that array 102 will include n-channels denoted as C1 for channel one all the way to Cn for the nth channel. In an enlarged view of the acoustic beam-steering array 102, each speaker S may be spaced apart from an adjacent speaker by a distance d. Distance d (e.g., a spacing between adjacent speakers (S) may be the same for all speakers S in the array 102, such that all of the speakers S are spaced apart from one another by the distance d. In some examples, distance d may vary among the speakers S in the array 102 (e.g., distance d need not be identical between adjacent speakers in array 102). Distance d may be measured from a reference point on each speaker S, such as a center point of each speaker S.

A width W of the array 102 may be measured as a distance between the first speaker in the array 102 (e.g., channel C1) to the last speaker in the array 102 (e.g., channel Cn) and the width W may be measured from the center of the speaker in C1 to the center of the speaker in Cn, for example. In the direction of propagation 106 of the acoustic waves 104 generated by array 102, wave-fronts launched by adjacent speakers S in the array 102 may be delayed in time by a wave-front propagation time $t_d$. The wave-front front propagation time $t_d$ may be calculated as a distance between adjacent wave-fronts r multiplied by the speed of sound c (e.g., $t_d$=r*c). In examples where the distance d between speakers S is the same for all speakers S in the array 102, the delay D calculated for each speaker S may be an increasing integer multiple of $t_d$. Therefore, for channel C1: ($t_{d1}$=(r*c) *1), for channel C2: ($t_{d2}$=(r*c)*2), and for channel Cn: ($t_{dn}$=(r*c)*n), for example. In some examples, the speed of sound c may be calculated using data from an environmental sensor (e.g., sensor 877 of FIG. 8) to more accurately determine a value for the speed of sound c based on environmental conditions, such as altitude, air pressure, air temperature, humidity, and barometric pressure, for example.

Figure 12A:
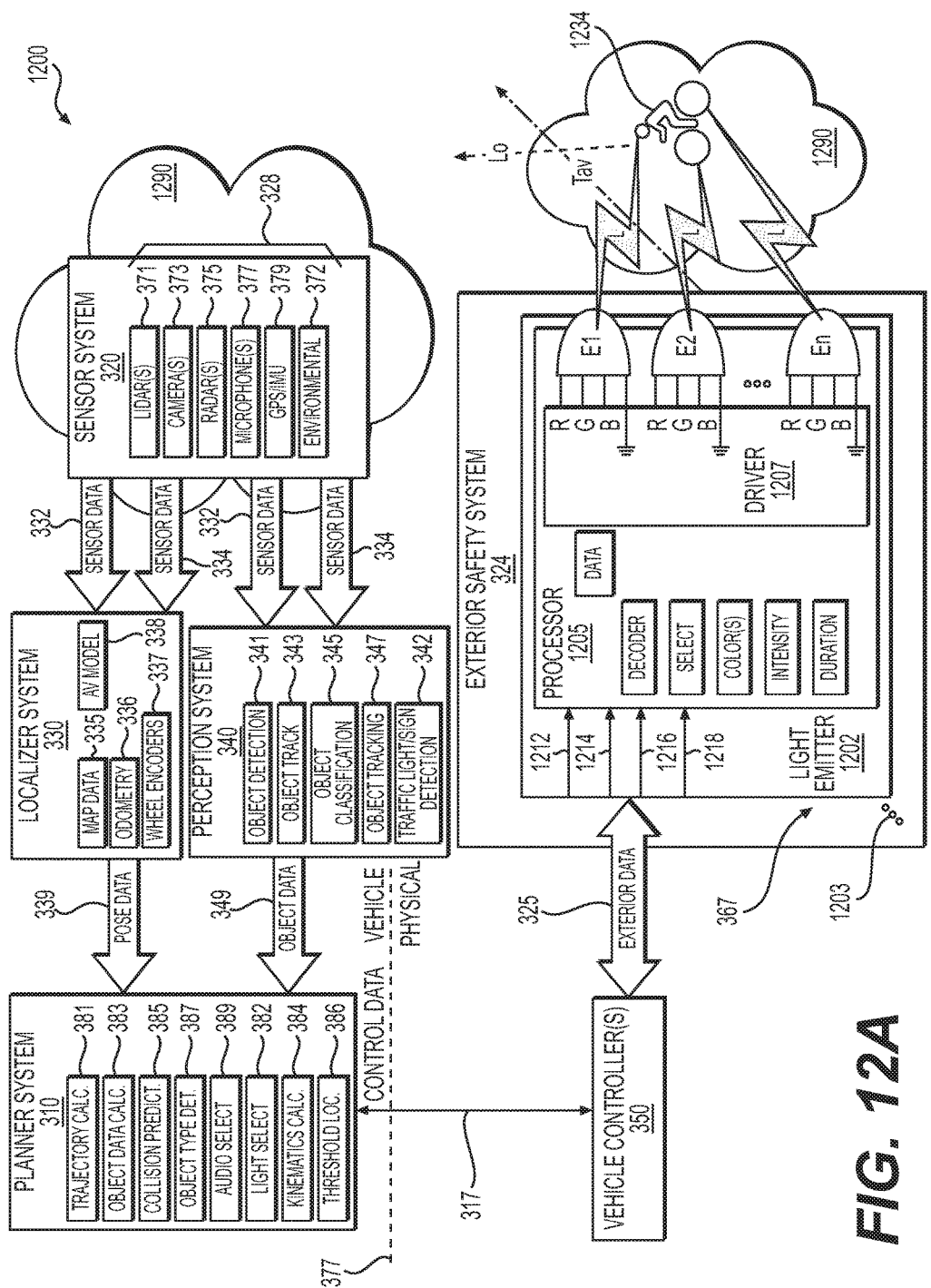
FIG. 12A depicts one example of a light emitter in an exterior safety system of an autonomous vehicle.

FIG. 12A depicts one example 1200 of light emitters positioned external to an autonomous vehicle. In FIG. 12A, control data 317 from planner system 310 may be communicated to vehicle controller 350 which may in turn communicate exterior data 325 being configured to implement a visual alert using a light emitter 1202. Although one light emitter 1202 is depicted, the autonomous vehicle 100 may include more than one light emitter 1202 as denoted by 1203. Exterior data 325 received by light emitter 1202 may include but is not limited to data representing a light pattern 1212, data representing a trigger signal 1214 being configured to activate one or more light emitters 1202, data representing an array select 1216 being configured to select which light emitters 1202 of the vehicle 100 to activate (e.g., based on an orientation of the vehicle 100 relative to the object the visual alert is targeted at), and optionally, data representing drive signaling 1218 being configured to deactivate light emitter operation when the vehicle 100 is using its signaling lights (e.g., turn signal, brake signal, etc.), for example. In other examples, one or more light emitters 1202 may serve as a signal light, a head light, or both. An orientation of the autonomous vehicle 100 relative to an object may be determined based on a location of the autonomous vehicle 100 (e.g., from the localizer system) and a location of the object (e.g., from the perception system), a trajectory of the autonomous vehicle 100 (e.g., from the planner system) and a location of the object, or both, for example.

The light emitter 1202 may include a processor 1205 being configured to implement visual alerts based on the exterior data 325. A select function of the processor 1205 may receive the data representing the array select 1216 and enable activation of a selected light emitter 1202. Selected light emitters 1202 may be configured to not emit light L until the data representing the trigger signal 1214 is received by the selected light emitter 1202. The data representing the light pattern 1212 may be decoder by a decode function, and sub-functions may operate on the decoded light pattern data to implement a color function being configured to determine a color of light to be emitted by light emitter 1202, an intensity function being configured to determine an intensity of light to be emitted by light emitter 1202, and a duration function being configured to determine a duration of light emission from the light emitter 1202, for example. A data store (Data) may include data representing configurations of each light emitter 1202 (e.g., number of light emitting elements E, electrical characteristics of light emitting elements E, positions of light emitters 1202 on vehicle 100, etc.). Outputs from the various functions (e.g., decoder, select, color, intensity and duration) may be coupled with a driver 1207 configured to apply signals to light emitting elements E1-En of the light emitter 1202. Each light emitting element E may be individually addressable based on the data representing the light pattern 1212. Each light emitter 1202 may include several light emitting elements E, such that n may represent the number of light emitting elements E in the light emitter 1202. As one example, n may be greater than 50. The light emitters 1202 may vary in size, shape, number of light emitting elements E, types of light emitting elements E, and locations of light emitters 1202 positioned external to the vehicle 100 (e.g., light emitters 1202 coupled with a structure of the vehicle 100 operative to allow the light emitter to emit light L into the environment, such as roof 100u or other structure of the vehicle 100).

As one example, light emitting elements E1-En may be solid-state light emitting devices, such as light emitting diodes or organic light emitting diodes, for example. The light emitting elements E1-En may emit a single wavelength of light or multiple wavelengths of light. The light emitting elements E1-En may be configured to emit multiple colors of light, based on the data representing the light pattern 1212, such as red, green, blue and one or more combinations of those colors, for example. The light emitting elements E1-En may be a RGB light emitting diode (RGB LED) as depicted in FIG. 12A. The driver 1207 may be configured to sink or source current to one or more inputs of the light emitting elements E1-En, such as one or more of the red-R, green-G or blue-B inputs of the light emitting elements E1-En to emit light L having a color, intensity, and duty cycle based on the data representing the light pattern 1212. Light emitting elements E1-En are not limited to the example 1200 of FIG. 12A, and other types of light emitter elements may be used to implement light emitter 1202. Further to FIG. 12A, an object 1234 having a predicted location Lo that is determined to be in conflict with a trajectory Tav of the autonomous vehicle 100 is target for a visual alert (e.g., based on one or more threshold locations in environment 1290). One or more of the light emitters 1202 may be triggered to cause the light emitter(s) to emit light L as a visual alert. If the planner system 310 determines that the object 1234 is not responding (e.g., object 1234 has not altered its location to avoid a collision), the planner 310 may select another light pattern configured to escalate the urgency of the visual alert (e.g., based on different threshold locations having different associated light patterns). On the other hand, if the object 1234 is detected (e.g., by the planner system) as responding to the visual alert (e.g., object 1234 has altered its location to avoid a collision), then a light pattern configured to deescalate the urgency of the visual alert may be selected. For example, one or more of light color, light intensity, light pattern or some combination of the foregoing, may be altered to indicate the de-escalation of the visual alert.

Planner system 310 may select light emitters 1202 based on an orientation of the autonomous vehicle 100 relative to a location of the object 1234. For example, if the object 1234 is approaching the autonomous vehicle 100 head-on, then one or more light emitters 1202 positioned external to the vehicle 100 that are approximately facing the direction of the object's approach may be activated to emit light L for the visual alert. As the relative orientation between the vehicle 100 and the object 1234 changes, the planner system 310 may activate other emitters 1202 positioned at other exterior locations on the vehicle 100 to emit light L for the visual alert. Light emitters 1202 that may not be visible to the object 1234 may not be activated to prevent potential distraction or confusion in other drivers, pedestrians or the like, at whom the visual alert is not being directed.

Figure 12B:
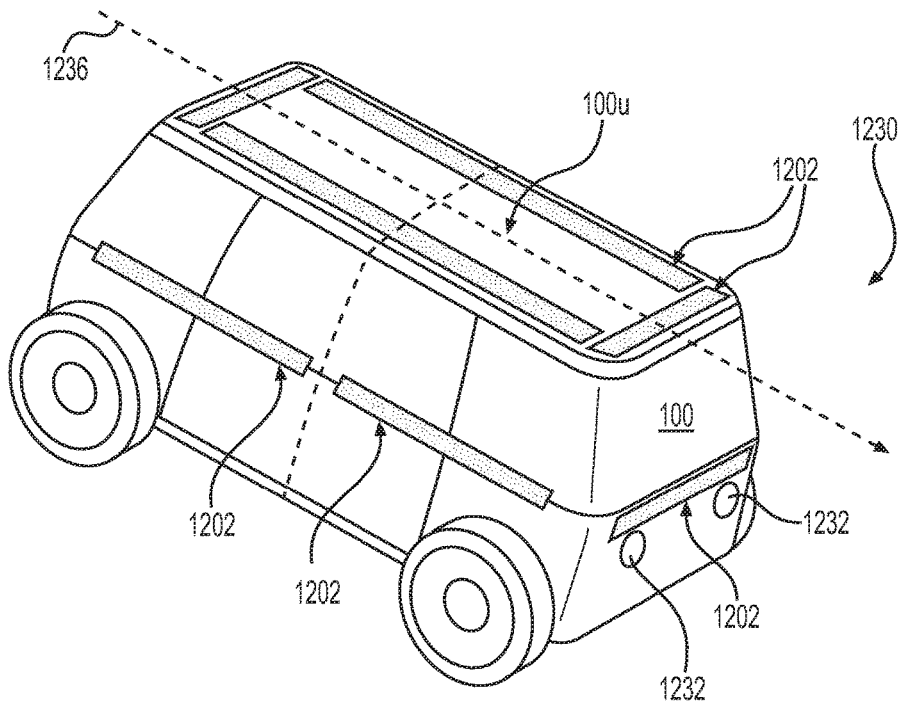
FIG. 12B depicts profile views of examples of light emitters in an exterior safety system of an autonomous vehicle.
Figure 12B:
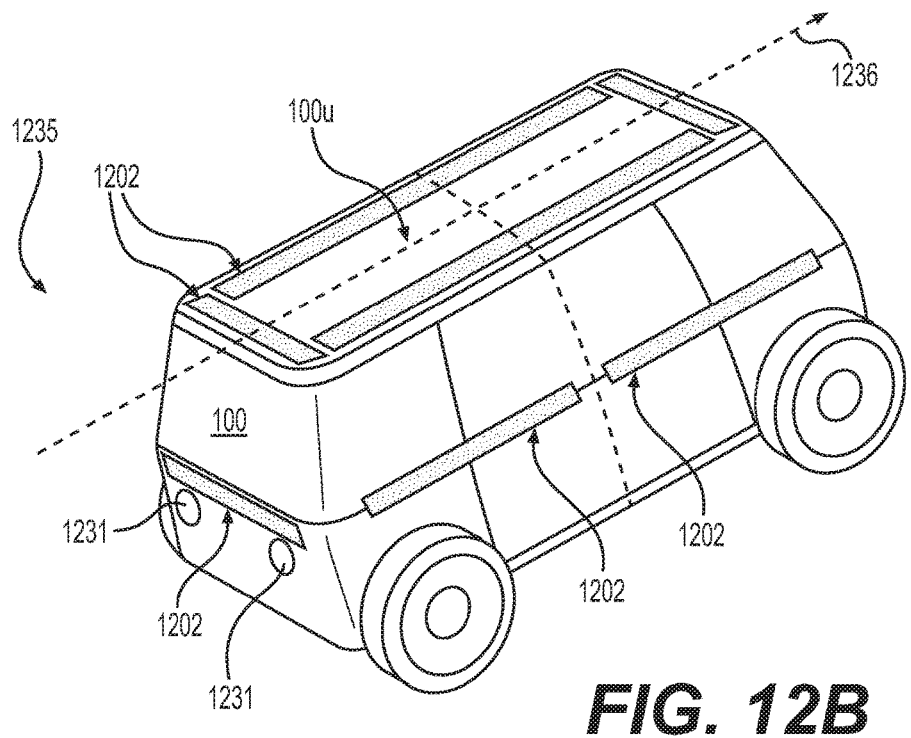

FIG. 12B depicts profile views of examples of light emitter 1202 positioning on an exterior of an autonomous vehicle 100. In example 1230, a partial profile view of a first end of the vehicle 100 (e.g., a view along direction of arrow 1236) depicts several light emitters 1202 disposed at different positions external to the vehicle 100. The first end of the vehicle 100 may include lights 1232 that may be configured for automotive signaling functions, such as brake lights, turn signals, hazard lights, head lights, running lights, etc. In some examples, light emitters 1202 may be configured to emit light L that is distinct (e.g., in color of light, pattern of light, intensity of light, etc.) from light emitted by lights 1232 so that the function of light emitters 1202 (e.g., visual alerts) is not confused with the automotive signaling functions implemented by lights 1232. In some examples, lights 1232 may be configured to implement automotive signaling functions and visual alert functions. Light emitters 1202 may be positioned in a variety of locations including but not limited to pillar sections, roof 100u, doors, bumpers, and fenders, for example. In some examples, one or more of the light emitters 1202 may be positioned behind an optically transparent or partially transparent surface or structure of the vehicle 100, such as behind a window, a lens, or a covering, etc., for example. Light L emitted by the light emitter 1202 may pass through the optically transparent surface or structure and into the environment.

In example 1235, a second end of the vehicle 100 (e. g., view along direction opposite of arrow 1236) may include lights 1231 that may be configured for traditional automotive signaling functions and/or visual alert functions. Light emitters 1202 depicted in example 1235 may also be positioned in a variety of locations including but not limited to pillar sections, roof 100u, doors, bumpers, and fenders, for example.

Note that according to some examples, lights 1231 and 1232 may be optional, and the functionality of automotive signaling functions, such as brake lights, turn signals, hazard lights, head lights, running lights, etc., may be performed by anyone of the one or more light emitters 1202.

Figure 12C:
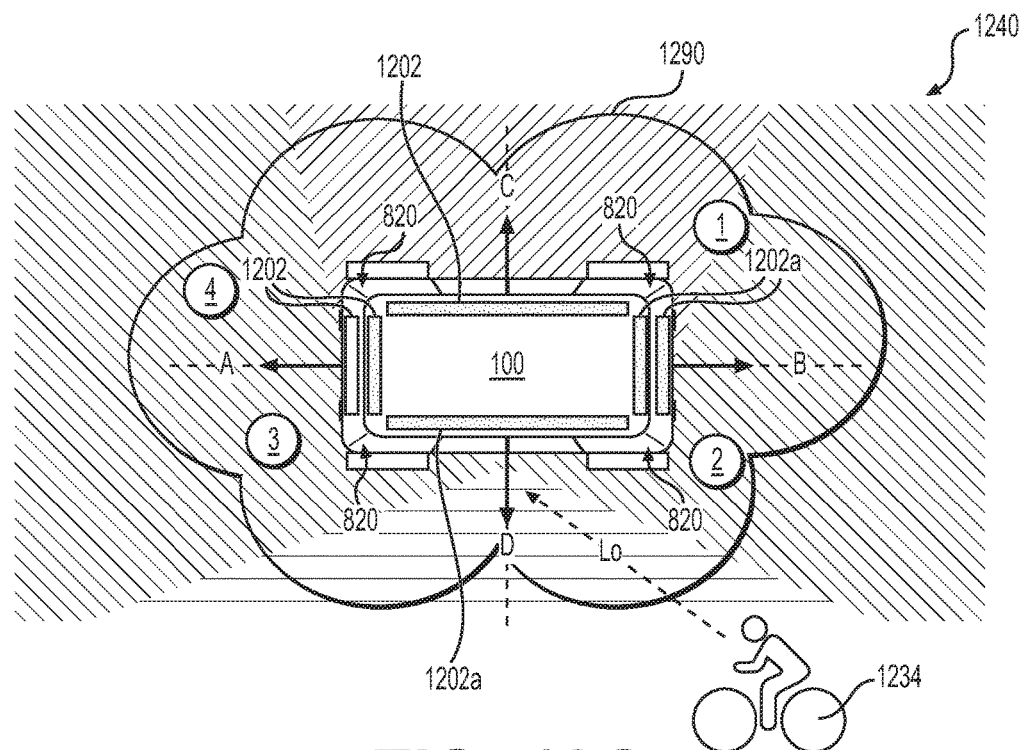
FIG. 12C depicts a top plan view of one example of light emitter activation based on an orientation of an autonomous vehicle relative to an object.
Figure 12D:
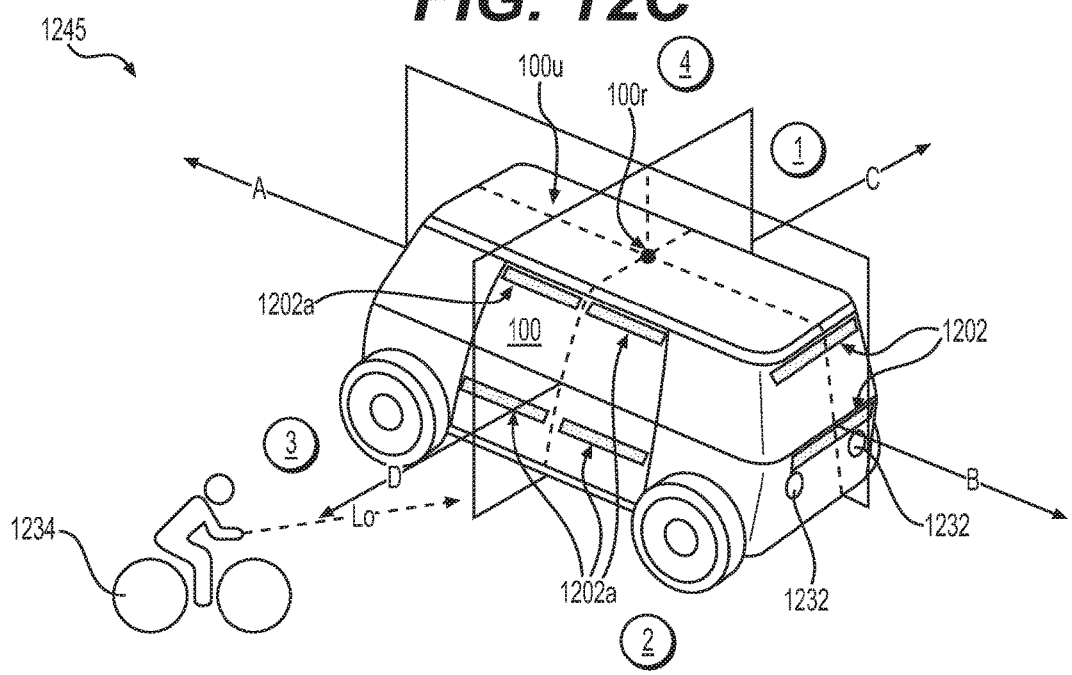
FIG. 12D depicts a profile view of one example of light emitter activation based on an orientation of an autonomous vehicle relative to an object.

FIG. 12C depicts a top plan view of one example 1240 of light emitter 1202 activation based on an orientation of an autonomous vehicle relative to an object. In FIG. 12C, object 1234 has a predicted location Lo relative to a location of the autonomous vehicle 100. A relative orientation of the autonomous vehicle 100 with the object 1234 may provide complete sensor coverage of the object 1234 using sensor suites 820 positioned to sense quadrants 2 and 3 and partial sensor coverage in quadrant 1. Based on the relative orientations of the vehicle 100 and the object 1234, a sub-set of the light emitters denoted as 1202a (e.g., on a side and an end of the vehicle 100) may be visually perceptible by the object 1234 and may be activated to emit light L into environment 1290.

FIG. 12O depicts a profile view of one example 1245 of light emitter activation based on an orientation of an autonomous vehicle relative to an object. In FIG. 12O, object 1234 has a predicted location Lo relative to a location of the autonomous vehicle 100. Based on the relative orientations of the vehicle 100 and the object 1234, a sub-set of the light emitters denoted as 1202a (e.g., on a side of the vehicle 100) may be visually perceptible by the object 1234 and may be activated to emit light L into environment 1290. In the example of FIG. 12O, the relative orientation of the vehicle 100 with the object 1234 is different than depicted in FIG. 12C as the approach of the object 1234 is not within the sensor coverage of quadrant 1. Accordingly, light emitters 1202 positioned at an end of the vehicle 100 may not be visually perceptible to the object 1234 and may not be activated for a visual alert.

Figure 12E:
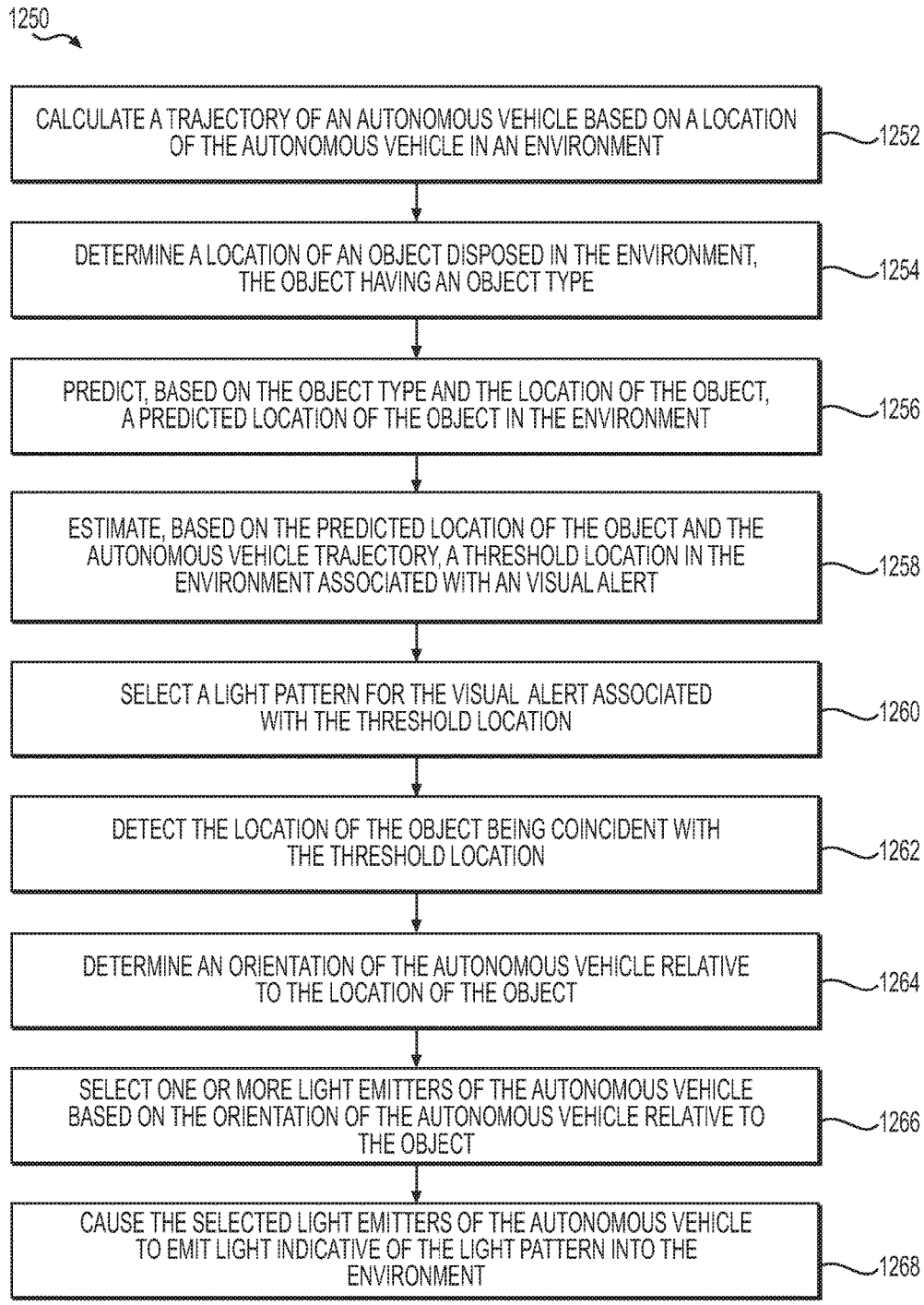
FIG. 12E depicts one example of a flow diagram for implementing a visual alert from a light emitter in an autonomous vehicle.

FIG. 12E depicts one example of a flow diagram 1250 for implementing a visual alert from a light emitter in an autonomous vehicle. At a stage 1252, data representing a trajectory of an autonomous vehicle in an environment external to the autonomous vehicle may be calculated based on data representing a location of the autonomous vehicle in the environment. At a stage 1254, data representing a location of an object in the environment may be determined. The object may include an object type. At a stage 1256, a predicted location of the object in the environment may be predicted based on the object type and the object location. At a stage 1258, data representing a threshold location in the environment associated with a visual alert may be estimated based on the trajectory of the autonomous vehicle and the predicted location of the object. At a stage 1260, data representing a light pattern associated with the threshold location may be selected. At a stage 1262, the location of the object being coincident with the threshold location may be detected. At a stage 1264, data representing an orientation of the autonomous vehicle relative to the location of the object may be determined. At a stage 1266, one or more light emitters of the autonomous vehicle may be selected based on the orientation of the autonomous vehicle relative to the location of the object. At a stage 1268, selected light emitters may be caused (e.g., activated, triggered) to emit light indicative of the light pattern into the environment to implement the visual alert.

Figure 12F:
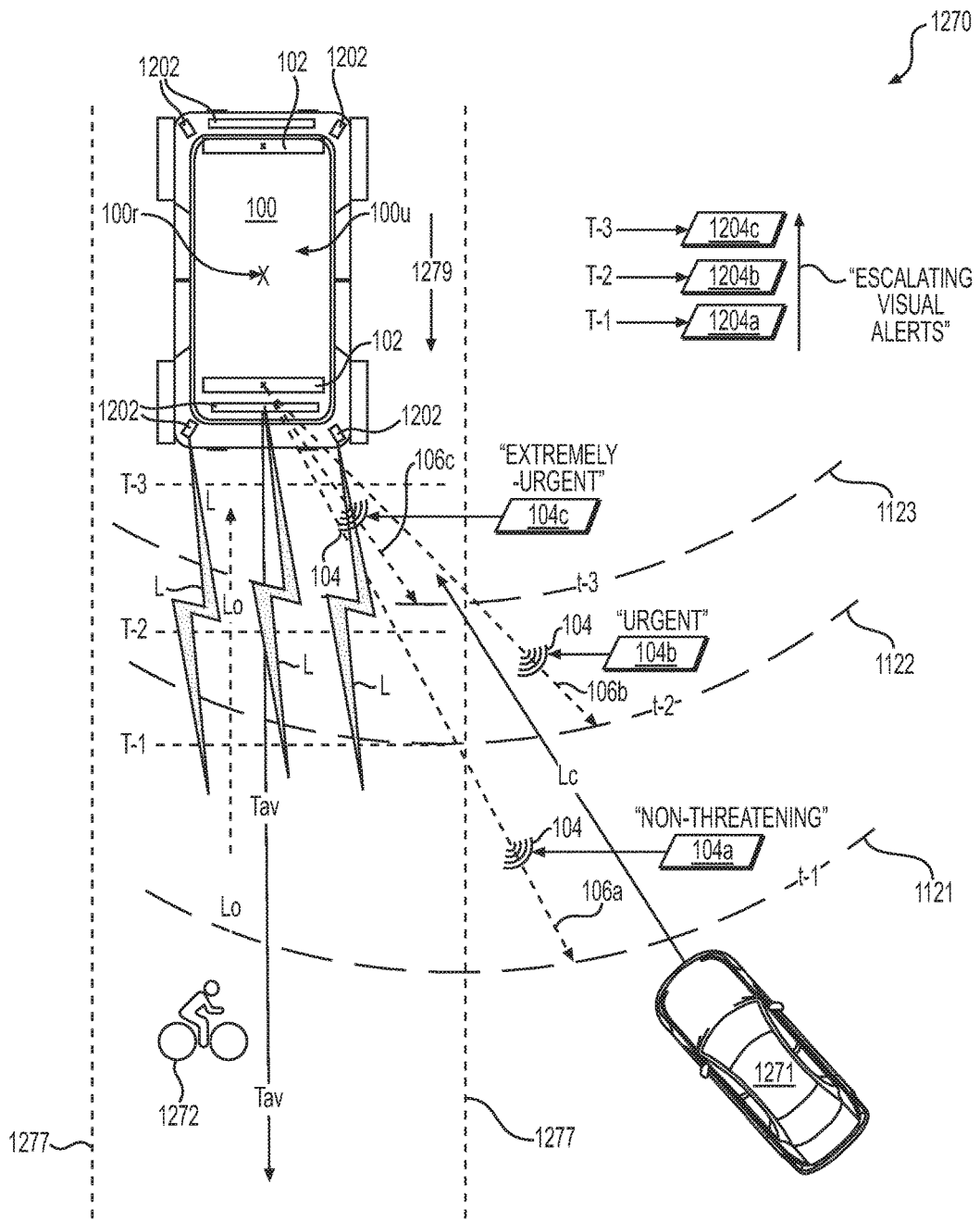
FIG. 12F depicts a top plan view of one example of a light emitter of an autonomous vehicle emitting light to implement a visual alert.

FIG. 12F depicts a top plan view of one example 1270 of a light emitter 1202 of an autonomous vehicle 100 emitting light L to implement a visual alert in concert with optional acoustic alerts from one or more arrays 102. In FIG. 12F, autonomous vehicle 100 has a trajectory Tav along a roadway between lane markers denoted by dashed lines 1277, a detected object 1272 has a predicted location Lo that is approximately parallel to and in an opposite direction to the trajectory Tav. A planner system of autonomous vehicle 100 may estimate three threshold locations T-1, T-2 and T-3 to implement a visual alert. Light emitters 1202 positioned at an end of the vehicle 100 in a direction of travel 1279 (e.g., light emitters 1202 are facing the object 1272) are selected for the visual alert. In contrast, arrays 1202 positioned at the other end of the vehicle 100 that are not facing the direction of travel 1279, may not be selected for the visual alert because they may not be visually perceptible by the object 1272 and the may confuse other drivers or pedestrians, for example. Light patterns 1204a, 1204b and 1204c may be associated with threshold locations T-1, T-2 and T-3, respectively, and may be configured to implement escalating visual alerts (e.g., convey increasing urgency) as the predicted location Lo of the object 1272 gets closer to the location of the vehicle 100.

Further to FIG. 12F, another detected object 1271 may be selected by the planner system of the vehicle 100 for an acoustic alert as described above in reference to FIGS. 11A-11C. Estimated threshold locations t-1-t-3 for object 1271 may be different than those for object 1272 (e.g., T-1, T-2 and T-3). For example, acoustic alerts may be audibly perceptible at a greater distance from the vehicle 100 than visual perception of visual alerts. A velocity or speed of object 1271 may be greater than a velocity or speed of object 1272 (e.g., an automobile vs. a bicycle) such that the threshold locations t-1-t-3 are placed further out due to a higher velocity of the object 1271 in order to provide sufficient time for the object 1271 to alter its location to avoid a collision and/or for the vehicle 100 to take evasive maneuvers and/or activate one or more of its safety systems. Although FIG. 12F depicts an example of a visual alert associated with object 1272 and an acoustic alert associated with object 1271, the number and type of safety system activated (e.g., interior, exterior or drive system) to address behavior of objects in the environment are not limited to the example depicted and one or more safety systems may be activated. As one example, an acoustic alert, a visual alert, or both, may be communicated to object 1271, object 1272, or both. As another example, one or more bladders may be deployed and one or more seat belts may be tensioned as object 1271, object 1272, or both are close to colliding with or coming within an unsafe distance of the vehicle 100 (e.g., a predicted impact time is about 2 seconds or less away).

The planner system may predict one or more regions of probable locations (e.g., 565 in FIGS. 5 and 6) of the objects in the environment based on predicted motion of each object and/or predicted location of each object. The regions of probable locations and the size, number, spacing, and shapes of threshold locations within the regions of probable locations may vary based on many factors including but not limited to object characteristics (e.g., speed, type, location, etc.), the type of safety system selected, the velocity of the vehicle 100, and the trajectory of the vehicle 100, for example.

Figure 13A:
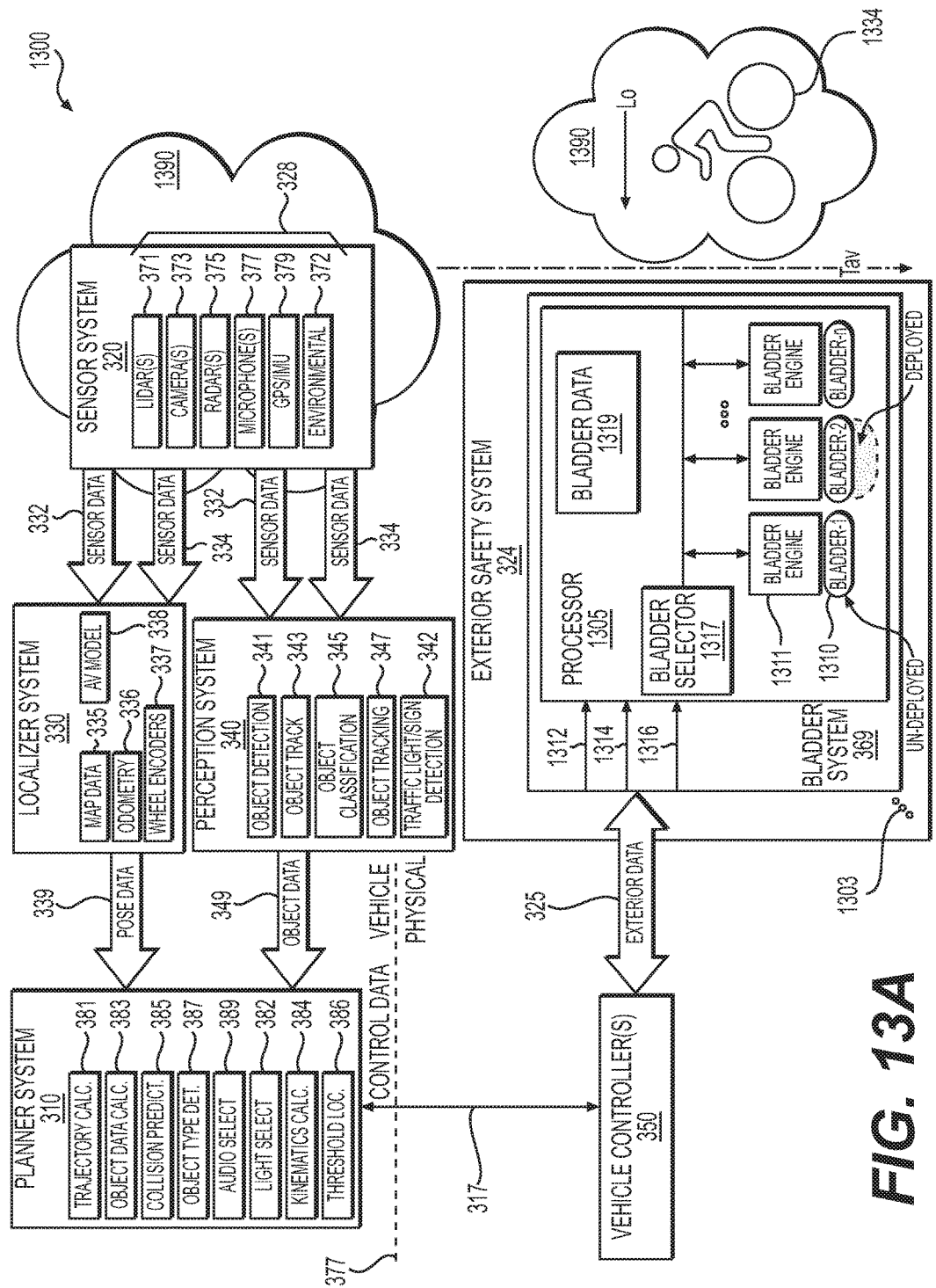
FIG. 13A depicts one example of a bladder system in an exterior safety system of an autonomous vehicle.

FIG. 13A depicts one example 1300 of a bladder system in an exterior safety system of an autonomous vehicle. Exterior data 325 received by the bladder system 369 may include data representing bladder selection 1312, data representing bladder deployment 1314, and data representing bladder retraction 1316 (e.g., from a deployed state to an un-deployed state). A processor 1305 may process exterior data 325 to control a bladder selector coupled with one or more bladder engines 1311. Each bladder engine 1311 may be coupled with a bladder 1310 as denoted by Bladder-1 through Bladder-n. Each bladder 1310 may be activated, by its respective bladder engine 1311, from an un-deployed state to a deployed state. Each bladder 1310 may be activated, by its respective bladder engine 1311, from the deployed state to the un-deployed state. In the deployed state, a bladder 1310 may extend outward of the autonomous vehicle 100 (e.g., outward of a body panel or other structure of the vehicle 100). Bladder engine 1311 may be configured to cause a change in volume of its respective bladder 1310 by forcing a fluid (e.g., a pressurized gas) under pressure into the bladder 1310 to cause the bladder 1310 to expand from the un-deployed position to the deployed position. A bladder selector 1317 may be configured to select which bladder 1310 (e.g., in Bladder-1 through Bladder-n) to activate (e.g., to deploy) and which bladder 1310 to de-activate (e.g., return to the un-deployed state). A selected bladder 1310 may be deployed upon the processor receiving the data representing bladder deployment 1314 for the selected bladder 1310. A selected bladder 1310 may be returned to the un-deployed state upon the processor receiving the data representing bladder retractions 1316 for the selected bladder 1310. The processor 1305 may be configured to communicate data to bladder selector 1317 to cause the bladder selector 1317 to deploy a selected bladder 1310 (e.g., via its bladder engine 1311) or to return a deployed bladder 1310 to the un-deployed state (e.g., via its bladder engine 1311).

A bladder 1310 may made be made from a flexible material, a resilient material, an expandable material, such as rubber or a synthetic material, or any other suitable material, for example. In some examples, a material for the bladder 1310 may be selected based on the material being reusable (e.g., if a predicted impact to the bladder 1310 does not occur or the collision occurs but does not damage the bladder 1310). As one example, the bladder 1310 may be made from a material used for air springs implemented in semi-tractor-trailer trucks. Bladder engine 1311 may generate a pressurized fluid that may be introduced into the bladder 1310 to expand the bladder 1310 to the deployed position or couple the bladder 1310 with a source of pressurized fluid, such a tank of pressurized gas or a gas generator. Bladder engine 1311 may be configured to release (e.g., via a valve) the pressurized fluid from the bladder 1310 to contract the bladder 1310 from the deployed position back to the un-deployed position (e.g., to deflate the bladder 1310 to the un-deployed position). As one example, bladder engine 1311 may vent the pressurized fluid in its respective bladder 1310 to atmosphere. In the deployed position, the bladder 1310 may be configured to absorb forces imparted by an impact of an object with the autonomous vehicle 100, thereby, reducing or preventing damage to the autonomous vehicle and/or its passengers. For example, the bladder 1310 may be configured to absorb impact forces imparted by a pedestrian or a bicyclist that collides with the autonomous vehicle 100.

Bladder data 1319 may be accessed by one or more of processor 1305, bladder selector 1317 or bladder engines 1311 to determine bladder characteristics, such as bladder size, bladder deployment time, bladder retraction time (e.g., a time to retract the bladder 1310 from the deployed position back to the un-deployed position); the number of bladders, the locations of bladders disposed external to the vehicle 100, for example. Bladders 1310 may vary in size and location on the autonomous vehicle 100 and therefore may have different deployment times (e.g., an inflation time) and may have different retraction times (e.g., a deflation time). Deployment times may be used in determining if there is sufficient time to deploy a bladder 1310 or multiple bladders 1310 based on a predicted time of impact of an object being tracked by the planner system 310, for example. Bladder engine 1311 may include sensors, such as a pressure sensor to determine pressures in a bladder 1310 when deployed and when un-deployed, and to determine if an impact has ruptured or otherwise damaged a bladder 1310 (e.g., a rupture causing a leak in the bladder 1310). The bladder engine 1311 and/or sensor system 320 may include a motion sensor (e.g., an accelerometer, MOT 888 in FIG. 8) to detect motion from an impact to the autonomous vehicle 100. A bladder 1310 and/or its respective bladder engine 1311 that is not damaged by an impact may be reused. In the event the predicted impact does not occur (e.g., there is no collision between the vehicle 100 and an object) the bladder 1310 may be returned to the un-deployed state (e.g., via bladder engine 1311) and the bladder 1310 may be subsequently reused at a future time.

Further to FIG. 13A, an object 1334 having predicted location Lo may be approaching the autonomous vehicle 100 from one of its sides such that a trajectory Tav of the autonomous vehicle 100 is approximately perpendicular to a predicted object path of the object 1334. Object 1334 may be predicted to impact the side of the autonomous vehicle 100, and exterior data 325 may include data configured to cause bladder selector 1311 to select one or more bladders 1310 positioned on the side of the autonomous vehicle 100 (e.g., the side on which the impact is predicted to occur) to deploy in advance of the predicted impact.

Figure 13B:
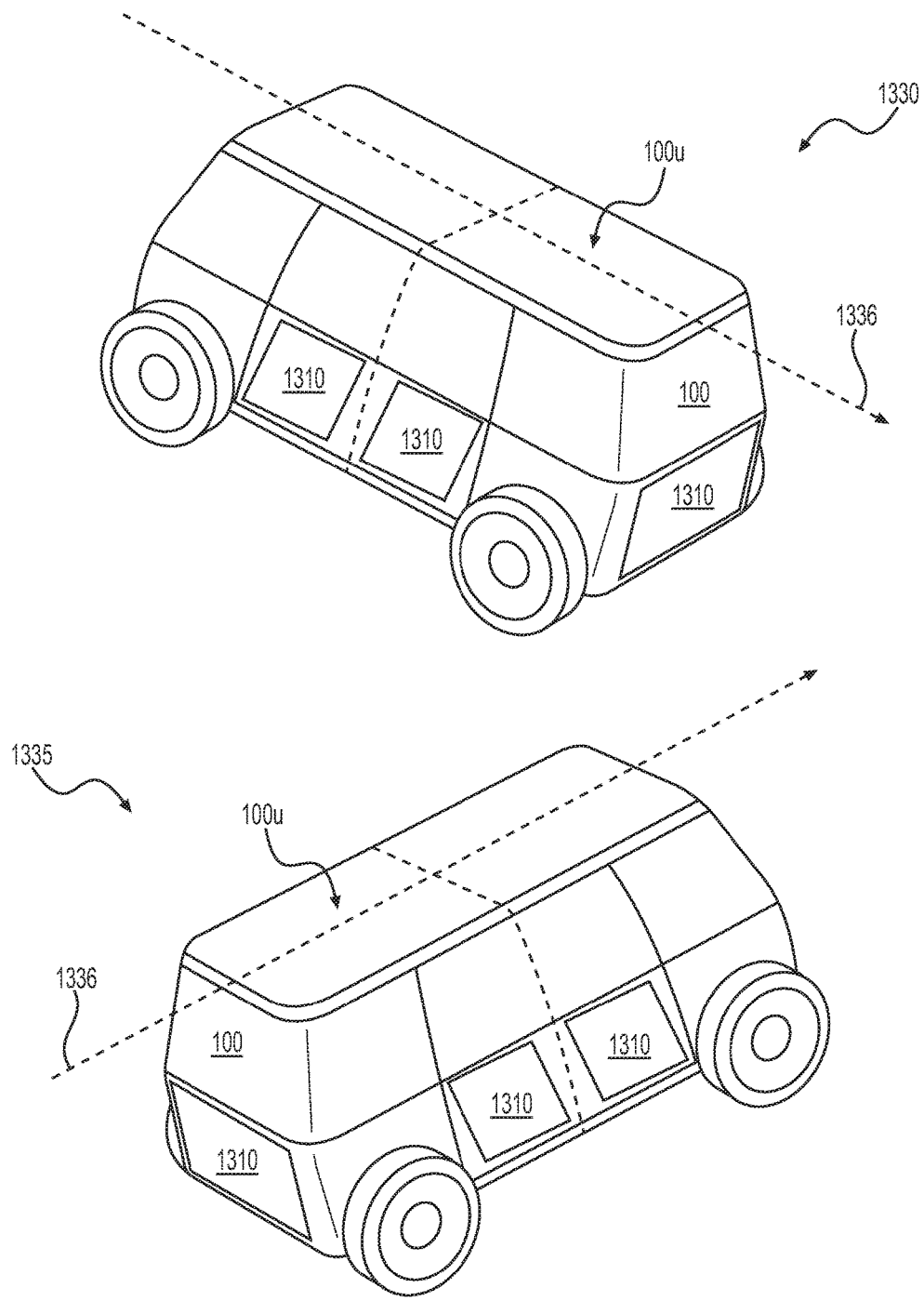
FIG. 13B depicts examples of bladders in an exterior safety system of an autonomous vehicle.

FIG. 13B depicts examples 1330 and 1335 of bladders in an exterior safety system of an autonomous vehicle. In example 1330, vehicle 100 may include several bladders 1310 having positions associated with external surfaces and/or structures of the vehicle 100. The bladders 1310 may have different sizes and shapes. Bladders 1310 may be concealed behind other structures of the vehicle or may be disguised with ornamentation or the like. For example, a door panel or fender of the vehicle 100 may include a membrane structure and the bladder 1310 may be positioned behind the membrane structure. Forces generated by deployment of the bladder 1310 may rupture the membrane structure and allow the bladder to expand outward in a direction external to the vehicle 100 (e.g., deploy outward into the environment). Similarly, in example 1335, vehicle 100 may include several bladders 1310. The bladders depicted in examples 1330 and 1335 may be symmetrical in location and/or size on the vehicle 100.

Figure 13C:
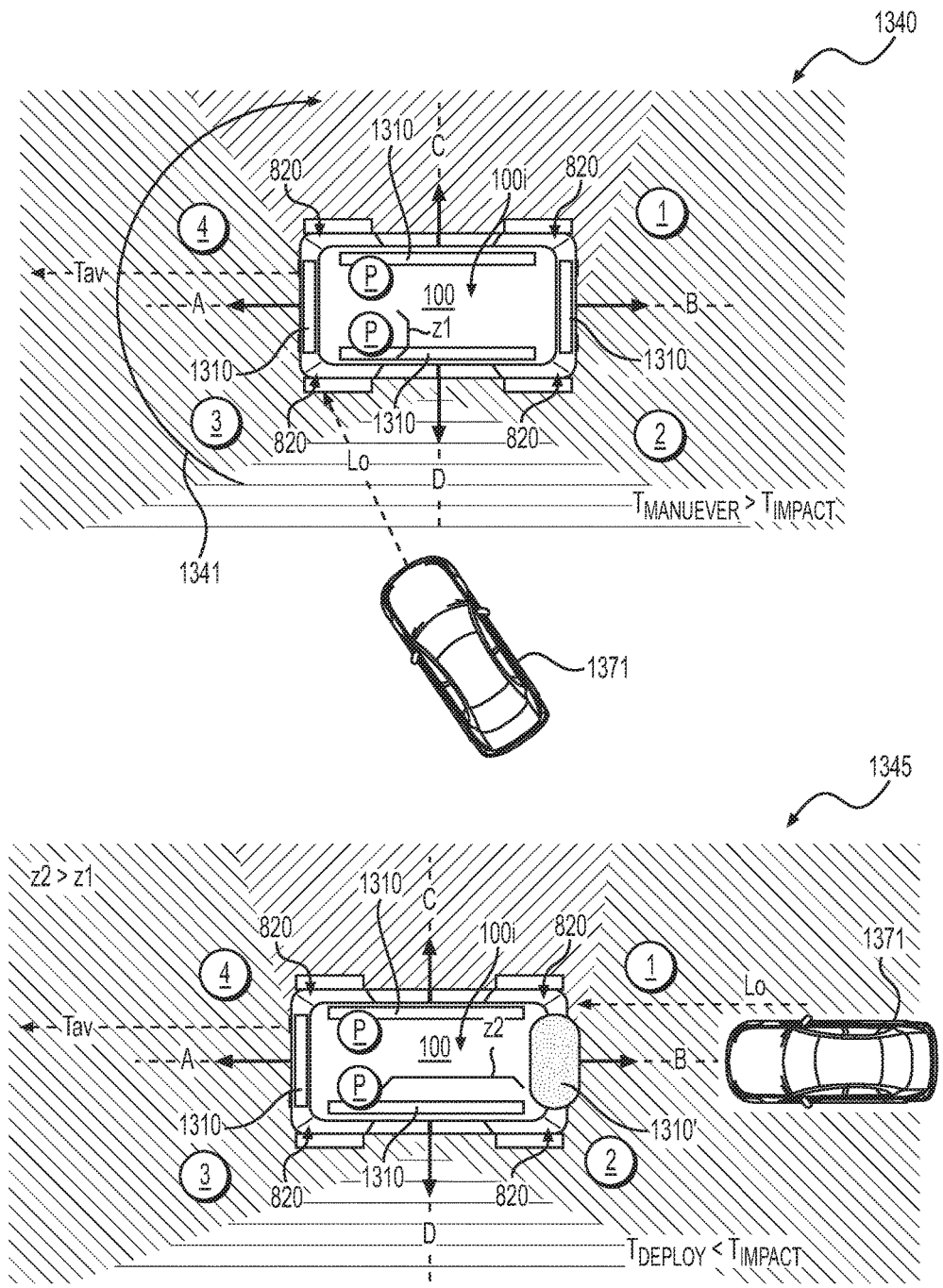
FIG. 13C depicts examples of bladder deployment in an autonomous vehicle.

FIG. 13C depicts examples 1340 and 1345 of bladder deployment in an autonomous vehicle. In example 1340, an object 1371 (e.g., a car) is on a predicted collision course with vehicle 100 and has a predicted location of Lo. Autonomous vehicle 100 has a trajectory Tav. Based on a relative orientation of the vehicle 100 with the object 1371, a predicted impact location on the vehicle 100 is estimated to be in quadrants 2 and 3 (e.g., impact to a side of the vehicle 100). Two passengers P located in the interior 100i of the vehicle 100 may be at risk due to a crumple zone distance z1 measured from the side of vehicle 100 to the passenger P seating position in the interior 100i. Planner system 310 may compute an estimated time to impact Timpact for the object 1371 (e.g., using kinematics calculator 384) to determine whether there is sufficient time to maneuver the autonomous vehicle 100 to avoid the collision or to reduce potential injury to passengers P. If the planner system 310 determines that the time to maneuver the vehicle 100 is less than the time of impact (e.g., Tmanuever<Timpact), the planner system may command the drive system 326 to execute an avoidance maneuver 1341 to rotate the vehicle 100 in a clockwise direction of the arrow (e.g., arrow for avoidance maneuver 1341) to position the end of the vehicle 100 in the path of the object 1371. Planner system may also command activation of other interior and exterior safety systems to coincide with the avoidance maneuver 1341, such as seat belt tensioning system, bladder system, acoustic beam-steering arrays 102 and light emitters 1202, for example.

In example 1345, the vehicle 100 has completed the avoidance maneuver 1341 and the object 1371 is approaching from an end of the vehicle 100 instead of the side of the vehicle 100. Based on the new relative orientation between the vehicle 100 and the object 1371, the planner system 310 may command selection and deployment of a bladder 1310' positioned on a bumper at the end of the vehicle 100. If an actual impact occurs, the crumple zone distance has increased from z1 to z2 (e.g., z2>z1) to provide a larger crumple zone in the interior 100i of the vehicle 100 for passengers P. Prior to the avoidance maneuver 1341, seat belts worn by passengers P may be been pre-tensioned by the seat belt tensioning system to secure the passengers P during the maneuver 1341 and in preparation for the potential impact of the object 1371.

In example 1345, a deployment time of the bladder 1310', Tdeploy, is determined to be less (e.g., by planner system 310) than the predicted impact time, Timpact, of the object 1371. Therefore, there is sufficient time to deploy bladder 1310' prior to a potential impact of the object 1371. A comparison of activation times and impact times may be performed for other safety systems such as the seat belt tensioning system, seat actuator system, acoustic arrays and light emitters, for example.

The drive system (e.g., 326 in FIG. 3B) may be commanded (e.g., via planner system 310) to rotate the wheels of the vehicle (e.g., via the steering system) and orient the vehicle 100 (e.g., via the propulsion system) to the configuration depicted in example 1345. The drive system may be commanded (e.g., via planner system 310) to apply brakes (e.g., via the braking system) to prevent the vehicle 100 from colliding with other objects in the environment (e.g., prevent the vehicle 100 from being pushed into other objects as a result of forces from the impact).

Figure 14:
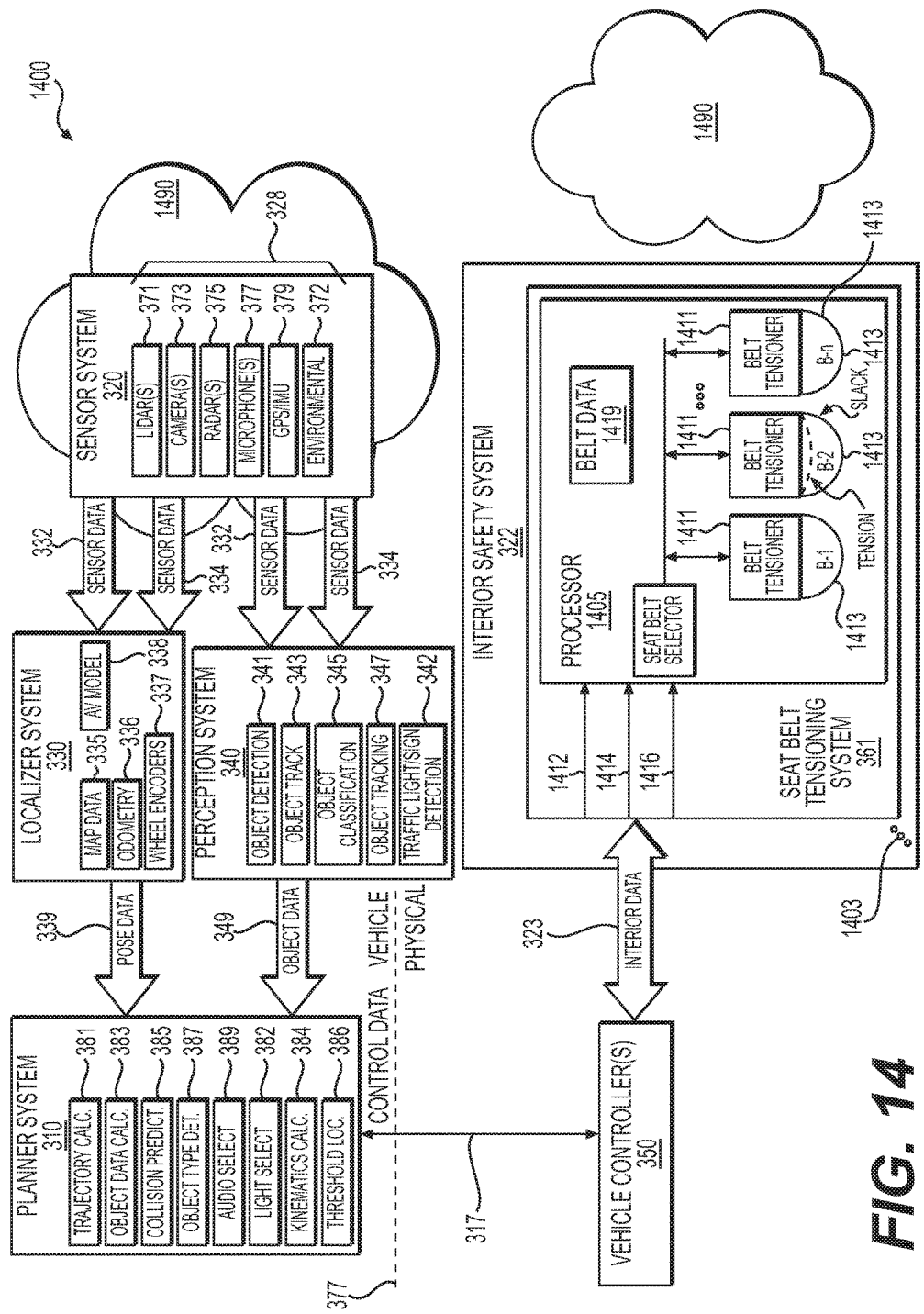
FIG. 14 depicts one example of a seat belt tensioning system in an interior safety system of an autonomous vehicle.

FIG. 14 depicts one example 1400 of a seat belt tensioning system in an interior safety system 322 of an autonomous vehicle 100. In FIG. 14, interior data 323 may be received by seat belt tensioning system 361. Interior data 323 may include but is not limited to data representing a belt tensioner select signal 1412, a seat belt tension trigger signal 1414, and a seat belt tension release signal 1416. The belt tensioner select signal 1412 may select one or more belt tensioners 1411, with each belt tensioner 1411 including a seat belt 1413 (also denoted as B-1, B-2 to B-n). Each belt 1413 may be mechanically coupled with a tensioning mechanism (not shown) in the belt tensioner 1411. The tensioning mechanism may include a reel configured to reel in a portion of the belt on the reel the belt 1413 is wrapped around to take the slack out of the belt 1413. A belt tensioner 1411 selected by the belt tensioner select signal 1412 may upon receiving the seat belt tension trigger signal 1414, apply tension to its respective belt 1413. For example, belt tensioner 1411 having belt 1413 (B-2) may actuate belt B-2 from a slack state (e.g., not tightly coupled to a passenger wearing belt B-2) to a tension state (denoted by dashed line). In the tension state, belt B-2 may apply pressure to a passenger that may tightly couple the passenger to the seat during an avoidance maneuver and/or in anticipation of a predicted collision with an object, for example.

The belt B-2 may be returned from the tension state to and back to the slack state by releasing the seat belt tension trigger signal 1414 or by releasing the seat belt tension trigger signal 1414 followed by receiving the seat belt tension release signal 1416. A sensor (e.g., a pressure or force sensor) (not shown) may detect whether a seat in the autonomous vehicle is occupied by a passenger and may allow activation of the belt tensioner select signal 1412 and/or the seat belt tension trigger signal 1414 if the sensor indicates the seat is occupied. If the seat sensor does not detect occupancy of a seat, then the belt tensioner select signal 1412 and/or the seat belt tension trigger signal 1414 may be de-activated. Belt data 1419 may include data representing belt characteristics including but not limited to a belt tensioning time, belt release times, and maintenance logs for the seat belts 1413 in seat belt system 361, for example. Seat belt system 361 may operate as a distinct system in autonomous vehicle 100 or may operate in concert with other safety systems of the vehicle 100, such as the light emitter(s), acoustic array(s), bladder system, seat actuators, and the drive system, for example.

Figure 15:
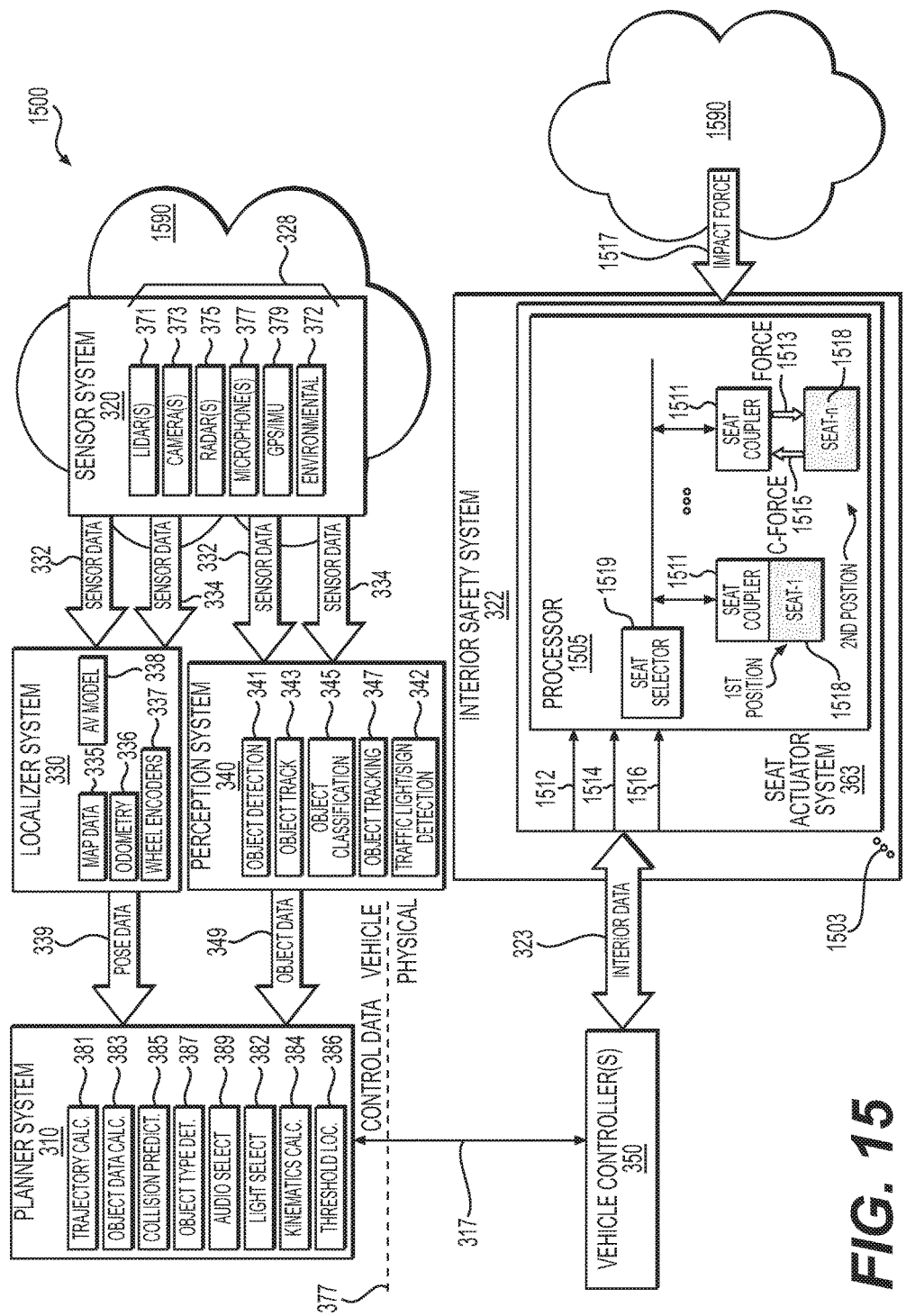
FIG. 15 depicts one example of a seat actuator system in an interior safety system of an autonomous vehicle.

FIG. 15 depicts one example 1500 of a seat actuator system 363 in an interior safety system 322 of an autonomous vehicle 100. In one example, the seat actuator system 363 may be configured to actuate a seat 1518 (e.g., a Seat-1 through a Seat-n) from a first position in the interior of the autonomous vehicle 100 to a second position in the interior of the autonomous vehicle 100 using energy from an impact force 1517 imparted to the vehicle 100 from an object (not shown) in the environment 1590 due to a collision between the vehicle 100 and the object (e.g., another vehicle). A force 1513 mechanically communicated to the seat (e.g., Seat-n) from the impact force 1517, may move the seat from the first position (e.g., near an end of the vehicle 100) to a second position (e.g., towards the center of the interior 100*i* of the vehicle 100), for example. A counter acting force c-force 1515 may be applied to the seat (e.g., Seat-n) to control acceleration forces caused by the force 1513 (note, that while not shown, the directions of c-force 1515 and force 1513 as depicted in FIG. 15 may be in substantially common direction of impact force 1517). The counter acting force c-force 1515 may be a spring being configured to compress to counteract force 1513 or being configured to stretch to counteract force 1513. In other examples, counter acting force c-force 1515 may be generated by a damper (e.g., a shock absorber) or by an air spring, for example. A mechanism that provides the counter acting force c-force 1515 may be coupled to a seat coupler 1511 and to the seat (e.g., Seat-n). The seat coupler 1511 may be configured to anchor the mechanism that provides the counter acting force c-force 1515 to a chassis or other structure of the vehicle 100. As the impact force 1517 causes mechanical deformation of the structure of the vehicle 100 (e.g., collapses a crumple zone), a ram or other mechanical structure coupled to the seat may be urged forward (e.g., from the first position to the second position) by the deforming structure of the vehicle to impart the force 1513 to the seat, while the counter acting force c-force 1515 resists the movement of the seat from the first position to the second position.

In other examples, seat coupler 1511 may include an actuator to electrically, mechanically, or electromechanically actuate a seat 1518 (e.g., the Seat-n) from the first position to the second position in response to data representing a trigger signal 1516. Seat coupler 1511 may include a mechanism (e.g., a spring, a damper, an air spring, a deformable structure, etc.) that provides the counter acting force c-force 1515. Data representing a seat select 1512 and data representing an arming signal 1514 may be received by a processor 1505. A seat selector 1519 may select one or more of the seat couplers 1511 based on the data representing the seat select 1512. Seat selector 1519 may not actuate a selected seat until the data representing the arming signal 1514 is received. The data representing the arming signal 1514 may be indicative of a predicted collision with the vehicle 100 having a high probability of occurring (e.g., an object based on its motion and location is predicted to imminently collide with the vehicle}. The data representing the arming signal 1514 may be used as a signal to activate the seat belt tensioning system. Seats 1518 (e.g., seat-1 through seat-n) may be seats that seat a single passenger (e.g., a bucket seat) or that seat multiple passengers (e.g., a bench seat), for example. The seat actuator system 363 may act in concert with other interior and exterior safety systems of the vehicle 100.

Figure 16A:
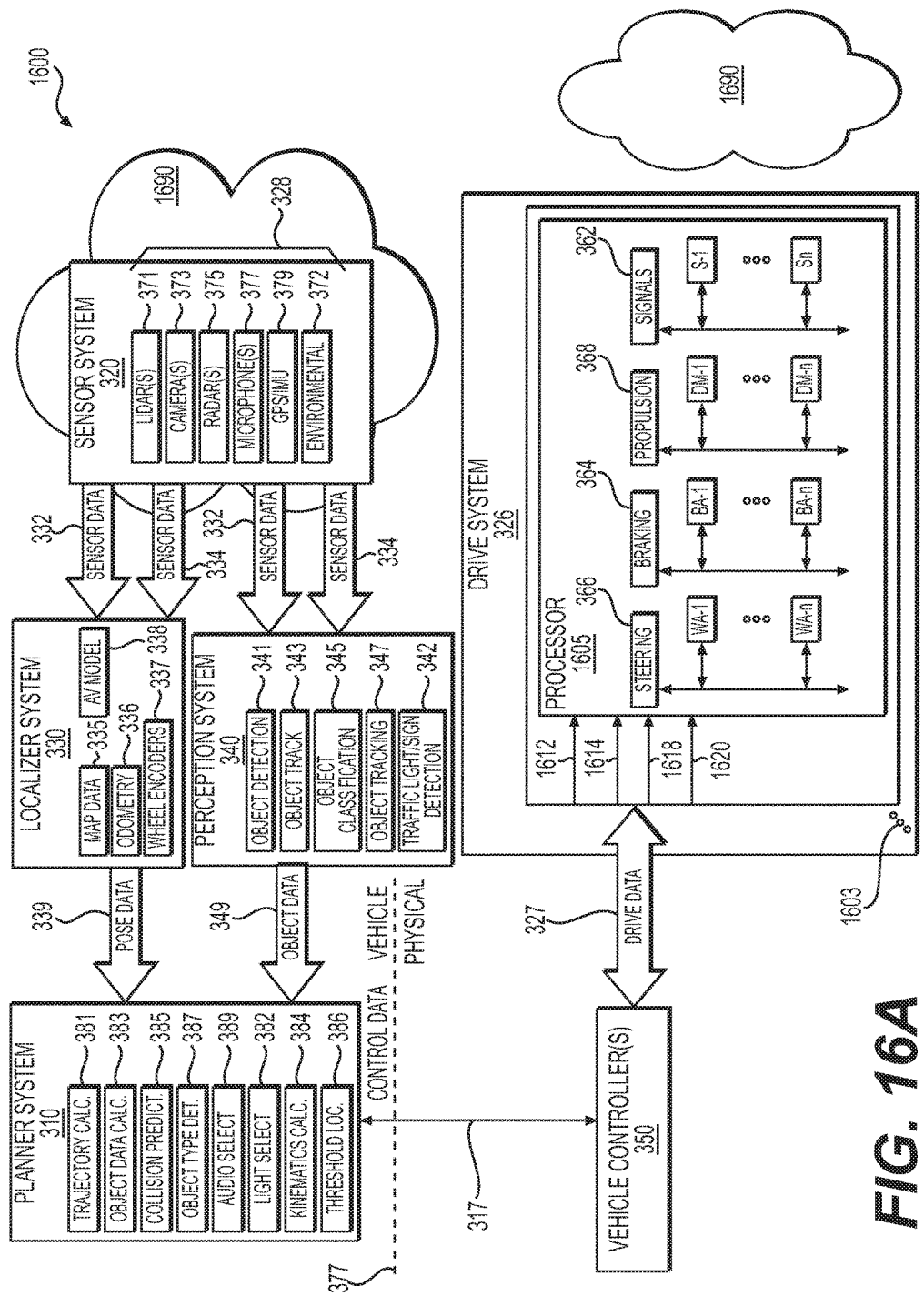
FIG. 16A depicts one example of a drive system in an autonomous vehicle.

FIG. 16A depicts one example 1600 of a drive system 326 in an autonomous vehicle 100. In FIG. 16A, drive data 327 communicated to drive system 326 may include but is not limited to data representing steering control 1612, braking control 1614, propulsion control 1618 and signal control 1620. Drive data 327 may be used for normal driving operations of the autonomous vehicle 100 (e.g., picking up passengers, transporting passengers, etc.), but also may be used to mitigate or avoid collisions and other potentially dangerous events related to objects in an environment 1690.

Processor 1605 may communicate drive data 327 to specific drive systems, such as steering control data to the steering system 361, braking control data to the braking system 364, propulsion control data to the propulsion system 368 and signaling control data to the signaling system 362. The steering system 361 may be configured to process steering data to actuate wheel actuators WA-1 through WA-n. Vehicle 100 may be configured for multi-wheel independent steering (e.g., four wheel steering). Each wheel actuator WA-1 through WA-n may be configured to control a steering angle of a wheel coupled with the wheel actuator. Braking system 364 may be configured to process braking data to actuate brake actuators SA-1 through SA-no Braking system 364 may be configured to implement differential braking and anti-lock braking, for example. Propulsion system 368 may be configured to process propulsion data to actuate drive motors OM-1 through OM-n (e.g., electric motors). Signaling system 362 may process signaling data to activate signal elements 5-1 through 5-*n* (e.g., brake lights, turn signals, headlights, running lights, etc.). In some examples, signaling system 362 may be configured to use one or more light emitters 1202 to implement a signaling function. For example, signaling system 362 may be configured to access all or a portion of one or more light emitters 1202 to implement a signaling function (e.g., brake lights, turn signals, headlights, running lights, etc.).

Figure 16B:
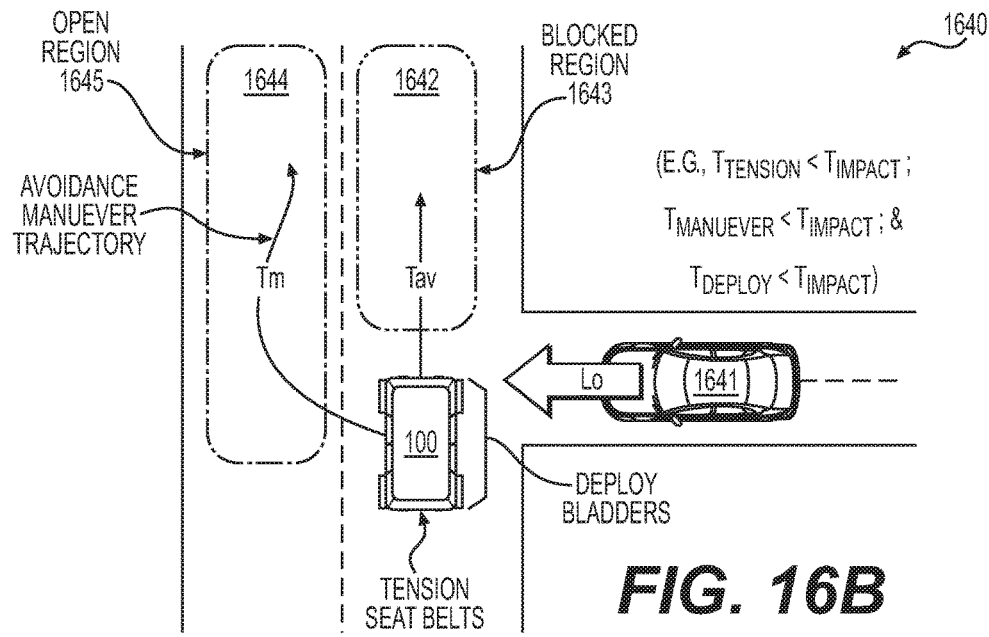
FIG. 16B depicts one example of obstacle avoidance maneuvering in an autonomous vehicle.

FIG. 16B depicts one example 1640 of obstacle avoidance maneuvering in an autonomous vehicle 100. In FIG. 168, an object 1641 (e.g., an automobile) has a predicted location Lo that is in conflict with trajectory Tav of autonomous vehicle 100. The planner system may calculate that there is not sufficient time to use the drive system to accelerate the vehicle 100 forward to a region 1642 located along trajectory Tav because the object 1641 may collide with the vehicle 100; therefore, region 1642 may not be safely maneuvered into and the region 1642 may be designated (e.g., by the planner system) as a blocked region 1643. However, the planner system may detect (e.g., via sensor data received by the perception system and map data from the localizer system) an available open region in the environment around the vehicle 100. For example, a region 1644 may be safely maneuvered into (e.g., region 1644 has no objects, moving or static, to interfere with the trajectory of the vehicle 100). The region 1644 may be designated (e.g., by the planner system) as an open region 1645. The planner system may command the drive system (e.g., via steering, propulsion, and braking data) to alter the trajectory of the vehicle 100 from its original trajectory Tav to an avoidance maneuver trajectory Tm, to autonomously navigate the autonomous vehicle 100 into the open region 1645.

In concert with obstacle avoidance maneuvering, the planner system may activate one or more other interior and/or exterior safety systems of the vehicle 100, such causing the bladder system to deploy bladders on those portions of the vehicle that may be impacted by object 1641 if the object 1641 changes velocity or in the event the obstacle avoidance maneuver is not successful.

The seat belt tensioning system may be activated to tension seat belts in preparation for the avoidance maneuver and to prepare for a potential collision with the object 1641. Although not depicted in FIG. 16B, other safety systems may be activated, such as one or more acoustic arrays 102 and one or more light emitters 1202 to communicate acoustic alerts and visual alerts to object 1641. Belt data and bladder data may be used to compute tensioning time for seat belts and bladder deployment time for bladders and those computed times may be compared to an estimated impact time to determine if there is sufficient time before an impact to tension belts and/or deploy bladders (e.g., Tdeploy<Timpact and/or Ttensian<Timpact). Similarly, the time necessary for drive system to implement the maneuver into the open region 1645 may compared to the estimated impact time to determine if there is sufficient time to execute the avoidance maneuver (e.g., Tmaneuver<Timpact).

Figure 16C:
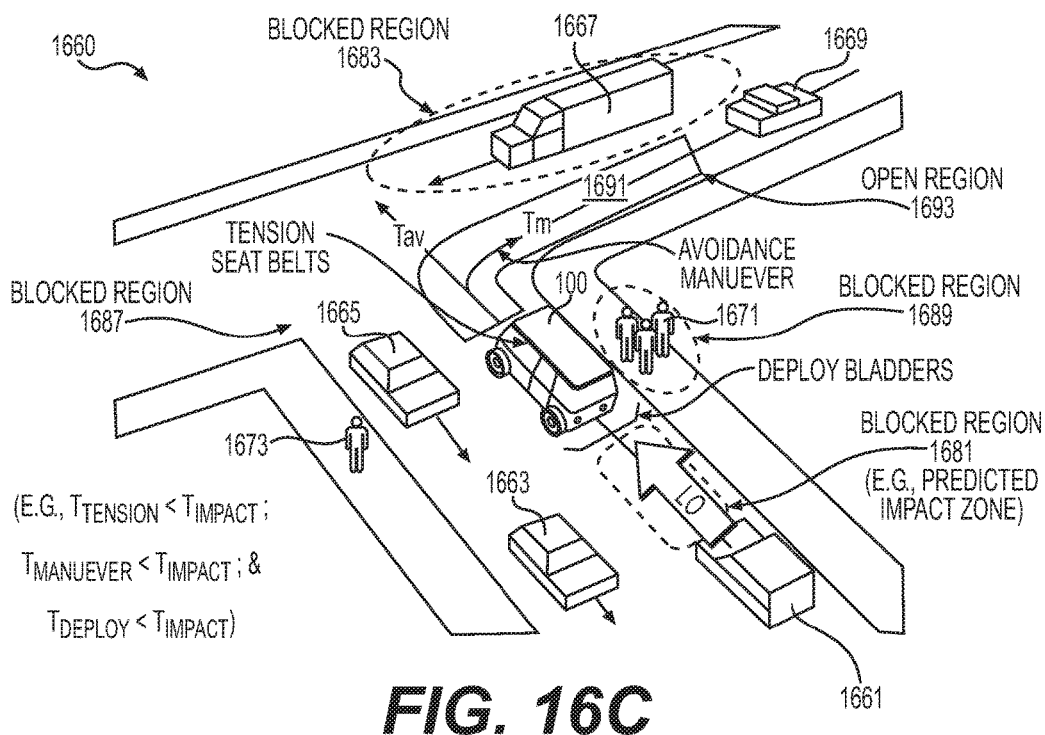
FIG. 16C depicts another example of obstacle avoidance maneuvering in an autonomous vehicle.

FIG. 16C depicts another example 1660 of obstacle avoidance maneuvering in an autonomous vehicle 100. In FIG. 16C, an object 1661 has a predicted location La that may result in a collision (e.g., a rear-ending) of autonomous vehicle 100. Planner system may determine a predicted impact zone (e.g., a region or probabilities where a collision might occur based on object dynamics). Prior to a predicted collision occurring, planner system may analyze the environment around the vehicle 100 (e.g., using the overlapping sensor fields of the sensor in the sensor system) to determine if there is an open region the vehicle 100 may be maneuvered into. The predicted impact zone is behind the vehicle 100 and is effectively blocked by the predicted location La having a velocity towards the location of the vehicle 100 (e.g., the vehicle cannot safely reverse direction to avoid the potential collision). The predicted impact zone may be designated (e.g., by the planner system) as a blocked region 1681. Traffic lanes to the left of the vehicle 100 lack an available open region and are blocked due to the presence of three objects 1663, 1665 and 1673 (e.g., two cars located in the adjacent traffic lane and one pedestrian on a sidewalk). Accordingly, the region may be designated as blocked region 1687. A region ahead of the vehicle 100 (e.g., in the direction of trajectory Tav) is blocked due to the approach of a vehicle 1667 (e.g., a large truck). A location to the right of the vehicle 100 is blocked due to pedestrians 1671 on a sidewalk at that location. Therefore, those regions may be designated as blocked region 1683 and 1689, respectively. However, a region that is free of objects may be detected (e.g., via the planner system and perception system) in a region 1691. The region 1691 may be designated as an open region 1693 and the planner system may command the drive system to alter the trajectory from trajectory Tav to an avoidance maneuver trajectory Tm. The resulting command may cause the vehicle 100 to turn the corner into the open region 1693 to avoid the potential rear-ending by object 1661.

In concert with the avoidance maneuver into the open region 1693, other safety systems may be activated, such as bladders 1310 on an end of the vehicle 100, seat belt tensioners 1411, acoustic arrays 102, seat actuators 1511, and light emitters 1202, for example. As one example, as the vehicle 1661 continues to approach the vehicle 100 on predicted location Lo, one or more bladders 1301 may be deployed (e.g., at a time prior to a predicted impact time to sufficiently allow for bladder expansion to a deployed position), an acoustic alert may be communicated (e.g., by one or more acoustic beam-steering arrays 102), and a visual alert may be communicated (e.g., by one or more light emitters 1202).

Planner system may access data representing object types (e.g. data on vehicles such as object 1661 that is predicted to rear-end vehicle 100) and compare data representing the object with the data representing the object types to determine data representing an object type (e.g., determine an object type for object 1661). Planner system may calculate a velocity or speed of an object based data representing a location of the object (e.g., track changes in location over time to calculate velocity or speed using kinematics calculator 384). Planner system may access a data store, look-up table, a data repository or other data source to access data representing object braking capacity (e.g., braking capacity of vehicle 1661). The data representing the object type may be compared with the data representing object braking capacity to determine data representing an estimated object mass and data representing an estimated object braking capacity. The data representing the estimated object mass and the data representing the estimated object braking capacity may be based on estimated data for certain classes of objects (e.g., such as different classes of automobiles, trucks, motorcycles, etc.). For example, if object 1661 has an object type associated with a mid-size four door sedan, than an estimated gross vehicle mass or weight that may be an average for that class of vehicle may represent the estimated object mass for object 1661. The estimated braking capacity may also be an averaged value for the class of vehicle.

Planner system may calculate data representing an estimated momentum of the object based on the data representing the estimated object braking capacity and the data representing the estimated object mass. The planner system may determine based on the data representing the estimated momentum, that the braking capacity of the object (e.g., object 1661) is exceeded by its estimated momentum. The planner system may determine based on the momentum exceeding the braking capacity, to compute and execute the avoidance maneuver of FIG. 16C to move the vehicle 100 away from the predicted impact zone and into the open region 1693.

Figure 17:
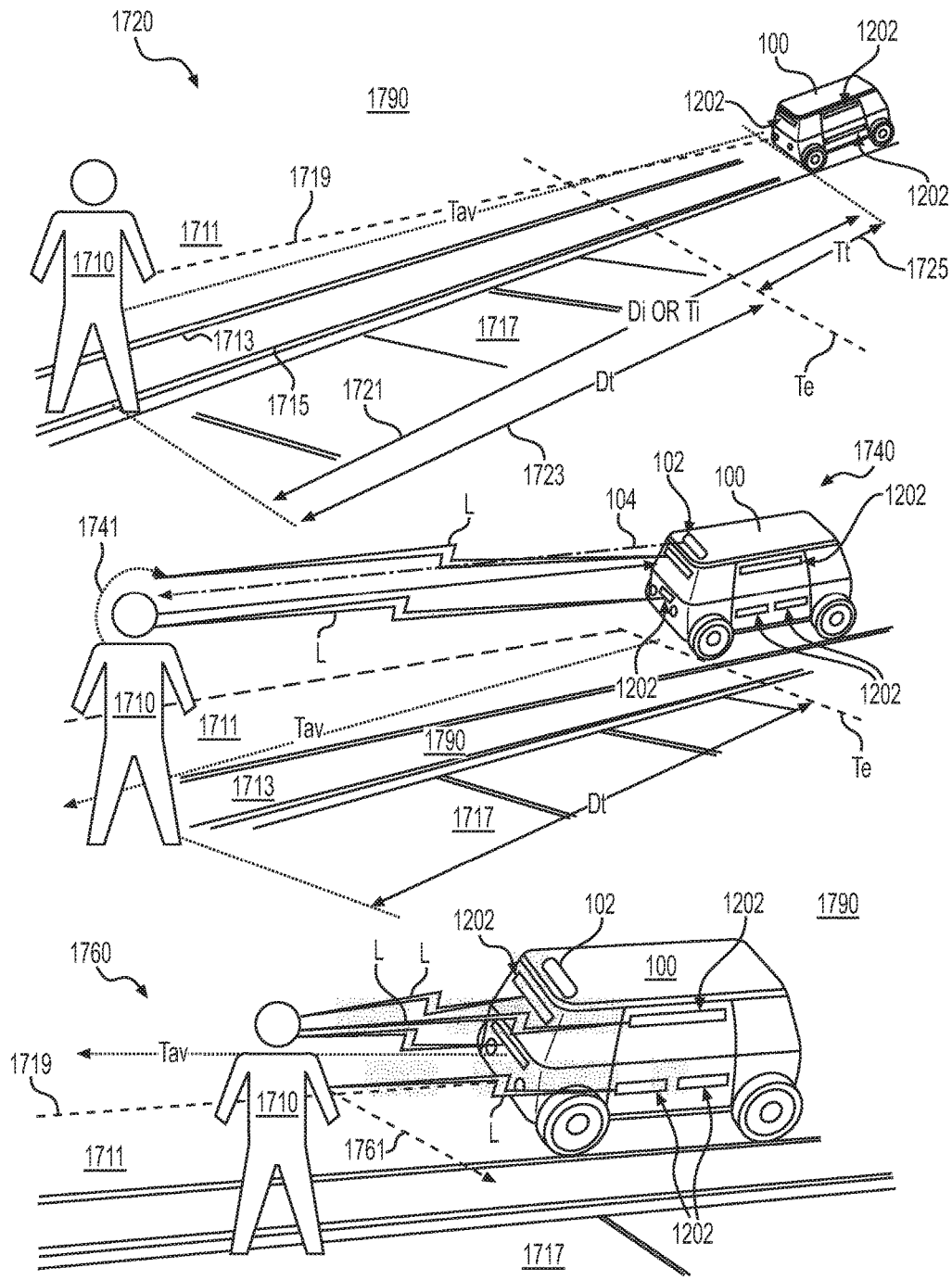
FIG. 17 depicts examples of visual communication with an object in an environment using a visual alert from light emitters of an autonomous vehicle.

FIG. 17 depicts examples of visual communication with an object in an environment using a visual alert from light emitters of an autonomous vehicle 100. In example 1720 the autonomous vehicle 100 includes light emitters 1202 positioned at various locations external to the autonomous vehicle 100. The autonomous vehicle 100 is depicted as navigating a roadway 1711 having lane markers 1719 in an environment 1790 external to the vehicle 100 and having a trajectory Tav. An object 1710 in environment 1790 (e.g., classified as a pedestrian object by the perception system of the vehicle 100) is depicted as standing on a curb 1715 of a sidewalk 1717 adjacent to the roadway 1711. The object 1710 is standing close to a bicycle lane 1713 of the roadway 1711. Initially, the object 1710 may not be aware of the approach of the autonomous vehicle 100 on the roadway 1711 (e.g., due to low noise emission by the drive system of the vehicle 100, ambient noise, etc.). The perception system (e.g., 340 in FIG. 12A) may detect the presence of the object 1710 in the environment based on a sensor signal from the sensor system (e.g., 320 in FIG. 12A) and may generate object data representative of the object 1710 including but not limited to object classification, object track, object type, a location of the object in the environment 1790, a distance between the object and the vehicle 100, an orientation of the vehicle 100 relative to the object, a predictive rate of motion relative to the location of the object, etc., for example.

Further to example 1720, a planner system of the vehicle 100 (e.g., 310 in FIG. 12A) may be configured to implement an estimate of a threshold event associated with the one or more of the light emitters 1202 emitting light L as a visual alert. For example, upon detecting the object 1710, the planner system may not immediately cause a visual alert to be emitted by the light emitter(s) 1202, instead, the planner system may estimate, based on data representing the location of the object 1710 in the environment 1790 and data representing a location of the vehicle 100 (e.g., pose data from localizer system 330 of FIG. 12A) in the environment 1790, a threshold event Te associated with causing the light emitter(s) to emit light L for the visual alert.

As one example, as the vehicle 100 travels along trajectory Tav and detects the object 1710, at the time of detection an initial distance between the vehicle 100 and the object 1710 may be a distance Di. The planner system may compute another distance closer to the object as a threshold event to cause (e.g., to trigger) the light emitter(s) 1202 to emit light L for the visual alert. In example 1720, a distance Dt between the vehicle 100 and the object 1710 may be the distance associated with the threshold event Te. Further to the example, the threshold event Te may be associated with the distance Dt as that distance may be a more effective distance at which to cause a visual alert for a variety of reasons including but not limited to the vehicle 100 being too far away at the initial distance of Oi for the light L to be visually perceptible to the object 1710, and/or the object 1710 not perceiving the light L is being directed at him/her, etc., for example. As another example, the initial distance Di may be about 150 feet and the distance Dt for the threshold event Te may be about 100 feet.

As a second example, as the vehicle 100 travels along trajectory Tav and detects the object 1710, at the time of detection an initial time for the vehicle 100 to close the distance Oi between the vehicle 100 and the object 1710 may be a time Ti. The planner system may compute a time after the time Ti as the threshold event Te. For example, a time Tt after the initial time of Ti, the threshold event Te may occur and the light emitter(s) 1202 may emit the light L.

In example 1740, the vehicle 100 is depicted as having traveled along trajectory from the initial distance Di to the distance Dt where the light emitter(s) 1202 are caused to emit the light L. One or more of the emitters 1202 positioned at different locations on the vehicle 100 may emit the light L according to data representing a light pattern. For example, initially, at the threshold event Te (e.g., at the time Tt or the distance Dt) light L from light emitters 1202 on a first end of the vehicle 100 facing the direction of travel (e.g., aligned with trajectory Tav) may emit the light L because the first end is facing the object 1710. Whereas, light emitters 1210 on a side of the vehicle facing the sidewalk 1717 may not be visible to the object 1710 at the distance Dt, for example.

Optionally, the planner system may activate one or more other safety systems of the vehicle 100 before, during, or after the activation of the visual alert system. As one example, one or more acoustic beam steering arrays 102 may be activated to generate a steered beam 104 of acoustic energy at the object 1710. The steered beam 104 of acoustic energy may be effective at causing the object 1710 to take notice of the approaching vehicle 100 (e.g., by causing the object 1710 to turn 1741 his/her head in the direction of the vehicle 100).

In example 1760, the vehicle 100 is even closer to the object 1710 and other light emitter(s) 1202 may be visible to the object 1710 and the planner system may activate additional light emitters 1202 positioned on the side of vehicle facing the sidewalk 1717, for example. Further to example 1760, the visual alert and/or visual alert in combination with an acoustic alert (e.g., from array 102) may be effective at causing the object 1710 to move 1761 onto the sidewalk 1717 and further away (e.g., to a safe distance) from the trajectory Tav of the approaching vehicle 100. After the vehicle 100 has passed by the object 1710, the light emitter(s) 1202 and other safety systems that may have been activated, may be deactivated.

Figure 18:
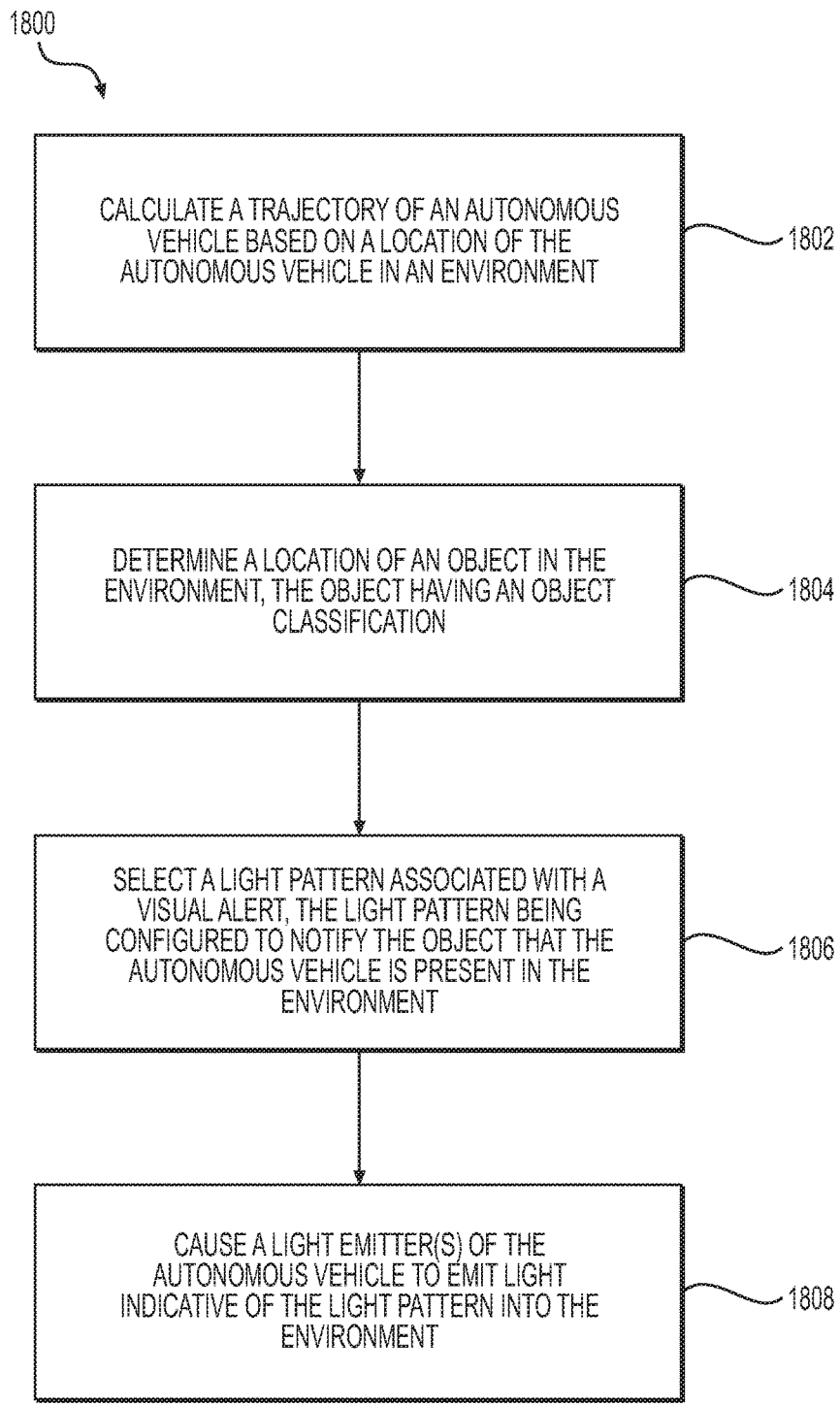
FIG. 18 depicts another example of a flow diagram for implementing a visual alert from a light emitter in an autonomous vehicle.

FIG. 18 depicts another example of a flow diagram 1800 for implementing a visual alert from a light emitter in an autonomous vehicle 100. In flow 1800, at a stage 1802 data representing a trajectory of the autonomous vehicle 100 in the environment (e.g., environment 1790 of FIG. 17) may be calculated based on data representing a location of the autonomous vehicle 100 in the environment. At a stage 1804, data representing a location of an object in the environment (e.g., object 1710 of FIG. 17) may be determined (e.g., using sensor data received at a perception system). The object may have an object classification (e.g., object 1710 of FIG. 17 classified as a pedestrian). At a stage 1806, data representing a light pattern associated with a visual alert may be selected (e.g., from a data store, a memory, or a data file, etc.). The light pattern that is selected may be configured to visually notify the object (e.g., a pedestrian or a driver of another vehicle) that the autonomous vehicle 100 is present in the environment (e.g., environment 1790 of FIG. 17). The light pattern may be selected based on the object classification. For example, a first light pattern may be selected for an object having a pedestrian classification, a second light pattern may be selected for an object having a bicyclist classification, and a third light pattern may be selected for an object having an automotive classification, where the first, second and third light patterns may be different from one another.

At a stage 1808 a light emitter of the autonomous vehicle 100 may be caused to emit light L indicative of the light pattern into the environment. At the stage 1808, the light emitter may be selected based on an orientation of the vehicle 100 relative to the object (e.g., object 1710 of FIG. 17), for example. Data representing an orientation of the autonomous vehicle 100 relative to a location of the object may be calculated based on the data representing the location of the object and the data representing the trajectory of the autonomous vehicle, for example.

The light emitter may include one or more sub-sections (not shown), and the data representing the light pattern may include one or more sub-patterns, with each sub-pattern being associated with one of the sub-sections. Each sub-section may be configured to emit light L into the environment indicative of its respective sub-pattern. The autonomous vehicle 100 may include numerous light emitters and some or all of those light emitters may include the one or more sub-sections. In some examples, sub-sections of light emitters may be configured (e.g., via their respective sub-patterns) to perform different functions. For example, one or more sub-sections of a light emitter may implement signaling functions of the drive system (e.g., turn signals, brake lights, hazard lights, running lights, fog lights, head lights, side marker lights, etc.); whereas, one or more other sub-sections may implement visual alerts (e.g., via their respective sub-patterns).

Data representing a threshold event (e.g., threshold event Te of FIG. 17) may be estimated based on the data representing the location of the object and the data representing the location of the autonomous vehicle 100. An occurrence of the threshold event may be detected (e.g., by object data, pose data, or both received by the planner system) and one or more light emitters may be caused to emit the light L based on the occurrence of the threshold event.

In one example, estimating the data representing the threshold event may include calculating data representing a distance between the autonomous vehicle and the object based on the data representing the location of the autonomous vehicle and the data representing the location of the object. A threshold distance associated with the threshold event may be determined based on the data representing the distance between the autonomous vehicle and the object. The light pattern selected at the stage 1806 may be determined based on the threshold distance, for example. The threshold distance (e.g., Dt of FIG. 17) may be less than the distance (e.g., Di of FIG. 17).

In another example, estimating the data representing the threshold event may include calculating data representing a time associated with the location of the autonomous vehicle 100 and the location of the object being coincident with each other (e.g., Ti in FIG. 17), based on the data representing the location of the object and the data representing the trajectory of the autonomous vehicle 100. A threshold time (e.g., Tt of FIG. 17) may be determined based on the data representing the time associated with the location of the autonomous vehicle 100 and the location of the object being coincident with each other. The threshold time (e.g., Tt of FIG. 17) may be less than the time (e.g., Ti of FIG. 17).

Figure 19:
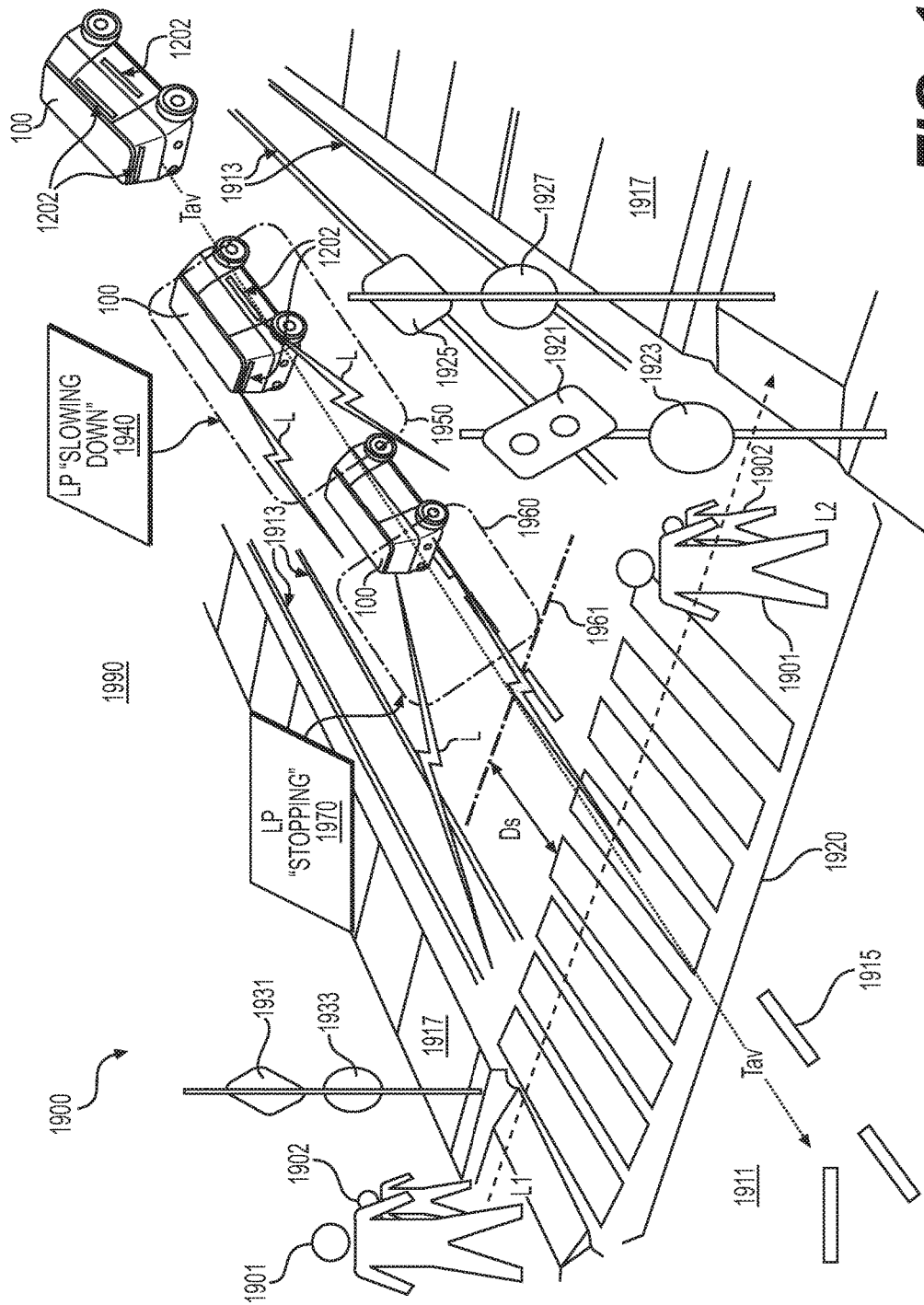
FIG. 19 depicts an example of visual communication with an object in an environment using a visual alert from light emitters of an autonomous vehicle.

FIG. 19 depicts an example 1900 of visual communication with an object in an environment using a visual alert from light emitters of an autonomous vehicle 100. In example 1900, the autonomous vehicle 100 is autonomously navigating a trajectory Tav along a roadway 1911 having lane markers 1915, bicycle paths 1913, sidewalks 1917, a pedestrian cross-walk 1920, traffic signs 1923, 1925, 1927, 1931 and 1933, and traffic light 1921 (e.g., as detected and classified by the perception system). Two objects 1901 and 1902 have been detected by the autonomous vehicle 100 and may be classified as pedestrian objects having a predicted location Lo in environment 1990.

Based on data representing the traffic signs, the traffic light, or both, the autonomous vehicle may determine whether or not objects 1901 and 1902 are crossing the roadway 1911 legally (e.g., as permitted by the traffic signs 1923, 1925, 1927, 1931, and 1933 and/or traffic light 1921) or illegally (e.g., as forbidden by the traffic signs and/or traffic light). In either case, the autonomous vehicle 100 may be configured (e.g., via the planner system) to implement the safest interaction between the vehicle 100 and objects in the environment in interest of the safety of passengers of the vehicle 100, safety of the objects (e.g., 1901 and 1902), or both.

As the pedestrian objects 1901 and 1902 traverse the cross-walk 1920 from a first location L1 to a second location L2, the autonomous vehicle 100 may detect (e.g., via the sensor system and the perception system) a change in the predicted location La of the objects 1901 and 1902 and may cause a visual alert to be emitted by one or more light emitters 1202 (e.g., based on an orientation of the vehicle 100 relative to the objects 1901 and 1902). Data representing a location of the vehicle 100 in the environment 1990 may be used to calculate data representing a trajectory of the vehicle 100 in the environment 1990 (e.g., trajectory Tav along roadway 1911). Data representing a location of the objects 1901 and 1902 in environment 1990 may be determined based on data representing a sensor signal from the sensor system (e.g., sensor data received by the perception system to generate object data), for example.

A light pattern associated with a visual alert may be selected (e.g., by the planner system) to notify the objects 1901 and 1902 of a change in driving operations of the vehicle 100. For example, as the objects 1901 and 1902 traverse the cross-walk 1920 from the first location L1 to the second location L2, the pedestrians may be concerned that the autonomous vehicle 100 has not recognized their presence and may not stop or slow down before the pedestrians (e.g., objects 1901 and 1902) safely cross the cross-walk 1920. Accordingly, the pedestrians may be apprehensive of being struck by the autonomous vehicle 100.

The autonomous vehicle 100 may be configured to notify the pedestrians (e.g., objects 1901 and 1902) that the vehicle 100 has detected their presence and is acting to either slow down, stop or both at a safe distance from the cross-walk 1920. For example, at a region 1950 along the roadway 1911, a light pattern LP 1940 may be selected and may be configured to visually notify (e.g., using light L emitted by light emitters 1202) the objects 1901 and 1902 that the vehicle is slowing down. The slowing down of the vehicle 100 may be indicated as a change in driving operations of the vehicle 100 that are implemented in the light pattern 1940. As one example, as the vehicle 100 slows down, a rate of flashing, strobing or other pattern of the light L emitted by light emitters 1202 may be varied (e.g., slowed down) to mimic the slowing down of the vehicle 100. The light pattern 1940 may be modulated with other data or signals indicative of the change in driving operations of the vehicle 100, such as a signal from a wheel encoder (e.g., a rate of wheel rotation for wheels 852 of FIG. 8), location data (e.g., from a GPS and/or IMU), a microphone (e.g., 871 of FIG. 8) being configured to generate a signal indicative of drive operations, etc., for example. In other examples, the light pattern 1940 may include encoded data configured to mimic the change in driving operations of the vehicle 100.

In the region 1950, as the vehicle 100 slows down, the pattern of light L emitted by the light emitters 1202 may change as a function of the velocity, speed, wheel rotational speed, or other metric, for example. In other examples, the driving operations of the vehicle 100 may bring the vehicle to a stop in a region 1960 and a light pattern 1970 may be selected to notify the objects 1901 and 1902 that the driving operations are bringing the vehicle to a stop (e.g., at or before a safe distance Ds from the cross-walk 1920). Dashed line 1961 may represent a predetermined safe distance Ds between the vehicle 100 and the cross-walk 1920 in which the vehicle 100 is configured to stop. As one example, as the vehicle slows down to a stop in the region 1960, the light pattern emitted by light emitters 1202 may change from a dynamic pattern (e.g., indicating some motion of the vehicle 100) to a static pattern (e.g., indicating no motion of the vehicle 100). The light pattern 1970 may be modulated with other data or signals indicative of the change in driving operations of the vehicle 100 as described above to visually indicate the change in driving operations to an object.

Figure 20:
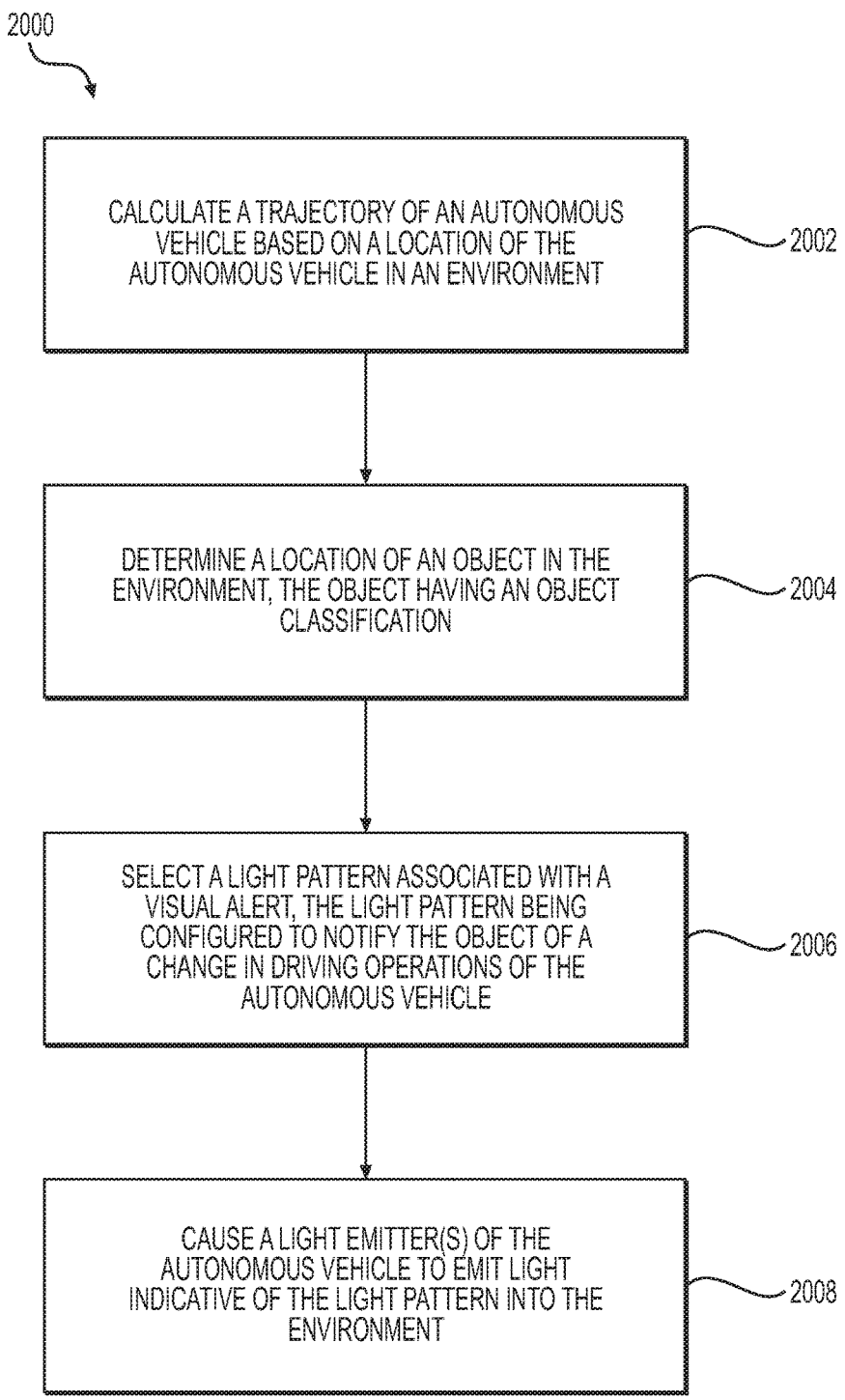
FIG. 20 depicts yet another example of a flow diagram for implementing a visual alert from a light emitter in an autonomous vehicle.

FIG. 20 depicts yet another example of a flow diagram 2000 for implementing a visual alert from a light emitter in an autonomous vehicle 100. At a stage 2002, data representing a trajectory of the autonomous vehicle 100 (e.g., trajectory Tav) may be calculated based on data representing a location of the vehicle 100 in the environment. At a stage 2004, a location of an object in the environment (e.g., objects 1901 and 1902) may be determined. The detected objects may include an object classification (e.g., a pedestrian object classification for objects 1901 and 1902). At a stage 2006, data representing a light pattern associated with a visual alert and being configured to notify an object of a change in driving operations of the vehicle 100 may be selected. At a stage 2008, light emitter(s) 1202 of the autonomous vehicle 100 may be caused to emit light L indicative of the light pattern into the environment. Light emitters 1202 selected to emit the light L may change as an orientation of the autonomous vehicle 100 changes relative to a location of the object.

Stopping motion and/or slowing down motion of the vehicle 100 may be implemented by the planner system commanding the drive system to change driving operations of the vehicle 100. The drive system may implement the commands from the planner system by controlling operations of the steering system, the braking system, the propulsion system, a safety system, a signaling system, or combinations of the foregoing.

Figure 21:
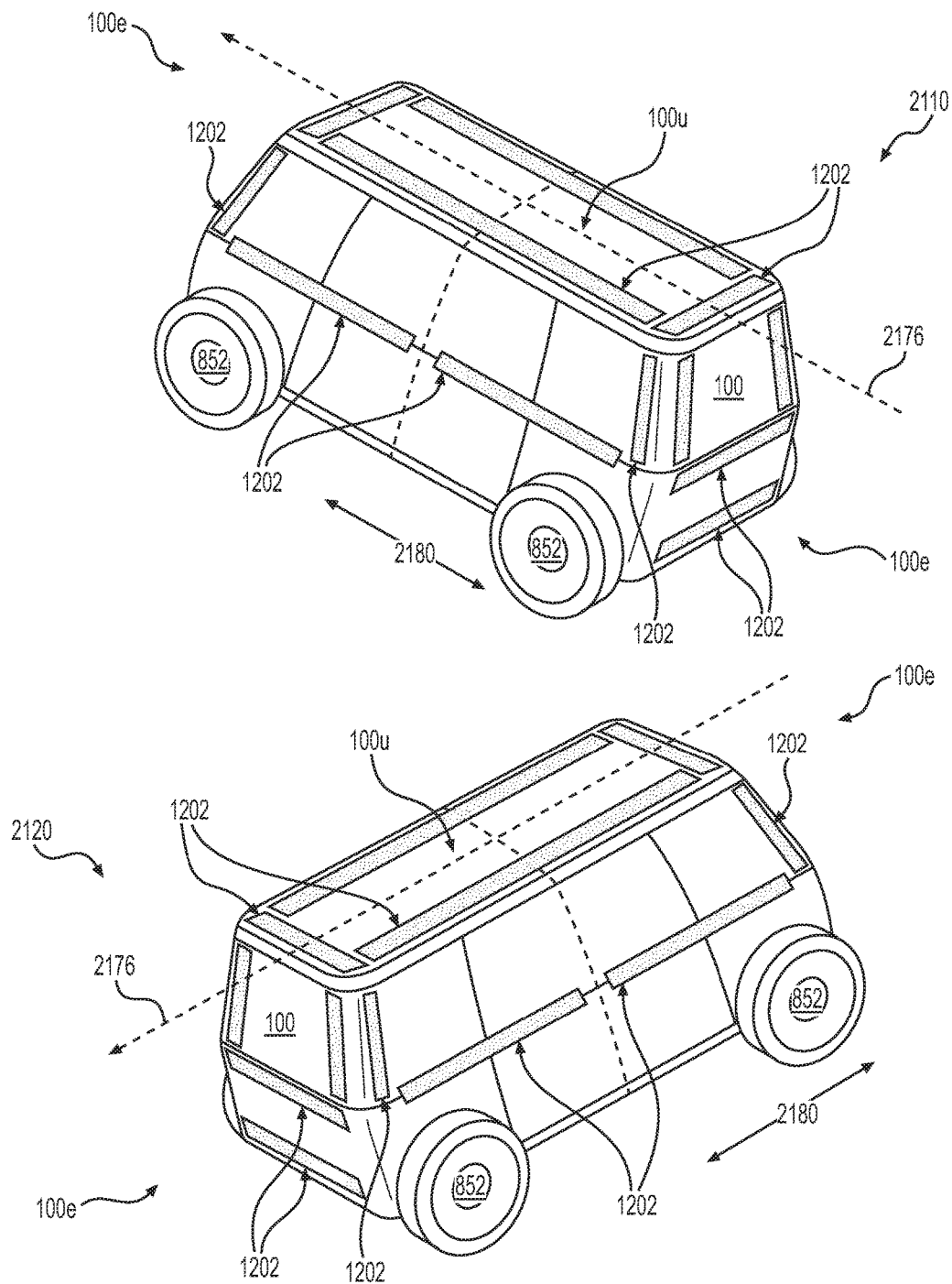
FIG. 21 depicts profile views of other examples of light emitters positioned external to an autonomous vehicle.

FIG. 21 depicts profile views of other examples 2110 and 2120 of light emitters positioned external to an autonomous vehicle 100. The autonomous vehicle 100 may be configured for driving operations in multiple directions as denoted by arrow 2180. In example 2110, a partial profile view of a first end of the vehicle 100 (e.g., a view along direction of arrow 2176) depicts several light emitters 1202 disposed at different positions external to the vehicle 100. The first end of the vehicle 100 may include light emitters 1202 that may serve multiple functions (denoted as 2101) such as visual alerts and/or signaling functions, such as brake lights, turn signals, hazard lights, head lights, running lights, etc. Light emitters 1202 may be positioned in a variety of locations including but not limited to pillar sections, roof 100u, doors, bumpers, wheels, wheel covers, wheel wells, hub caps, and fenders, for example. In some examples, one or more of the light emitters 1202 may be positioned behind an optically transparent surface or structure of the vehicle 100, such as behind a window, a lens, and a covering, etc., for example. Light L emitted by the light emitter 1202 may pass through the optically transparent surface or structure and into the environment.

In example 2120, a second end of the vehicle 100 (e.g., view along direction opposite of arrow 2176) may include light emitters 1202 that may be configured for automotive signaling functions (denoted as 2103) and/or visual alert functions. Light emitters 1202 depicted in example 2120 may also be positioned in a variety of locations including but not limited to pillar sections, roof 100u, doors, bumpers, wheels, wheel covers, wheel wells, hub caps, and fenders, for example.

Figure 22:
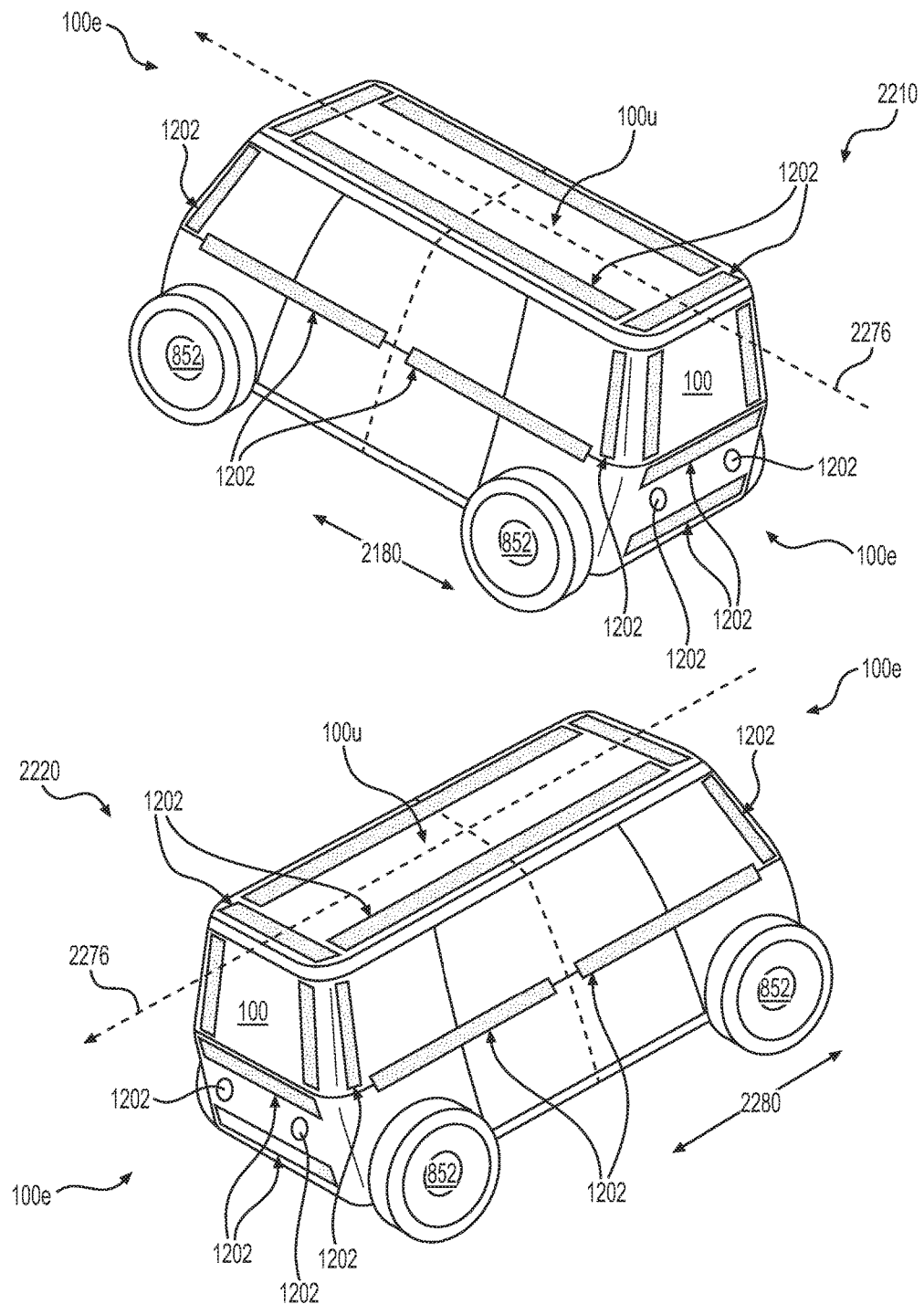
FIG. 22 depicts profile views of yet other examples of light emitters positioned external to an autonomous vehicle.

FIG. 22 depicts profile views of additional examples 2210 and 2220 of light emitters positioned external to an autonomous vehicle 100. The autonomous vehicle 100 may be configured for driving operations in multiple directions as denoted by arrow 2280. In example 2210, at a first end of the vehicle 100 (e.g., a view along direction of arrow 2276) the light emitters 1202 having the circular shape may be configured for signaling only functions or may be configured for visual alerts and for signaling functions (e.g., as determined by the planner system via commands to the drive system). Similarly, in example 2220, at a second end of the vehicle 100 (e.g., view along direction opposite of arrow 2276) the light emitters 1202 having the circular shape may also be configured for signaling only functions or may be configured for visual alerts and for signaling functions. Light emitters 1202 depicted in examples 2210 and 2220 may also be positioned in a variety of locations including but not limited to pillar sections, roof 100u, doors, bumpers, wheels, wheel covers, wheel wells, hub caps, and fenders, for example. Signaling functions of the light emitters 1202 having the circular shape may include but are not limited to brake lights, turn signals, hazard lights, head lights, and running lights, for example. The shapes, sizes, locations and number of the light emitters 1202 depicted in FIGS. 21-22 are not limited to the examples depicted.

Figure 23:
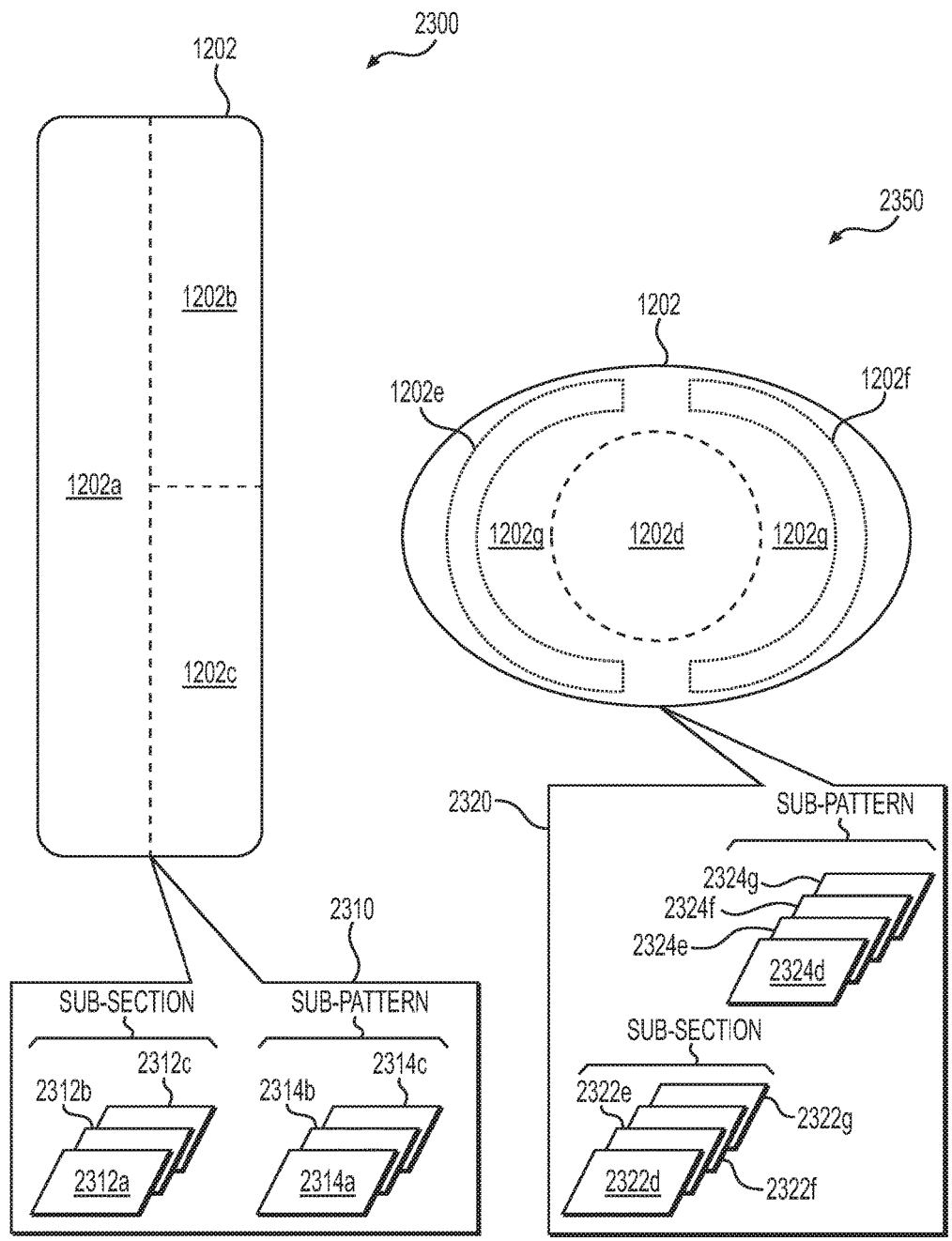
FIG. 23 depicts examples of light emitters of an autonomous vehicle.

FIG. 23 depicts examples 2300 and 2350 of light emitters 1202 of an autonomous vehicle 100. In example 2300 a light emitter 1202 may be partitioned into sub-sections denoted as 1202a-1202c by data representing a light pattern 2310. The light pattern 2310 may include data representing subsections 2312a-2312c associated with the sub-sections 1202a-1202c of the light emitter 1202, respectively. The light pattern 2310 may include data representing a sub-pattern 2314a-2314c associated with the sub-sections 1202a-1202c of the light emitter 1202. For example, light L emitted by each sub-section may have a pattern determined by the data representing the sub-pattern associated with the sub-section. As another example, data representing sub-section 2312b determines the sub-section 1202b of the light emitter 1202 and the light pattern emitted by sub-section 1202b is determined by the data representing the sub-pattern 2314b.

In example 2350, light emitter 1202 may have an oval shape and emitters in the light emitter 1202 may be partitioned into sub-sections denoted as 1202d-1202g. Sub-section 1202d may implement a head light or a back-up light of the autonomous vehicle 100 (e.g., depending on the direction of travel), for example. Sub-section 1202e or 1202f may implement a turn signal, for example. Sub-section 1202g may implement a brake light, for example. The light emitting elements (e.g., E1-En of FIG. 12A) may be individually addressable by circuitry and/or software according to the data representing the light pattern 2320. Therefore, in some examples, the sub-sections 1202d-1202g may implement signaling functions of the vehicle 100 as determined by data representing sub-sections 2322d-2322g in light pattern 2320 and may implement the signaling functions according to sub-patterns 2324d-2324g. In other examples, the data representing the light pattern 2320 may re-task the light emitter 1202 to implement visual alert functions. Implementation of the visual alerts may include partitioning one or more emitter elements of light emitter into sub-sections and each sub-section may have an associated sub-pattern. In another example, the light emitter 1202 may include sub-sections that implement visual alert functions and other sub-sections that implement signaling functions.

Figure 24:
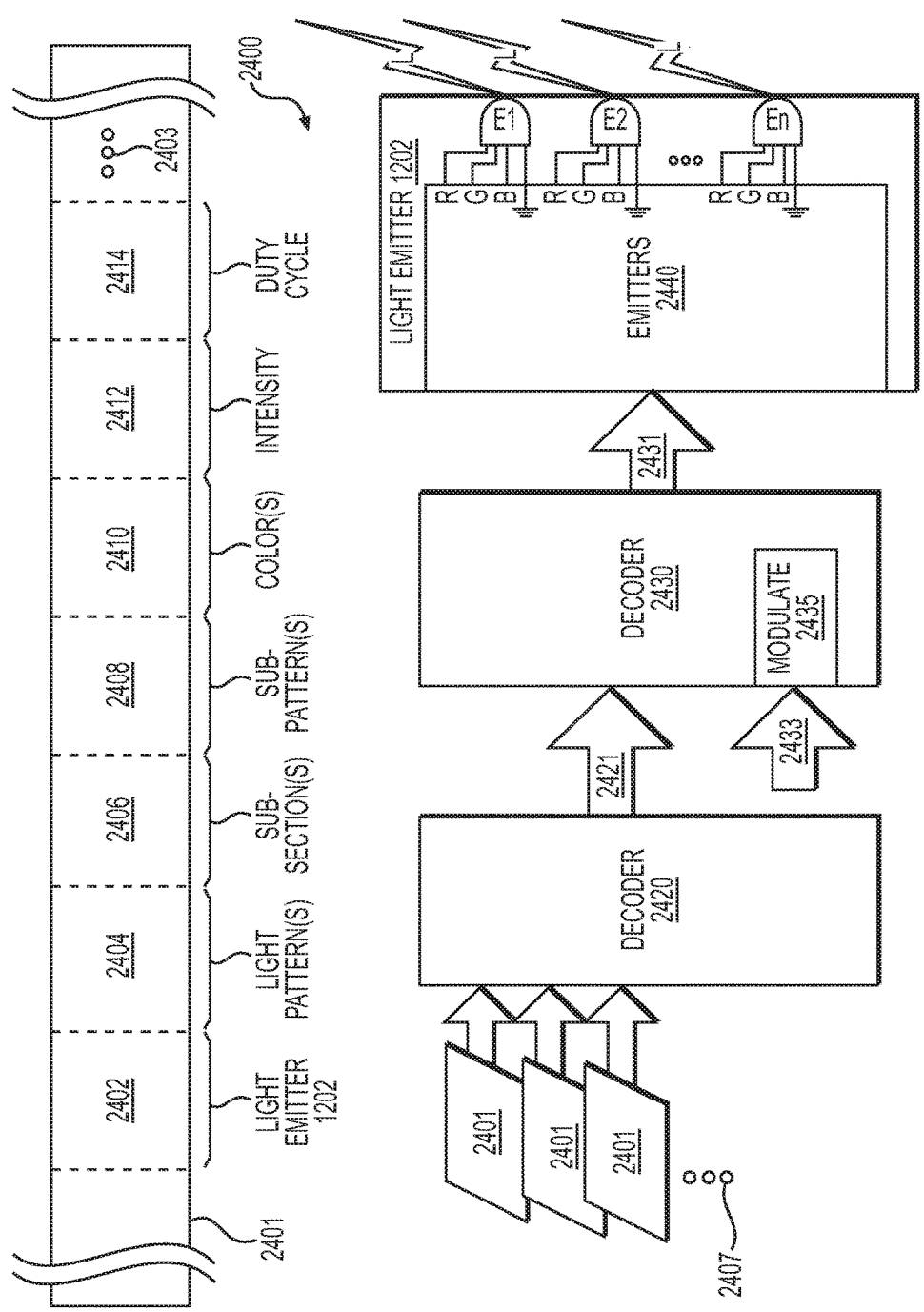
FIG. 24 depicts an example of data representing a light pattern associated with a light emitter of an autonomous vehicle.

FIG. 24 depicts an example 2400 of data representing a light pattern associated with a light emitter of an autonomous vehicle 100. In example 2400, data representing a light pattern 2401 may include one or more data fields 2402-2414 having data that may be decoded by a decoder 2420 to generate data 2421 received by a driver being configured to drive one or more light emitting elements (e.g., elements E1-En) of a light emitter 1202.

The data representing the light pattern 2401 may include but is not limited to data representing a light emitter 2402 (e.g., data to select a specific light emitter 1202), one or more light patterns 2404 to be applied to the light emitter 1202, one or more sub-sections 2406 of the light emitter 1202, one or more sub-patterns 2408 to be applied to one or more sub-sections, color or colors of light 2410 (e.g., wavelength of light) to be emitted by one or more light emitting elements of the light emitter 1202, intensity of light 2412 (e.g., luminous intensity in Candella) emitted by one or more light emitting elements of the light emitter 1202, and duty cycle 2414 to be applied to one or more light emitting elements of the light emitter 1202, for example. Data included in the data representing the light pattern 2401 may be in the form of a data structure or a data packet, for example.

A decoder 2420 may receive the data representing the light pattern 2401 for one or more light emitters 1202 as denoted by 2407 and decode the data into a data format 2421 received by driver 2430. Driver 2430 may, optionally receive data representing a modulation signal 2433 (e.g., from a wheel encoder) and may be configured to modulate the data 2421 with the modulation signal 2433 using a modulate function 2435. The modulate function may implement light patterns indicative of the vehicle 100 slowing down, coming to a stop, or some other driving operation of the vehicle 100, for example. Decoder 2430 may generate data 2431 configured to drive one or more light emitting elements in one or more light emitters 1202. Light emitting elements (e.g., E1-En) may be implemented using a variety of light sources including but not limited to light emitting diodes (LED's), organic light emitting diodes (OLEO's), multicolor LED's, (e.g., RGB LED's), or other light emitting devices, for example.

Figure 25:
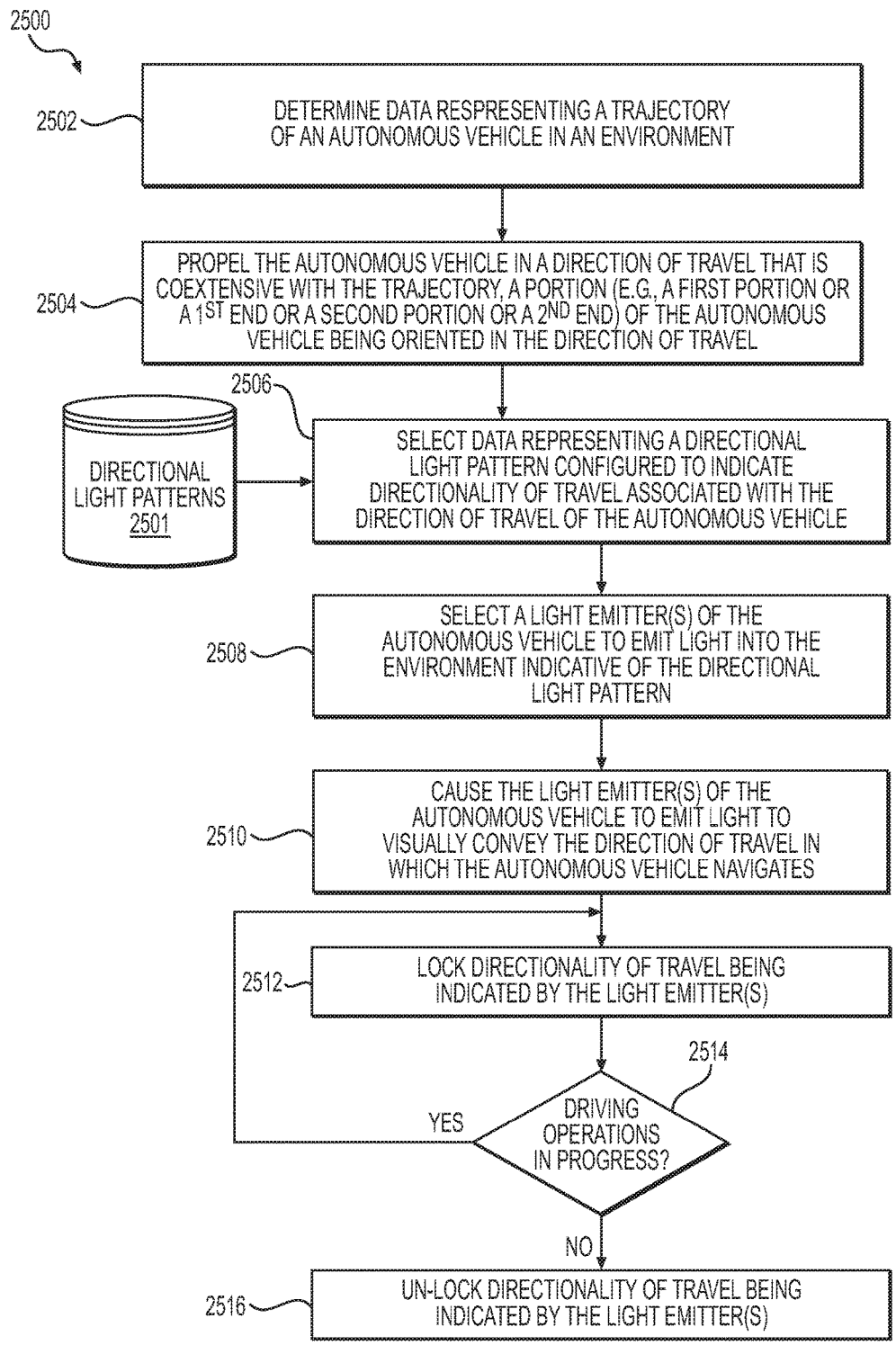
FIG. 25 depicts one example of a flow diagram for implementing visual indication of directionality in an autonomous vehicle.

FIG. 25 depicts one example of a flow diagram 2500 for implementing visual indication of directionality in an autonomous vehicle 100. At a stage 2502, data representing a trajectory of the autonomous vehicle 100 in an environment external to the vehicle 100 may be determined (e.g., using pose data from the localizer system of the vehicle 100). For example, data representing a location of the autonomous vehicle 100 in the environment may be used to determine the data representing the trajectory of the autonomous vehicle 100.

At a stage 2504, the autonomous vehicle 100 may be propelled (e.g., by the drive system under control of the planner system) in a direction of travel that may be coextensive with the trajectory with a portion (e.g., a first portion or a second portion) of the autonomous vehicle 100 being oriented in the direction of travel (e.g., facing in the direction of travel). As one example, the portion may be a first portion of the vehicle 100 (e.g., a first end of the vehicle 100) or a second portion of the vehicle 100 (e.g., a second end of the vehicle 100). The driving system may command the steering system and propulsion system to orient and propel the first portion or the second portion in the direction of travel that is coextensive with the trajectory.

At a stage 2506, data representing a directional light pattern being configured to indicate directionality of travel associated with the direction of travel of the autonomous vehicle 100 may be selected. The directional light pattern may be accessed from a data store (e.g., a memory, data storage, etc.) of the autonomous vehicle 100. There may be different directional light patterns associated with different directions of travel of the autonomous vehicle 100. Directional light patterns may be configured differently for different light emitters 1202 of the autonomous vehicle 100 (e.g., different sizes of emitters, different locations of emitters, differences in light emitting area of emitters, different shapes or emitters, etc.). In some examples, different directional light patterns may be selected for different light emitters 1202 of the autonomous vehicle 100. In other examples, the directional light pattern selected may be selected for multiple light emitters 1202 of the autonomous vehicle 100 (e.g., a signal directional light pattern for multiple light emitters 1202). As one example, the data representing the directional light pattern may be accessed, at the stage 2506, from a data store 2501 having directional light pattern data.

At a stage 2508, a light emitter 1202 of the autonomous vehicle 100 may be selected to emit light into the environment indicative of the directional light pattern. In some examples, multiple light emitters 1202 may be selected and the same directional light pattern may be applied to each light emitter 1202. In other examples, multiple light emitters 1202 may be selected and different directional light patterns may be applied to some or all of the multiple light emitters 1202.

At a stage 2510, the light emitter 1202 may be caused to emit the light to visually convey the direction of travel in which the autonomous vehicle 100 navigates. In some examples, multiple light emitters 1202 may be caused to emit light to convey the direction of travel in which the autonomous vehicle 100 navigates.

Flow 2500 may terminate after the stage 2510 or may return to some other stage, such as back to the stage 2502. Optionally, the flow 2500 may implement a stage 2512. At the stage 2512, the directionality of travel of the autonomous vehicle being indicated by the one or more light emitters 1202 may be locked. Locking the directionality of travel as the autonomous vehicle 100 navigates a trajectory may be implemented to prevent the light emitters 1202 from emitting light in a direction contrary to the actual direction of travel of the vehicle 100 (e.g., from indicating a direction of travel that is opposite to the actual direction of travel). For example, whilst driving in a first direction, locking the indicated directionality of travel to the first direction may be useful to prevent potential confusion to pedestrians and drivers of other vehicles that could arise if the light emitters 1202 of the autonomous vehicle 100 were to visually indicate a contrary direction of travel, such as a second direction that is opposite to the first direction.

At a stage 2514, a determination may be made as to whether or not driving operations of the autonomous vehicle 100 are in progress (e.g., the vehicle 100 is navigating a trajectory). If the vehicle 100 is engaged in driving operations, then a YES branch may be taken back to the stage 2512, where the directionality of travel being indicated by the light emitter(s) may remain locked. On the other hand, if driving operations of the vehicle 100 have ceased, then a NO branch may be taken to a stage 2516. At the state 2516, the directionality of travel being indicated by the light emitter(s) 1202 may be un-locked. After being un-locked, the flow 2500 may return to another stage, such as the stage 2502 or may terminate. For example, when driving operations have ceased (e.g., the vehicle 100 has stopped or parked to pick up or drop of passengers) and the directionality of travel is un-locked, the vehicle 100 may resume driving operations and the directionality of travel being indicated by the light emitter(s) 1202 may be the same or may be changed to indicate another direction of travel.

Figure 26:
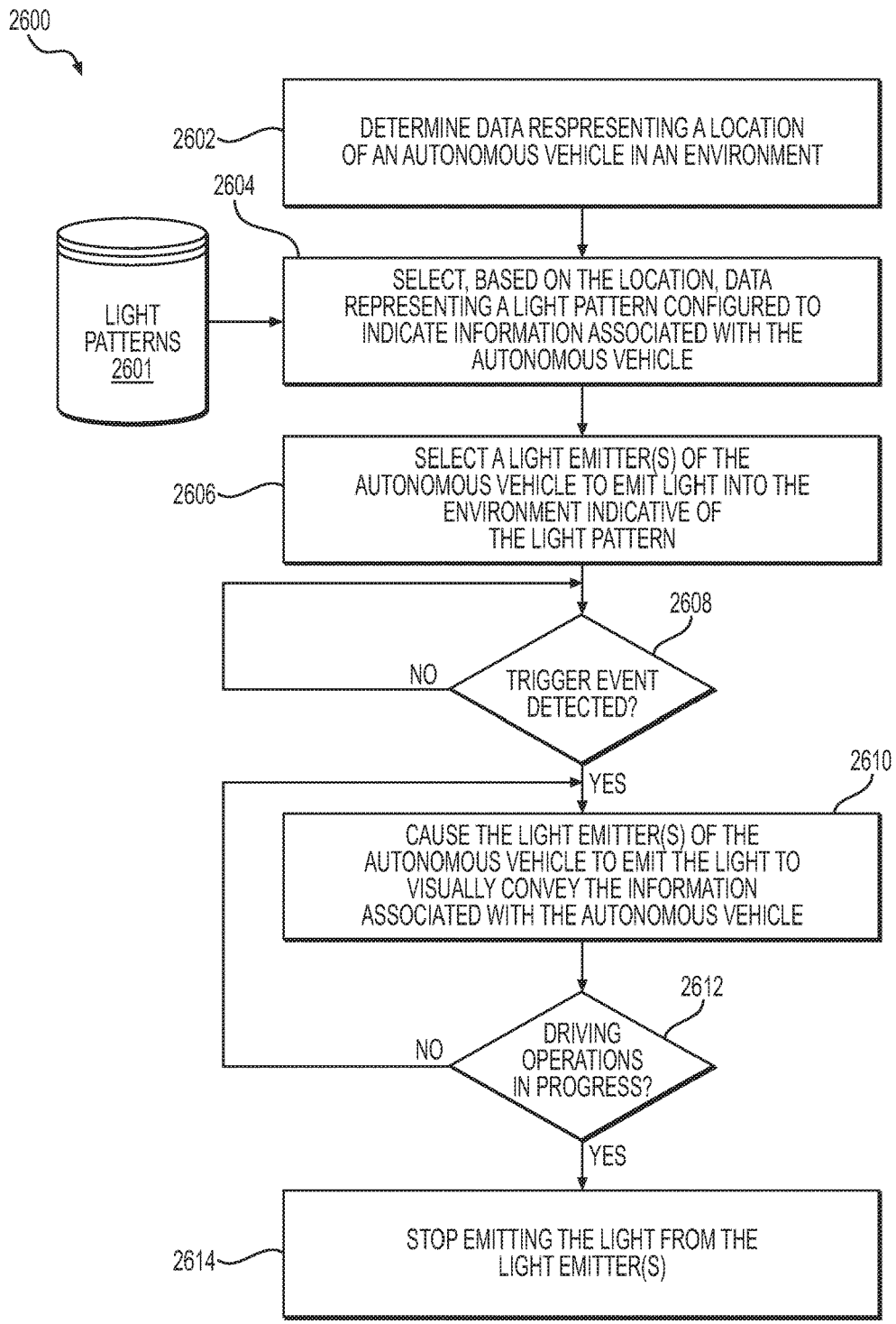
FIG. 26 depicts one example of a flow diagram for implementing visual indication of information in an autonomous vehicle.

FIG. 26 depicts one example of a flow diagram 2600 for implementing visual indication of information in an autonomous vehicle 100. At a stage 2602 data representing a location of the autonomous vehicle 100 in the environment may be determined (e.g., using pose data from the localizer system). At a stage 2604, based on the location of the autonomous vehicle 100, data representing a light pattern being configured to indicate information associated with the autonomous vehicle 100 may be selected. As one example, the data representing the light pattern may be accessed, at the stage 2604, from a data store 2601 having light pattern data. At a stage 2606, a light emitter 1202 of the autonomous vehicle 100 may be selected to emit light into the environment that is indicative of the light pattern. At a stage 2608, a determination may be made as to whether or not a trigger event has been detected (e.g., by one or more systems of the vehicle 100, such as the planner system, the sensor system, the perception system, and the localizer system). If the trigger event has not been detected, then a NO branch may be taken from the stage 2608 and the flow 2600 may cycle back to the stage 2608 to await detection of the trigger event. On the other hand, if the trigger event is detected, then a YES branch may be taken from the stage 2608 to a stage 2610.

At the stage 2610, the light emitter 202 may be caused to emit the light to visually convey the information associated with the autonomous vehicle 100. At a stage 2612, a determination may be made as to whether or not driving operations of the autonomous vehicle 100 are in progress. If driving operations are in progress (e.g., the vehicle 100 is navigating a trajectory), then a YES branch may be taken from the stage 2612 to a stage 2614. At the stage 2614, the emitting of light from the light emitter 1202 may be stopped (e.g., to prevent the information from confusing other drivers and/or pedestrians). If driving operations are not in progress, then a NO branch may be taken from the stage 2612 back to the stage 2610, where the light emitter 1202 may continue to emit the light to visually convey the information associated with the autonomous vehicle 100.

In flow 2600, the information indicated by the data representing the light pattern associated with the autonomous vehicle 100 may include but is not limited to client/customer/user/passenger created content, a graphic, a greeting, an advisory, a warning, an image, a video, text, a message, or other forms of information that may be displayed by one or more of the light emitters 1202. As one example, the data representing the light pattern associated with the autonomous vehicle 100 may include information to identify the autonomous vehicle 100 as being intended to service a specific passenger using graphic or other visual information that the passenger may recognize. Further to the example, the light emitter 1202 may display a passenger specific image that readily identifies the vehicle 100 as being tasked to service the passenger associated with the passenger specific image (e.g., the passenger may have created the passenger specific image). As another example, the data representing the light pattern associated with the autonomous vehicle 100 may include a passenger specific greeting or message that is displayed by light emitter 1202. A passenger who visually perceives the greeting/message may understand that the autonomous vehicle 100 presenting the greeting/message is tasked to service the passenger (e.g., to provide transport for the passenger).

The trigger event that may be detected at the stage 2608 may be location based, for example. As a first example, if the vehicle 100 is tasked to pick up a passenger at a predetermined location, then upon arrival at the predetermined location, the data representing the predetermined location may be compared with data representing the location of the vehicle 100 in the environment (e.g., using the planner system, localizer system, perception system and sensor system). If a match between the predetermined location and the location of the vehicle 100 is determined, then the trigger event has been detected (e.g., the vehicle has arrived at a location consistent with the predetermined location).

As a second example, the autonomous vehicle 100 may be configured to detect wireless communications (e.g., using COMS 880 in FIG. 8) from a wireless computing device (e.g., a client's/customer's/passenger's smartphone or tablet). The vehicle 100 may be configured to sniff or otherwise listen for wireless communications from other devices upon arrival at a location, for example. In other example, the autonomous vehicle 100 may be configured to wirelessly transmit a signal configured to notify an external wireless device that the vehicle 100 has arrived or is otherwise in proximity to the external wireless device (e.g., a smartphone). The vehicle 100 and/or the external wireless device may wirelessly exchange access credentials (e.g., service set identifier—SSID, MAC address, user name and password, email address, a biometric identifier, etc.). The vehicle 100 may require a close proximity between the vehicle 100 and the external wireless device (e.g., as determined by RSSI or other radio frequency metric), such as via a Bluetooth protocol or NFC protocol, for example. Verification of access credentials may be the trigger event.

Figure 27:
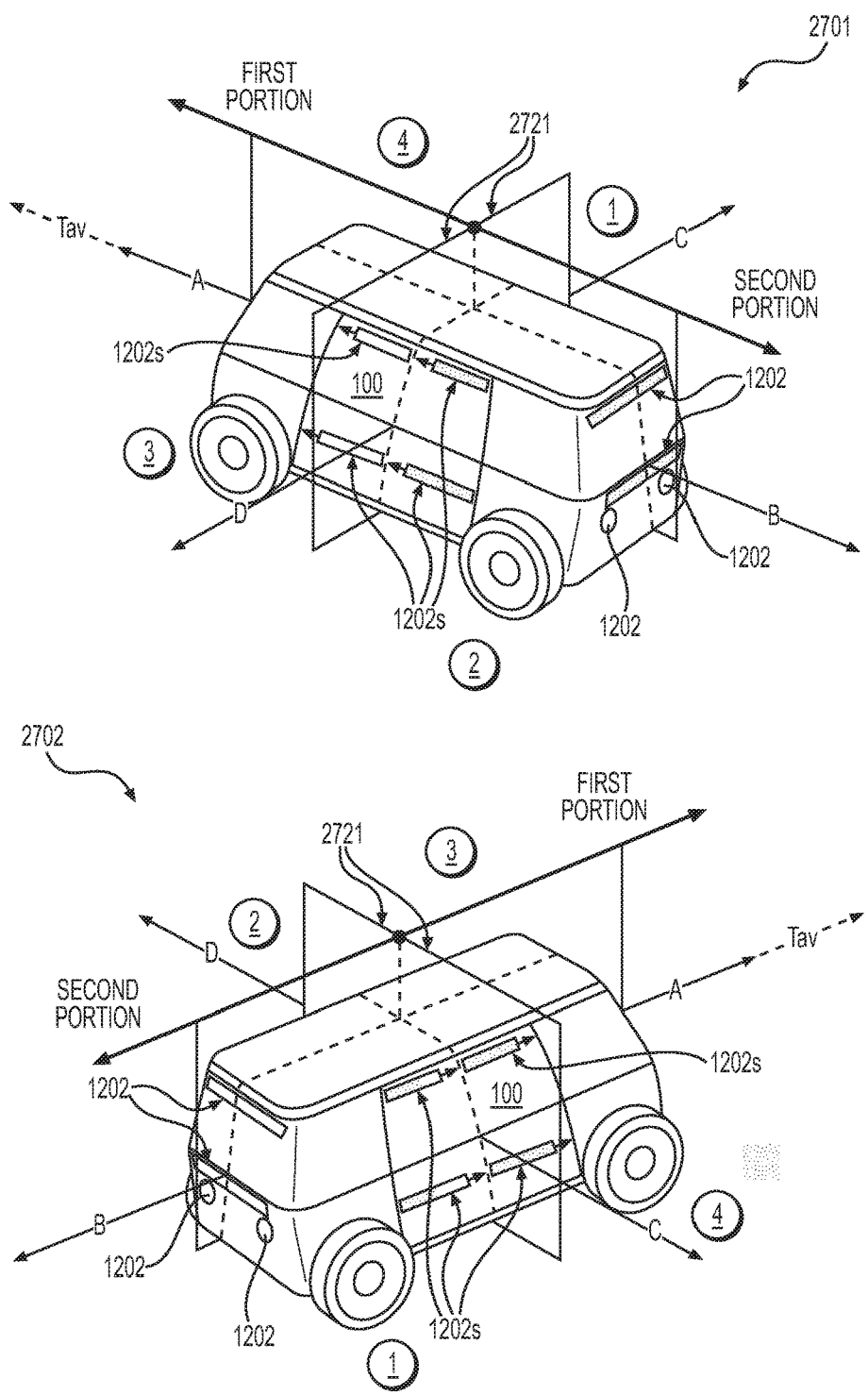
FIG. 27 depicts examples of visual indication of directionality of travel by light emitters of an autonomous vehicle.

FIG. 27 depicts examples 2701 and 2702 of visual indication of directionality of travel by light emitters of an autonomous vehicle 100. In examples 2701 and 2702 a line 2721 demarcates a first portion of the autonomous vehicle 100 (e.g., occupying quadrants 3 and 4 of FIGS. 10A-10B) and a second portion of the autonomous vehicle 100 (e.g., occupying quadrants 1 and 2 of FIGS. 10A-10B). In example 2710 the vehicle 100 is being propelled along a trajectory Tav (e.g., in the direction of arrow A). Light emitters 1202 may be disposed (e.g., external to the vehicle 100) in quadrants 1, 3 and 2, and a sub-set of those light emitters 1202 may be selected and caused to emit the light to visually convey the direction of travel of the vehicle 100. The selected light emitters are denoted as 12025. The data representing the light pattern that is applied to the light emitters 12025 may implement a light pattern of an arrow or arrows pointing and/or moving in the direction of travel the first portion is oriented in. In example 2701 the selected light emitters 12025 may be disposed on a first side of the vehicle 100 that spans the first and second portions (e.g., in quadrants 2 and 3).

In example 2702, the vehicle 100 is depicted rotated approximately 90 degrees clockwise to illustrate another sub-set of selected light emitters disposed on a second side of the vehicle 100 that spans the first and second portions (e.g., in quadrants 1 and 4). Similar to the example 2701, in example 2702, the data representing the light pattern that is applied to the light emitters 12025 may implement the light pattern of the arrow or arrows pointing and/or moving in the direction of travel the first portion is oriented in.

Figure 28:
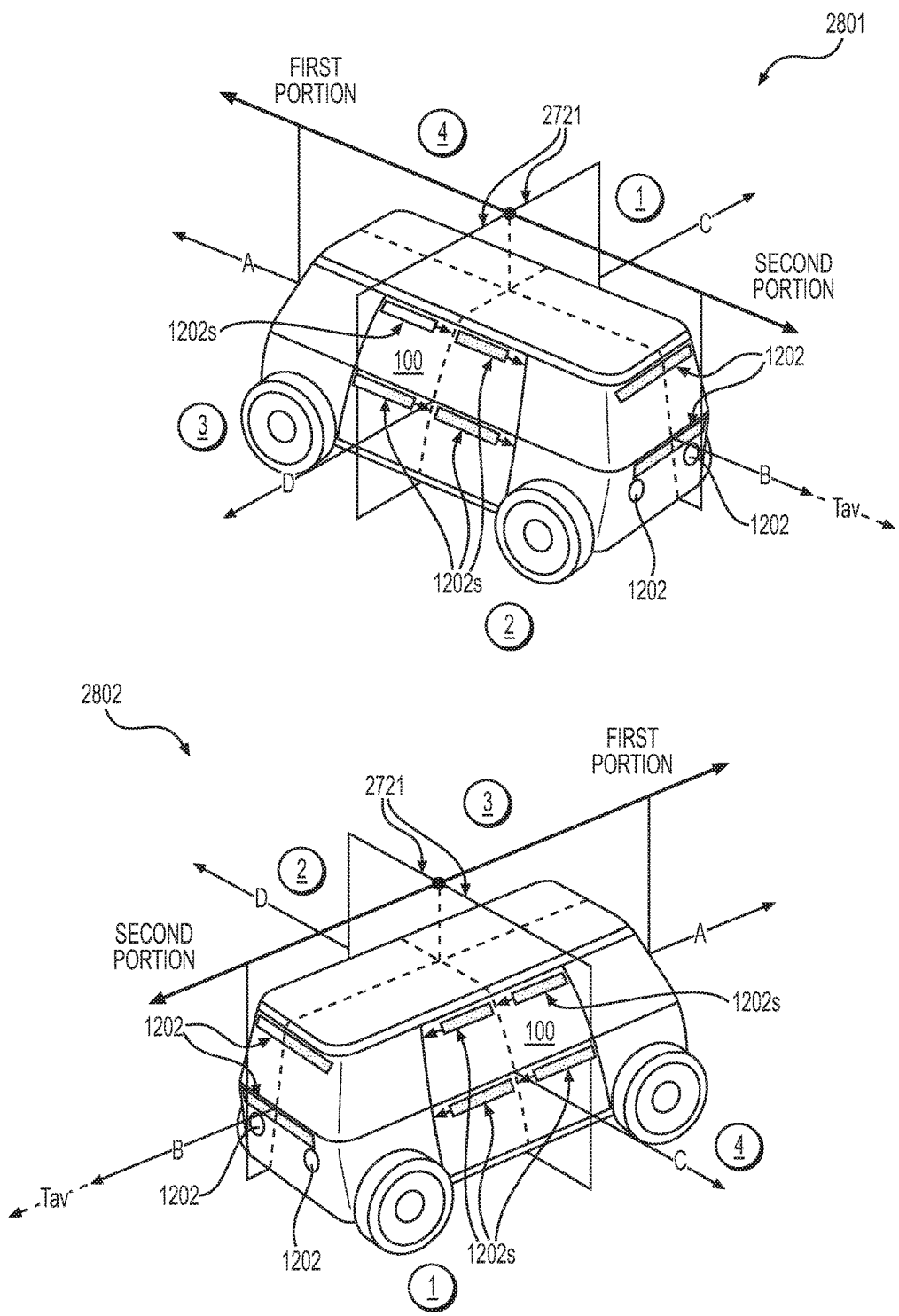
FIG. 28 depicts other examples of visual indication of directionality of travel by a light emitter of an autonomous vehicle.

FIG. 28 depicts other examples 2801 and 2802 of visual indication of directionality of travel by a light emitter of an autonomous vehicle 100. In contrast to the examples of FIG. 27, examples 2801 and 2802 depict the vehicle 100 having a trajectory Tav (e.g., along line B) with the second portion being oriented in the direction of travel. Selected light emitters 1202S on a first side of the vehicle 100 (e.g., in example 2801) and selected emitters 1202S on a second side of the vehicle 100 (e.g., in example 2801) may be configured to implement the light pattern of an arrow or arrows pointing and/or moving in the direction of travel of the vehicle 100.

Figure 29:
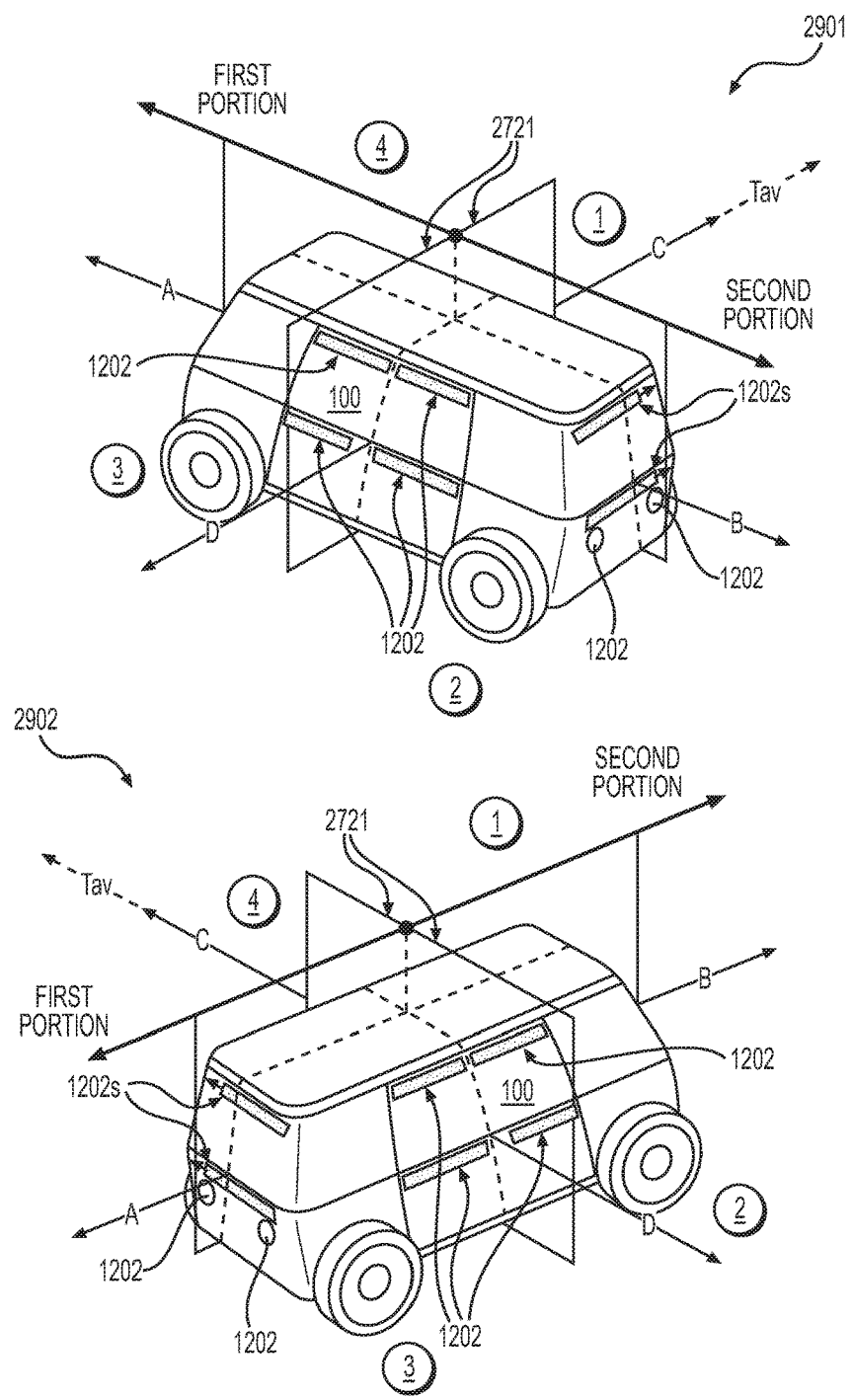
FIG. 29 depicts yet other examples of visual indication of directionality of travel by a light emitter of an autonomous vehicle.

FIG. 29 depicts yet other examples 2901 and 2902 of visual indication of directionality of travel by a light emitter of an autonomous vehicle 100. In the examples of FIG. 29, the vehicle 100 may be configured to be propelled in directions other than those depicted in FIGS. 27 and 28, such as a trajectory Tav along the direction of arrow C. For example, the drive system of the autonomous vehicle 100 may be commanded (e.g., by the planner system) to turn each wheel (e.g., wheel 852 of FIG. 8) via the steering system to an angle that implements directionality of travel along the trajectory Tav (e.g., along the direction of arrow C). Light emitters 1202 that may have been selected in FIGS. 27 and 28 may be un-selected in the examples 2901 and 2902 in favor of selecting another sub-set of light emitters 1202s disposed at an end of the first portion (e.g., a 1st End) and at an end of the second portion (e.g., a 2nd End). The data representing the light pattern may be configured to implement (e.g., in the selected light emitters 1202s) the arrows pointing and/or moving in the direction of travel as described above.

Figure 30:
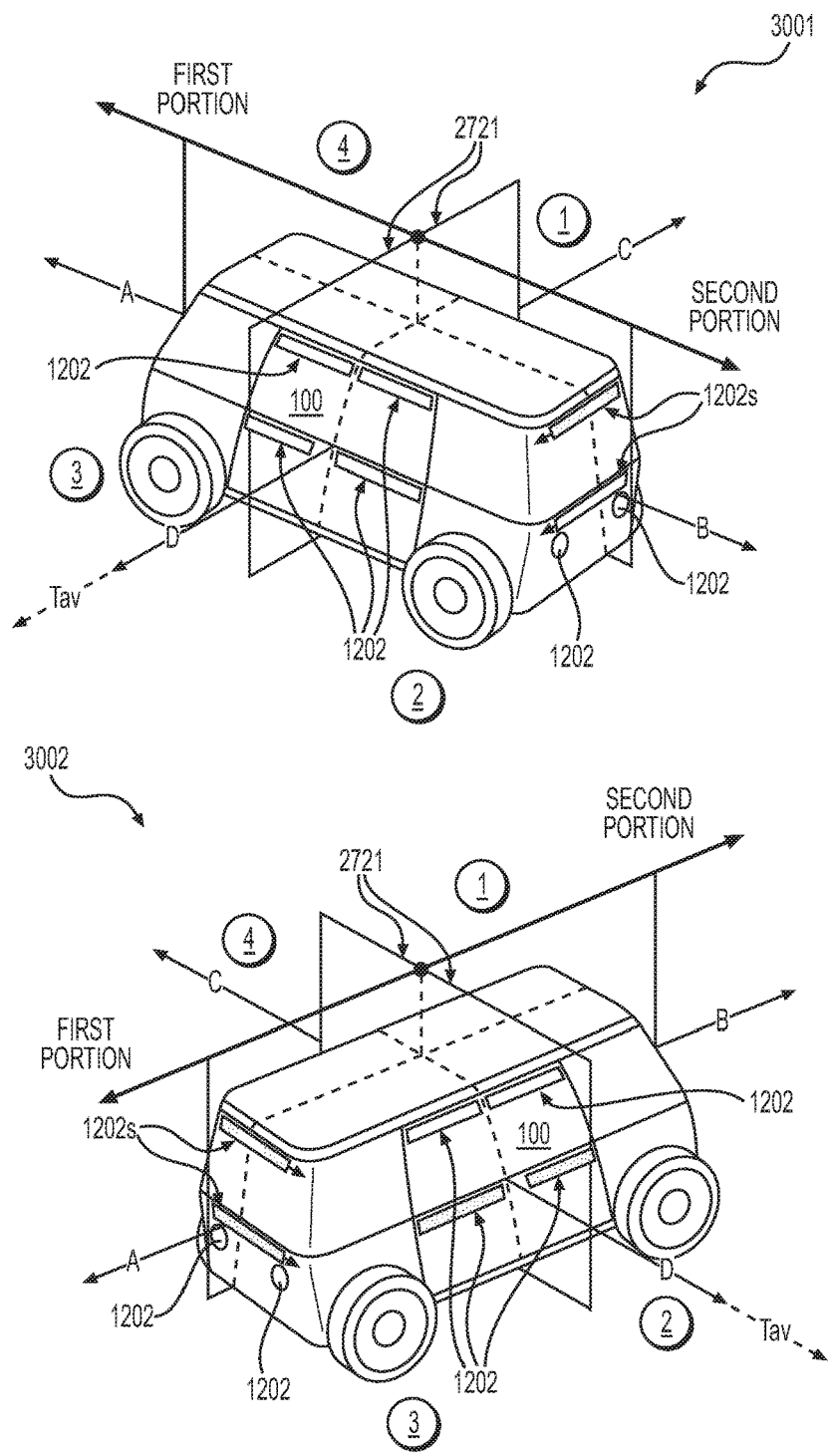
FIG. 30 depicts additional examples of visual indication of directionality of travel by a light emitter of an autonomous vehicle.

FIG. 30 depicts additional examples 3001 and 3002 of visual indication of directionality of travel by a light emitter of an autonomous vehicle 100. In FIG. 30, examples 3001 and 3002 depict the trajectory Tav of the vehicle being along the direction of arrow D and selected light emitters being caused to emit light indicative of the direction of travel. In examples of FIGS. 27-30, the light emitters 1202 (e.g., including any selected light emitters 1202s) may be symmetrically disposed relative to the first and second portions of the vehicle 100. For example, the light emitters 1202 may be symmetrically disposed on the sides of the vehicle 100 relative to the first and second portions of the vehicle 100 and/or may be symmetrically disposed on the ends of the vehicle 100 relative to the first and second portions of the vehicle 100. Actual shapes, sizes, configurations, locations and orientations of the light emitters 1202 is not limited by the examples depicted in FIGS. 27-30.

Figure 31:
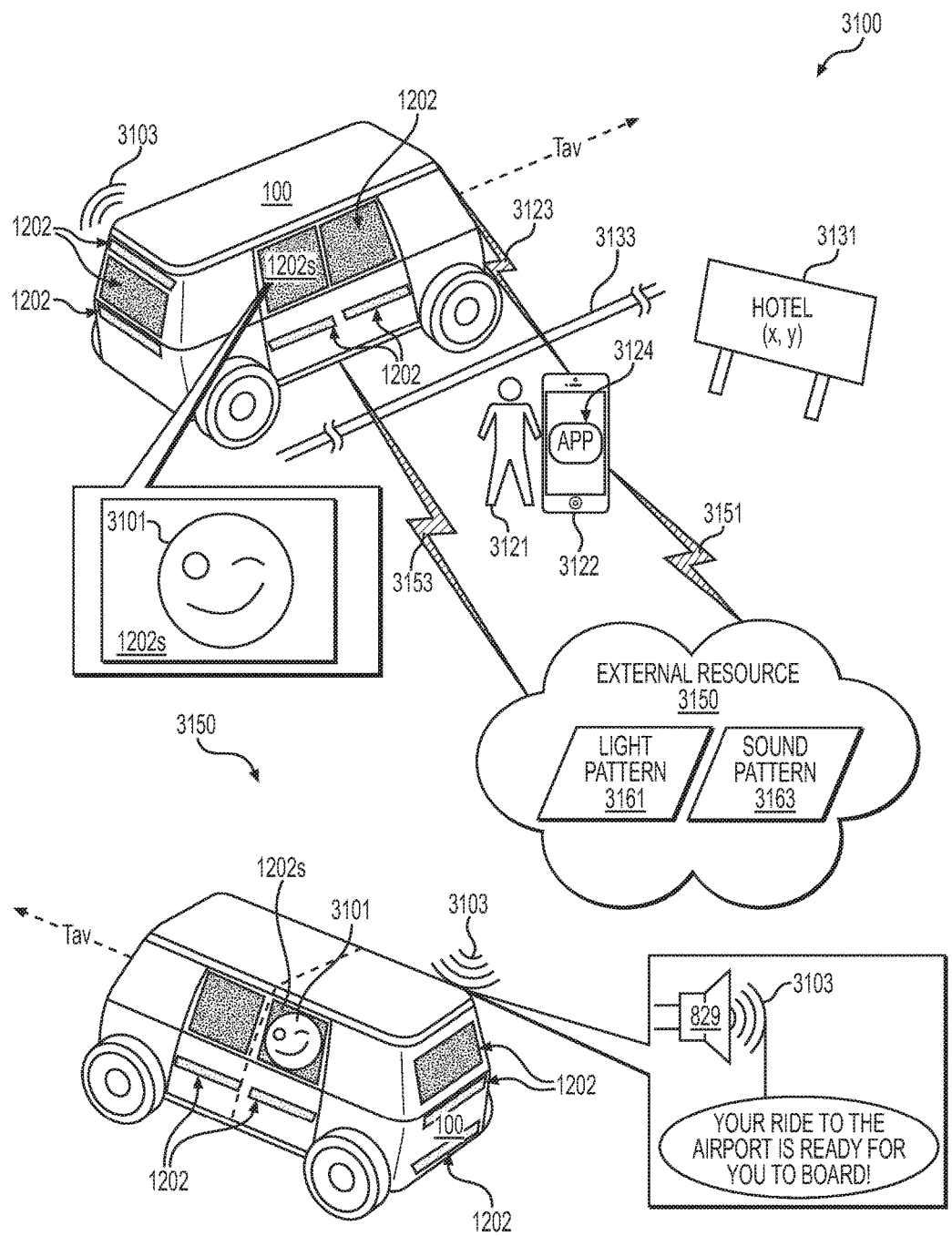
FIG. 31 depicts examples of visual indication of information by a light emitter of an autonomous vehicle.

FIG. 31 depicts examples 3100 and 3150 of visual indication of information by a light emitter of an autonomous vehicle 100. In example 3100, the autonomous vehicle 100 has autonomously navigated to a hotel 3131 (e.g., having a location (x, y)) to pick up a passenger 3121 at a curb 3133 of the hotel 3131. The autonomous vehicle 100 may determine its location in the environment (e.g., using the localizer system and/or the planner system), and may selected, based on the location, data representing a light pattern (e.g., a pattern not related to directionality of travel) being configured to indicate information associated with the autonomous vehicle 100. A light emitter 1202 of the autonomous vehicle 100 may be selected to emit light indicative of the light pattern. In some examples, prior to emitting the light indicative of the light pattern from one or more of the light emitters 1202, a trigger event may be detected by the autonomous vehicle 100. The occurrence of the trigger event may cause the selected light emitter 1202s to emit the light indicative of the light pattern.

As one example, the trigger event may be determined based on the location of the vehicle 100 relative to another location, such as a location (e.g., (x, y)) of the hotel 3131. The planner system may compare the location (e.g. GPS/IMU data, map tile data, pose data, etc.) with data representing the location of the hotel 3131 to determine if there is a match. An exact match may not be necessary as an indication that the vehicle is located proximate the location of the hotel 3131 may be sufficient to determine that conditions that satisfy the trigger event have been met. Other data, such as sensor data from the sensor system as processed by the perception system may be used to determine that objects in the environment around the vehicle 100 are consistent with the vehicle 100 being at the hotel (e.g., hotel signage, hotel architecture, street signs, road markings, etc.).

As another example, the trigger event may include the vehicle 100 and/or a computing device 3122 of the passenger wirelessly 3123 communicating and/or detecting one another to determine information indicative of the trigger event, such as an exchange of access credentials or a predetermined code or handshake of signals that indicate the wireless communication 3123 validates that the computing device 3122 is associated with the passenger 3122 the vehicle 100 is tasked to transport.

In example 3100, the light pattern emitted by the selected light emitter 1202S may be associated with an image (e.g., a winking image 3101) the passenger 3121 expects to be presented to identify the vehicle 100 as being the vehicle dispatched to service the passenger's 3121 transportation needs. Other information may be presented on the selected light emitter 1202S and the winking image 3101 is a non-limiting example of information that may be presented.

The passenger 3121 may have the light pattern 3161 stored or otherwise associated with a passenger profile or other data associated with the passenger 3121. In some examples, the passenger 3121 may create or access a preferred image or other information to be displayed by one or more of the light emitters 1202. As one example, an application APP 3124 executing on a computing device 3122 (e.g., a smartphone or tablet) may be used to create, select, or access data representing the light pattern 3161. The computing device 3122 may communicate 3151 the light pattern 3161 to an external resource 3150 (e.g., the Cloud, the Internet, a data warehouse, etc.). The vehicle 100 may access 3153 the light pattern 3161 from the external resource 3150 (e.g., access and locally store the light pattern 3161 in a memory of the vehicle 100).

In other examples, data representing a sound pattern 3163 (e.g., a digital audio file) may be selected and audibly presented 3103 using an audio function of the vehicle 100, such as playback of the sound pattern 3163 over a loudspeaker (e.g., speaker(s) 829 of FIG. 8). The data representing a sound pattern 3163 may be created and accessed in a manner similar to that described above for the data representing the light pattern 3161.

In example 3150, an opposite side of the vehicle 100 is depicted. Light emitters on the sides, ends and other locations of the vehicle 100 may be symmetrically disposed relative to the first portion and second portion, or other reference point on the vehicle 100 (e.g., 100r). A selected light emitter 1202s on the opposite side of the vehicle 100 may emit the light indicative of the light pattern 3161 as was described above in reference to example 3100. Sound indicative of the sound pattern 3163 may also be audibly presented 3103 on the other side of the vehicle 100. As one example, the data representing a sound pattern 3163 may include a message "Your ride to the airport is ready for you to board!" The vehicle 100 may include doors positioned on both sides of the vehicle 100 and the presentation of the light pattern and/or sound pattern on both sides of the vehicle may be configured to inform a passenger (e.g., visually and/or audibly) who may be on either side of the vehicle 100 that their vehicle 100 has arrived and has identified itself as being the vehicle tasked to them.

The light pattern 3161 and the sound pattern 3163 are non-limiting examples of content that may be presented by the vehicle 100. In some examples, the content may be created or selected by a passenger etc. The APP 3124 may be configured to implement content creation and/or content selection. The light emitters 1202 may be selected to implement one or more functions including but not limited to conveying directionality of travel and/or conveying information associated with the autonomous vehicle 100. In other examples, during driving operations (e.g., while the vehicle is navigating a trajectory) the light emitters 1202 may be selected to implement a visual alert.

Figure 32:
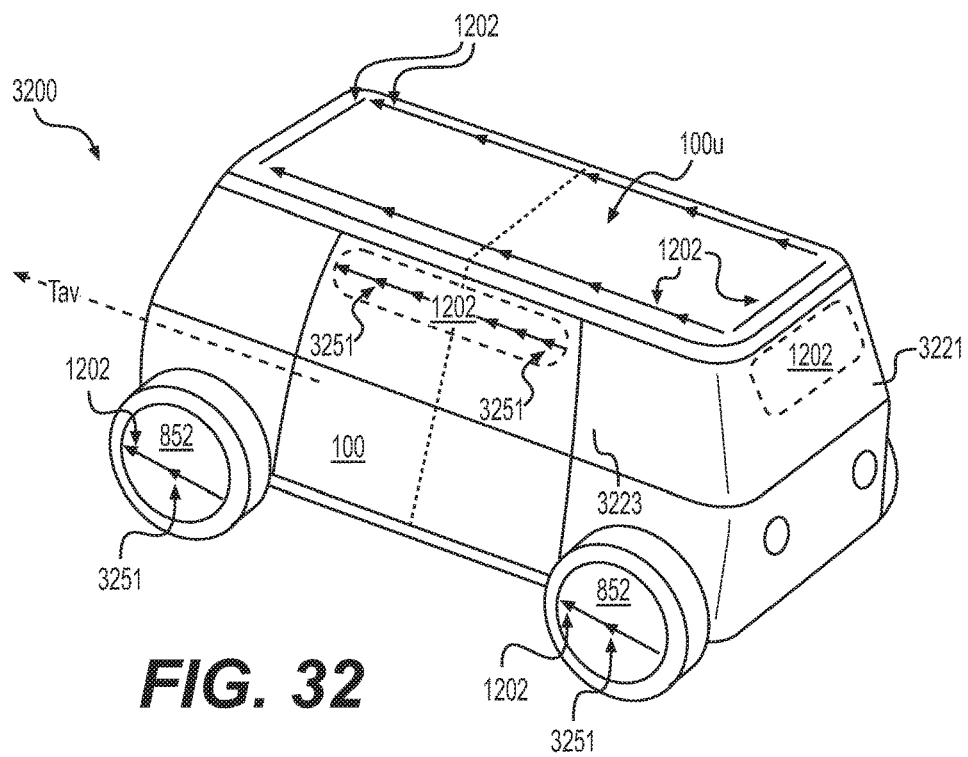
FIG. 32 depicts one example of light emitter positioning in an autonomous vehicle.

FIG. 32 depicts one example 3200 of light emitter positioning in an autonomous vehicle 100. In example 3200, light emitters 1202 may be positioned on a roof 100u of the vehicle 100 (e.g., to convey information and/or directionality of travel to an observer from above), may be positioned on wheels 852 (e.g., on a hub cap or wheel cover) of the vehicle 100, and may be positioned behind an optically transparent structure 3221, 3223 (e.g., behind a window of the vehicle 100), for example. The light emitters 1202 depicted in example 3200 may be symmetrically disposed on the vehicle 100 with other relative to other light emitters 1202 (not shown). One or more of the light emitters 1202 may emit light having an arrow 3251 pattern that moves, strobes or otherwise visually conveys the autonomous vehicle 100 is moving in a direction associated with trajectory Tav, for example. The arrow 3251 may be static or maybe dynamic (e.g., strobed across the light emitter 1202 in the direction of travel).

Figure 33:
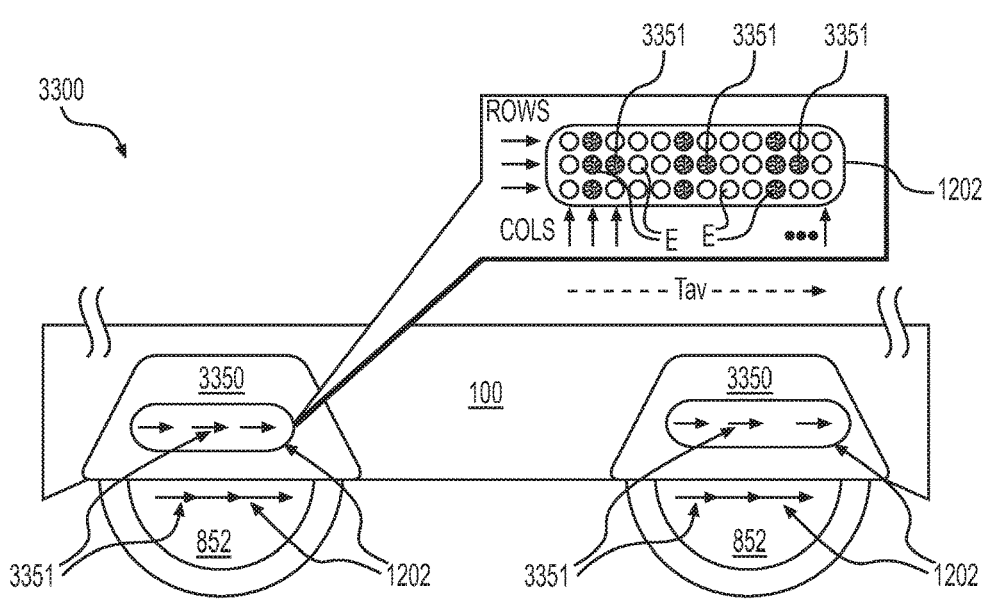
FIG. 33 depicts one example of light emitter positioning in an autonomous vehicle.

FIG. 33 depicts one example 3300 of light emitter positioning in an autonomous vehicle. In example 3300, light emitters 1202 may be positioned on wheel well covers 3350 that are coupled with the vehicle 100. The light emitters 1202 depicted in example 3300 may be symmetrically disposed on the vehicle 100 with other relative to other light emitters 1202 (not shown). The wheel well covers 3350 may be configured to be removable from the vehicle 100. During non-driving operations of the vehicle 100 (e.g., when stopped to pick up or drop of passengers) the light emitters 1202 on the wheel well covers 3350 and/or other locations on the vehicle 100 may be configured to provide courtesy lighting (e.g., illuminate the ground or area around the vehicle 100 for boarding/un-boarding at night or in bad weather, etc.). Each light emitter 1202 may include several light emitting elements E (e.g., E1-En of FIG. 24), with each element E being individually addressable (e.g., by driver 2430 of FIG. 24) to control intensity of light emitted, color of light emitted, and duration of light emitted, for example. For example, each element E may have a specific address in the light emitter 1202 defined by a row and a col address. In example 3300, blacked-out elements E in light emitter 1202 may visually convey direction of travel using an image of an arrow 3351 that is oriented along the trajectory Tav of the autonomous vehicle 100. The arrow 3351 may be static or maybe dynamic (e.g., strobed across the light emitter 1202 in the direction of travel).

Each light emitter 1202 may be partitioned into one or more partitions or portions, with the elements E in each partition being individually addressable. Data representing sub-sections and/or sub-patterns (e.g., 1202a-1202c of FIG. 23) may be applied to emitters E in the one or more partitions. The data representing light pattern, the data representing the directional light pattern, or both may include one or more data fields (e.g., 2402-2414 of FIG. 24) having data that may be decoded by a decoder to generate data received by a driver being configured to drive one or more light emitting elements E of a light emitter 1202. For example, image data (e.g., for the winking image 3101) for the data representing light pattern 3161 may be included in one of the data fields. As another example, the data representing the directional light pattern (e.g., from data store 2501 of FIG. 25) may include a data field for a color of light associated with a direction of travel (e.g., orange for a first direction and purple for a second direction). The data representing the directional light pattern may include a data field for a strobe rate or rate of motion of light emitted by a light emitter 1202 (e.g., movement of an arrow 3351 or other image or icon that indicates the direction of travel as depicted in FIGS. 27-30).

Although the foregoing examples have been described in some detail for purposes of clarity of understanding, the above-described conceptual techniques are not limited to the details provided. There are many alternative ways of implementing the above-described conceptual techniques. The disclosed examples are illustrative and not restrictive.

What is claims is:

1. A method comprising:
    causing an autonomous vehicle to navigate in a first direction of travel within an environment, the autonomous vehicle configured to navigate in the first direction of travel in which a first end of the autonomous vehicle is leading and a second end of the autonomous vehicle is trailing and a second direction of travel in which the second end is leading and the first end is trailing;
    identifying a location of an object within the environment;
    determining an orientation of the autonomous vehicle relative to the location of the object;
    selecting, based at least in part on the orientation of the autonomous vehicle, a light emitter of the autonomous vehicle to emit a light pattern to visually convey the first direction of travel; and
    causing the light emitter to emit the light pattern to visually convey the first direction of travel.

2. The method as recited in claim 1, further comprising:
    determining a trajectory of the autonomous vehicle within the environment,
    wherein determining the orientation of the autonomous vehicle relative to the location of the object is based at least in part on the location of the object and the trajectory of the autonomous vehicle.

3. The method as recited in claim 1, wherein the location comprises a first location and the orientation comprises a first orientation, and wherein the method further comprises:
    receiving sensor data indicating a second location of the autonomous vehicle within the environment;
    determining a second orientation of the autonomous vehicle relative to the first location of the object when the autonomous vehicle is in the second location;
    selecting, based at least in part on the second orientation of the autonomous vehicle, the light emitter of the autonomous vehicle to emit a second light pattern, the second light pattern different than the first light pattern; and causing the light emitter to emit the second light pattern to visually convey the second direction of travel.

4. The method as recited in claim 1, further comprising:
determining, based at least in part on the orientation of the autonomous vehicle relative to the location of the object, that a portion of the autonomous vehicle is within view of the object,
wherein selecting the light emitter of the autonomous vehicle is based at least in part on the light emitter being disposed on the portion of the autonomous vehicle.

5. The method as recited in claim 1, wherein the location comprises a first location and the trajectory of the autonomous vehicle comprises a first trajectory of the autonomous vehicle, and wherein the method further comprises:
determining an initial location of the object within the environment;
determining a second trajectory of the object within the environment;
determining a predicted location for the object based at least in part on the initial location and the second trajectory;
determining a threshold distance based at least in part on the predicted location and a third trajectory of the autonomous vehicle; and
determining that the object is located within the threshold distance,
where causing the light emitter to emit the light pattern is based at least in part on determining that the object is located within the threshold distance.

6. The method as recited in claim 1, wherein the object comprises a first object, the location comprises a first location, the light emitter comprises a first light emitter, and the light pattern comprises a first light pattern, and wherein the method further comprises:
identifying a second location of a second object within the environment;
selecting, based at least in part on the orientation and the second location of the second object, a second light emitter of the autonomous vehicle to emit a second light pattern to visually convey the first direction of travel; and
causing the second light emitter to emit the second light pattern to visually convey the first direction of travel.

7. The method as recited in claim 1, further comprising;
determining a classification associated with the object; and
selecting the light pattern based at least in part on the classification.

8. The method as recited in claim 7, wherein the classification is one of pedestrian or bicyclist.

9. The method as recited in claim 1, wherein the location is a first location, the object is a first object, the orientation is a first orientation, and the light pattern is a first light pattern, and wherein the method further comprises:
causing the autonomous vehicle to navigate in the second direction of travel;
identifying a second location of a second object;
determining a second orientation of the autonomous vehicle relative to the second location of the second object;
selecting, based at least in part on the second orientation of the autonomous vehicle, the light emitter of the autonomous vehicle to emit a second light pattern to visually convey the second direction of travel; and
causing the light emitter to emit the second light pattern to visually convey the second direction of travel.

10. A system comprising:
one or more light emitters;
one or more processors; and
one or more computer-readable media storing instructions that, when executed by the one or more processors, cause the system to perform operations comprising:
causing an autonomous vehicle to navigate in a first direction of travel within an environment, the autonomous vehicle configured to navigate in the first direction of travel in which a first end of the autonomous vehicle is leading and a second end of the autonomous vehicle is trailing and a second direction of travel in which the second end is leading and the first end is trailing;
determining a trajectory of the autonomous vehicle;
identifying an object within the environment;
determining a location of the object within the environment;
selecting a light emitter of the one or more light emitters to emit a light pattern to visually convey the first direction of travel; and
causing the light emitter to emit the light pattern to visually convey the first direction of travel.

11. The system as recited in claim 10, wherein the location is a first location, and wherein the system further comprises:
one or more sensors,
wherein the operations further comprise receiving, from the one or more sensors, data representing a second location of the autonomous vehicle within the environment,
wherein determining the trajectory is based at least in part on the data representing the second location.

12. The system as recited in claim 10, wherein the location comprises a first location, and wherein the operations further comprise:
determining a second location of the autonomous vehicle within the environment; and
determining an event based at least in part on the first location and the second location,
wherein causing the light emitter to emit the light pattern to visually convey the first direction of travel is based at least in part on determining the event.

13. The system as recited in claim 10, wherein the trajectory comprises a first trajectory, the location comprises a first location, the light emitter comprises a first light emitter, and the light pattern comprises first light pattern, and wherein the operations further comprise:
determining a second trajectory of the autonomous vehicle;
determining a second location of the object within the environment;
selecting, based at least in part on the second trajectory and the second location, a second light emitter of the one or more light emitters to emit a second light pattern to visually convey the first direction of travel; and
causing the second light emitter to emit the second light pattern to visually convey the first direction of travel.

14. The system as recited in claim 10, wherein the object comprises a first object, the location comprises a first location, the light emitter comprises a first light emitter, and the light pattern comprises first light pattern, and wherein the operations further comprise:

identifying a second object within the environment;

determining a second location of the second object within the environment;

selecting, based at least in part on the trajectory and the second location, a second light emitter of the one or more light emitters to emit a second light pattern to visually convey the first direction of travel; and causing the second light emitter to emit the second light pattern to visually convey the first direction of travel.

15. The system as recited in claim 10, the operation further comprising:

determining, based at least in part on the trajectory of the autonomous vehicle and the location of the object, that a portion of the autonomous vehicle is within view of the object, wherein selecting the light emitter of the autonomous vehicle to emit the light pattern is based at least in part on the light emitter being disposed on the portion of the autonomous vehicle.

16. The system as recited in claim 10, the operations further comprising;

determining a classification associated with the object; and selecting the light pattern based at least in part on the classification.

17. The system as recited in claim 10, further comprising:

determining that the location of the object is within a threshold distance to the autonomous vehicle, wherein causing the light emitter to emit the light pattern is based at least in part on determining that the location of the object is within the threshold distance.

18. One or more computer-readable media storing instructions that, when executed by one or more processors, cause the one or more processors to perform operations comprising:

causing an autonomous vehicle to navigate in a first direction of travel within an environment, the autonomous vehicle configured to navigate in the first direction of travel in which a first end of the autonomous vehicle is leading and a second end of the autonomous vehicle is trailing and a second direction of travel in which the second end is leading and the first end is trailing;

determining a first location of the autonomous vehicle within the environment;

determining a second location of an object within the environment;

selecting light emitter on the autonomous vehicle based at least in part on the first location and the second location;

selecting data representing a light pattern that indicates the first direction of travel of the autonomous vehicle; and causing, using the data, the light emitter to emit light to visually convey the first direction of travel.

19. The one or more computer-readable media as recited in claim 18, wherein the object comprises a first object, the light emitter comprises a first light emitter, the data comprises first data, the light pattern comprises a first light pattern, and the light comprises first light, and wherein the operations further comprises:

determining a third location of a second object within the environment;

selecting, based at least in part on the first location of the autonomous vehicle and the third location of the second object, a second light emitter on the autonomous vehicle;

selecting second data representing a second light pattern that indicates the first direction of travel of the autonomous vehicle; and causing, using the second data, the second light emitter to emit second light to visually convey the first direction of travel.

20. The one or more computer-readable media as recited in claim 19, the operations further comprising:

determining a first classification associated with the first object; and determining a second classification associated with the second object, wherein selecting the first data representing the first light pattern is based at least in part on the first classification, and wherein selecting the second data representing the second light pattern is based at least in part on the second classification.

* * * * *